US009887841B2

(12) United States Patent
Kato et al.

(10) Patent No.: US 9,887,841 B2
(45) Date of Patent: Feb. 6, 2018

(54) AUTHENTICATOR, AUTHENTICATEE AND AUTHENTICATION METHOD

(71) Applicant: Toshiba Memory Corporation, Minato-ku (JP)

(72) Inventors: Taku Kato, Kamakura (JP); Tatsuyuki Matsushita, Tokyo (JP); Yuji Nagai, Sagamihara (JP); Fangming Zhao, Fuchu (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 14/939,426

(22) Filed: Nov. 12, 2015

(65) Prior Publication Data

US 2016/0080147 A1 Mar. 17, 2016

Related U.S. Application Data

(63) Continuation of application No. 14/090,740, filed on Nov. 26, 2013, now Pat. No. 9,225,513, which is a (Continued)

(30) Foreign Application Priority Data

Aug. 31, 2011 (JP) .................................. 2011-189979

(51) Int. Cl.
G06F 21/31 (2013.01)
G06F 21/62 (2013.01)
(Continued)

(52) U.S. Cl.
CPC ............ H04L 9/0869 (2013.01); G06F 21/31 (2013.01); G06F 21/34 (2013.01);
(Continued)

(58) Field of Classification Search
CPC ....... G06F 21/31; G06F 21/6218; G06F 21/34
See application file for complete search history.

(56) References Cited

U.S. PATENT DOCUMENTS 4,757,468 A 7/1988 Domenik et al.
4,760,526 A 7/1988 Takeda et al.
(Continued)

FOREIGN PATENT DOCUMENTS

CN 1729526 A 2/2006
CN 1957558 A 5/2007
(Continued)

OTHER PUBLICATIONS

Content Protection for Recordable Media Specification SD Memory Card Book Common Part, Revision 0.96, Nov. 26, 2001 4C Entity, LLC.*
(Continued)

*Primary Examiner* — Jason C Chiang
(74) *Attorney, Agent, or Firm* — Oblon, McClelland, Maier & Neustadt, L.L.P.

(57) ABSTRACT

According to one embodiment, an authenticator which authenticates an authenticatee, which stores first key information (NKey) that is hidden, includes a memory configured to store second key information (HKey) which is hidden, a random number generation module configured to generate random number information, and a data generation module configured to generate a session key (SKey) by using the second key information (HKey) and the random number information. The authenticator is configured such that the second key information (HKey) is generated from the first key information (NKey) but the first key information (NKey) is not generated from the second key information (HKey).

10 Claims, 34 Drawing Sheets

Related U.S. Application Data continuation of application No. 13/486,684, filed on Jun. 1, 2012, now Pat. No. 8,661,527, which is a continuation of application No. PCT/JP2012/058276, filed on Mar. 19, 2012.

(51) Int. Cl.
  *G06F 21/34* (2013.01)
  *H04L 9/08* (2006.01)
  *H04L 9/32* (2006.01)
  *H04L 9/14* (2006.01)

(52) U.S. Cl.
  CPC ........ *G06F 21/6218* (2013.01); *H04L 9/0816* (2013.01); *H04L 9/14* (2013.01); *H04L 9/3271* (2013.01); *H04L 2209/16* (2013.01); *H04L 2209/24* (2013.01)

(56) References Cited

U.S. PATENT DOCUMENTS

| | | | |
|---|---|---|---|
| 4,910,774 A | 3/1990 | Barakat | |
| 5,850,451 A | 12/1998 | Sudia | |
| 6,292,896 B1 | 9/2001 | Guski et al. | |
| 6,829,676 B2 | 12/2004 | Maeda et al. | |
| 6,950,379 B2 | 9/2005 | Yen et al. | |
| 6,978,021 B1* | 12/2005 | Chojnacki | H04L 9/083 380/202 |
| 7,065,648 B1 | 6/2006 | Kamibayashi et al. | |
| 7,240,157 B2 | 7/2007 | Frank et al. | |
| 7,266,695 B2 | 9/2007 | Nakayama | |
| 7,395,429 B2 | 7/2008 | Kitani et al. | |
| 7,484,090 B2* | 1/2009 | Ohmori | G11B 20/00086 713/158 |
| 7,533,276 B2 | 5/2009 | Matsushima et al. | |
| 7,545,934 B2 | 6/2009 | Fujiwara et al. | |
| 7,565,698 B2 | 7/2009 | Isozaki et al. | |
| 7,712,131 B1 | 5/2010 | Lethe | |
| 7,721,343 B2 | 5/2010 | Kato et al. | |
| 7,788,433 B2 | 8/2010 | Henry et al. | |
| 7,797,536 B1 | 9/2010 | Lyle | |
| 7,890,773 B2 | 2/2011 | Kasahara et al. | |
| 7,971,070 B2 | 6/2011 | Lotspiech et al. | |
| 7,979,915 B2 | 7/2011 | Nakano et al. | |
| 8,020,199 B2 | 9/2011 | Smith et al. | |
| 8,131,646 B2 | 3/2012 | Kocher et al. | |
| 8,260,259 B2 | 9/2012 | Semple et al. | |
| 8,261,130 B2 | 9/2012 | Mayer et al. | |
| 8,290,146 B2 | 10/2012 | Takashima | |
| 8,296,477 B1 | 10/2012 | Polk | |
| 8,321,924 B2 | 11/2012 | Lu et al. | |
| 8,336,096 B2 | 12/2012 | Narusawa et al. | |
| 8,364,881 B2 | 1/2013 | Urabe | |
| 8,370,611 B2 | 2/2013 | Choi et al. | |
| 8,381,062 B1 | 2/2013 | Juels et al. | |
| 8,488,785 B2 | 7/2013 | Patawaran et al. | |
| 8,510,548 B1 | 8/2013 | Markov et al. | |
| 8,583,943 B2 | 11/2013 | Dodd | |
| 8,644,509 B2 | 2/2014 | Paillier et al. | |
| 8,661,527 B2* | 2/2014 | Kato | H04L 9/0869 713/184 |
| 8,677,144 B2 | 3/2014 | Haider et al. | |
| 8,745,391 B2 | 6/2014 | Kato et al. | |
| 8,850,207 B2 | 9/2014 | Kato et al. | |
| 9,166,783 B2 | 10/2015 | Nagai et al. | |
| 2001/0021255 A1 | 9/2001 | Ishibashi | |
| 2002/0059518 A1 | 5/2002 | Smeets et al. | |
| 2002/0087814 A1* | 7/2002 | Ripley | G11B 20/00086 711/154 |
| 2002/0087871 A1 | 7/2002 | Ripley et al. | |
| 2002/0103964 A1 | 8/2002 | Igari | |
| 2002/0116632 A1 | 8/2002 | Itoh et al. | |
| 2003/0070082 A1 | 4/2003 | Nimura et al. | |
| 2003/0072444 A1 | 4/2003 | Hu et al. | |
| 2003/0105961 A1 | 6/2003 | Zatloukal et al. | |
| 2003/0142824 A1 | 7/2003 | Asano et al. | |
| 2003/0154355 A1 | 8/2003 | Fernandez | |
| 2003/0200411 A1 | 10/2003 | Maeda et al. | |
| 2003/0200450 A1 | 10/2003 | England et al. | |
| 2003/0221116 A1 | 11/2003 | Futoransky et al. | |
| 2004/0039924 A1 | 2/2004 | Baldwin et al. | |
| 2004/0133794 A1 | 7/2004 | Kocher et al. | |
| 2004/0190868 A1 | 9/2004 | Nakano et al. | |
| 2005/0038997 A1 | 2/2005 | Kojima et al. | |
| 2005/0039022 A1 | 2/2005 | Venkatesan et al. | |
| 2005/0086497 A1 | 4/2005 | Nakayama | |
| 2005/0128050 A1 | 6/2005 | Frolov et al. | |
| 2005/0182948 A1 | 8/2005 | Ducharme | |
| 2005/0183072 A1 | 8/2005 | Horning et al. | |
| 2005/0226416 A1 | 10/2005 | Fujiwara et al. | |
| 2005/0257243 A1 | 11/2005 | Baker | |
| 2005/0262347 A1 | 11/2005 | Sato et al. | |
| 2005/0283826 A1 | 12/2005 | Tahan | |
| 2006/0056623 A1 | 3/2006 | Gligor et al. | |
| 2006/0060065 A1* | 3/2006 | Abe | G06F 21/10 84/602 |
| 2006/0085644 A1* | 4/2006 | Isozaki | G06F 21/10 713/171 |
| 2006/0136749 A1 | 6/2006 | Satou et al. | |
| 2006/0141987 A1 | 6/2006 | De Groot | |
| 2007/0074050 A1 | 3/2007 | Camiel | |
| 2007/0100759 A1 | 5/2007 | Kasahara et al. | |
| 2007/0143838 A1 | 6/2007 | Milligan et al. | |
| 2007/0165860 A1 | 7/2007 | Handa et al. | |
| 2007/0174198 A1 | 7/2007 | Akihiro Kashara et al. | |
| 2007/0186110 A1 | 8/2007 | Takashima | |
| 2007/0198851 A1 | 8/2007 | Goto | |
| 2008/0098212 A1 | 4/2008 | Helms et al. | |
| 2008/0101604 A1 | 5/2008 | Kocher et al. | |
| 2008/0104709 A1 | 5/2008 | Averyt et al. | |
| 2008/0162938 A1 | 7/2008 | Struik | |
| 2008/0172427 A1 | 7/2008 | Ito | |
| 2008/0210747 A1 | 9/2008 | Takashima | |
| 2008/0228821 A1 | 9/2008 | Mick et al. | |
| 2008/0263362 A1* | 10/2008 | Chen | G06F 21/31 713/184 |
| 2008/0270796 A1 | 10/2008 | Suu et al. | |
| 2008/0294562 A1* | 11/2008 | Kasahara | H04L 9/0822 705/59 |
| 2009/0013196 A1* | 1/2009 | Ito | H04L 9/3236 713/193 |
| 2009/0086966 A1 | 4/2009 | Haruki et al. | |
| 2009/0106551 A1 | 4/2009 | Boren et al. | |
| 2009/0165123 A1 | 6/2009 | Giobbi | |
| 2009/0208003 A1 | 8/2009 | Matsukawa et al. | |
| 2009/0232314 A1 | 9/2009 | Kato et al. | |
| 2009/0249492 A1 | 10/2009 | Boesgaard Sorensen | |
| 2009/0313480 A1 | 12/2009 | Michiels et al. | |
| 2010/0008509 A1 | 1/2010 | Matsushita et al. | |
| 2010/0017626 A1* | 1/2010 | Sato | G06F 21/10 713/193 |
| 2010/0040231 A1* | 2/2010 | Jin | H04L 9/0833 380/255 |
| 2010/0107245 A1 | 4/2010 | Jakubowski et al. | |
| 2010/0146501 A1 | 6/2010 | Wyatt et al. | |
| 2010/0199129 A1 | 8/2010 | Kitani | |
| 2010/0268953 A1 | 10/2010 | Matsukawa et al. | |
| 2010/0275036 A1* | 10/2010 | Harada | G06F 21/10 713/189 |
| 2011/0055585 A1 | 3/2011 | Lee | |
| 2011/0131470 A1 | 6/2011 | Kambayashi et al. | |
| 2011/0145596 A1 | 6/2011 | Jordan et al. | |
| 2011/0222691 A1 | 9/2011 | Yamaguchi et al. | |
| 2011/0225089 A1 | 9/2011 | Hammad | |
| 2011/0246791 A1* | 10/2011 | Kambayashi | G06F 12/1408 713/193 |
| 2011/0271119 A1* | 11/2011 | Lin | G06F 21/78 713/189 |
| 2011/0276490 A1 | 11/2011 | Wang et al. | |
| 2011/0314304 A1 | 12/2011 | Braams | |
| 2012/0084418 A1 | 4/2012 | Miyamoto et al. | |
| 2012/0084555 A1 | 4/2012 | Smith | |

(56) References Cited

U.S. PATENT DOCUMENTS

| | | | |
|---|---|---|---|
| 2012/0137135 | A1 | 5/2012 | Kasahara et al. |
| 2012/0137137 | A1 | 5/2012 | Brickell et al. |
| 2012/0272065 | A1 | 10/2012 | Matsukawa et al. |
| 2012/0290814 | A1 | 11/2012 | Walker |
| 2012/0304281 | A1 | 11/2012 | Kang et al. |
| 2013/0042111 | A1 | 2/2013 | Fiske |
| 2013/0054961 | A1 | 2/2013 | Kato et al. |
| 2013/0159733 | A1 | 6/2013 | Lee et al. |
| 2013/0262877 | A1 | 10/2013 | Neve De Mevergnies et al. |

FOREIGN PATENT DOCUMENTS

| | | | |
|---|---|---|---|
| CN | 101084504 | A1 | 12/2007 |
| EP | 1 126355 | A1 | 8/2001 |
| EP | 1 983 466 | A2 | 10/2008 |
| EP | 1 983 466 | A3 | 10/2008 |
| JP | 63-29785 | | 2/1988 |
| JP | 63-70634 | | 3/1988 |
| JP | 3-171231 | A | 7/1991 |
| JP | 8-204702 | | 8/1996 |
| JP | 10-232918 | A | 9/1998 |
| JP | 2000-122931 | A | 4/2000 |
| JP | 2003-143128 | | 5/2003 |
| JP | 2003-233795 | A | 8/2003 |
| JP | 2004-30326 | A | 1/2004 |
| JP | 2005-316946 | | 11/2005 |
| JP | 2005-341156 | A | 12/2005 |
| JP | 2006-172147 | A | 6/2006 |
| JP | 2007-208897 | | 8/2007 |
| JP | 2007-525748 | A | 9/2007 |
| JP | 2008-22367 | A | 1/2008 |
| JP | 2008-35397 | A | 2/2008 |
| JP | 2008-506317 | | 2/2008 |
| JP | 2008-84445 | A | 4/2008 |
| JP | 2008-269088 | A | 11/2008 |
| JP | 2009-87497 | A | 4/2009 |
| JP | 2009-100394 | A | 5/2009 |
| JP | 2009-105566 | | 5/2009 |
| JP | 2009-543244 | | 12/2009 |
| JP | 2010-28485 | A | 2/2010 |
| JP | 2010-140470 | | 6/2010 |
| JP | 2010-183278 | A | 8/2010 |
| JP | 2010-267240 | A | 11/2010 |
| JP | 2010-267540 | A | 11/2010 |
| JP | 2010-268417 | A | 11/2010 |
| JP | 2010-287005 | A | 12/2010 |
| JP | 2001-209305 | A | 8/2011 |
| JP | 2011-209802 | | 10/2011 |
| JP | 2011-215983 | | 10/2011 |
| JP | 2012-14416 | A | 1/2012 |
| TW | I266190 | | 2/2004 |
| WO | WO 01/11883 | A1 | 2/2001 |
| WO | WO 02/33521 | A2 | 4/2002 |
| WO | WO 02/33521 | A3 | 4/2002 |
| WO | WO 03/048938 | A1 | 6/2003 |
| WO | WO 2007/028099 | A2 | 3/2007 |
| WO | WO 2010/035449 | A1 | 4/2010 |
| WO | WO 2011/064883 | A1 | 6/2011 |

OTHER PUBLICATIONS

"Media Identifier Management Technology Specification", issued by 4C Entity, LLC., Sep. 27, 2010, http://www.4centify.com, 26 pages.
"Content Protection for Recordable Media Specification", issued by 4C Entity, LLC., Jan. 17, 2003, http://www.4centity.com, 31 pages.
International Search Report and Written Opinion dated Aug. 16, 2012 in PCT/JP2012/058276.
Office Action dated Oct. 16, 2012 in Japanese Patent Application No. 2011-265281 with English language translation.
International Search Report and Written Opinion dated Nov. 22, 2012 in PCT/JP2012/065938, filed Jun. 15, 2012.
International Search Report and Written Opinion dated Nov. 22, 2012 in PCT/JP2012/065934 filed Jun. 15, 2012.
Content Protection for Recordable Media Specification SD Memory Card Book Common Part, Revision 0.96, Nov. 26, 2001, 4C Entity, LLC.
Japanese Office Action dated Nov. 27, 2012 in Patent Application No. 2011-265281 with English Translation.
Japanese Office Action dated Nov. 20, 2012 in Patent Application No. 2011-248056 with English Translation.
David Hoff et al., "System and Software Security via Authentication Handshake in EPROM", 1985 Proceedings of the National Computer Conference, The Internet, URL:http://www.computer.org/csdl/proceedings/afips/1985/5092/*00/50920203-abs.html, vol. 54, 1985 pp. 203-209 and cover pages.
English translation of the International Preliminary Report on patentability dated Apr. 25, 2013, in PCT/JP2011/062860 filed May 30, 2011.
Office Action dated Oct. 16, 2012 in Japanese Patent Application No. 2011-265289 with English language translation.
International Search report and Written Opinion dated Nov. 22, 2012 in PCT/JP2012/065935 filed Jun. 15, 2012.
International Search report and Written Opinion dated Nov. 22, 2012 in PCT/JP2012/065932 filed Jun. 15, 2012.
"Content Protection for Recordable Media Specification: SD Memory Card Book Common Part", issued by 4C Entity LLC, www.4 centity.com, Revision 0.97, Dec. 15, 2010, 20 pages.
"Content Protection for Recordable Media Specification: Introduction and Common Cryptographic Elements", 4C Entity, LLC, http://www.4centity.com, Revision 1.1, Dec. 15, 2010, 38 pages.
"Content Protection for eXtended Media Specification", Revision 0.85 Preliminary Release, 4C Entity, LLC, http://www.4CEntity.com, Sep. 27, 2010, 16 pages.
"Content Protection for Prerecorded Media Specification: Introduction and Common Cryptographic Elements", Revision 1.0, 4C Entity, Jan. 17, 2003, 25 pages.
"Content Protection for eXtended Media Specification: SD Memory Card Book Common Part", Revision 0.85 Preliminary Release, 4C Entity, Sep. 27, 2010, 38 pages.
"Next Generation Secure Memory", www.nextgenerationsecurememory.com, Mar. 2012, 9 pages.
Dalit Naor et al., "Revocation and Tracing Schemes for Stateless Receivers", Proc. CRYPTO 2001, LNCS 2139, Springer-Verlag, 2001, pp. 41-62.
Kocher, P., et al., "Self-Protecting Digital Content—A Technical Report From the CRI Content Security Research Initiative," Cryptography Research, Inc., http://www.cryptoqraphy.com/public/pdf/selfprotectingcontent.pdf, 2003, pp. 1-14.
"Introduction and Common Cryptographic Elements Book," Advanced Access Content System (AACS), Revision 0.953. http://www.aacsla.com/specifications, Oct. 26, 2012, Total 102 pages.
"Pre-recorded Video Book," Advanced Access Content System (AACS), Revision 0.952, http://www.aacsla.com/specifications. Jul. 14, 2011, Total 86 pages.
International Search Report dated Jun. 28, 2011 in PCT/JP11/62860 filed May 30, 2011.
"Prepared Video Book," Advanced Access Content System (AACS), Revision 0.953, http://www.aacsla.com/specifications, Oct. 26, 2012, Total 45 pages.
"Recordable Video Book," Advanced Access Content System (AACS), Revision 0.953, http://www.aacsla.com/specifications, Oct. 26, 2012, Total 22 pages.
"Blu-ray Disc Pre-recorded Book," Advanced Access Content System (AACS), Revision 0.953, http://www.aacsla.com/specifications, Oct. 26, 2012, Total 173 pages.
"Blu-ray Disc Prepared Video Book," Advanced Access Content System (AACS), Revision 0.953, http://www.aacsla/com/specifications, Oct. 26, 2012, Total 59 pages.
"Blu-ray Disc Recordable Book," Advanced Access Content System (AACS), Revision 0.953. http://www.aacsla/com/specifications, Oct. 26, 2012, Total 61 pages.
"HD DVD and DVD Pre-corded Book", Advanced Access Content System (AACS), Revision 0.953, http://www.aacsla.com/specifications, Oct. 26, 2012, Total 154 pages.

(56) References Cited

OTHER PUBLICATIONS

"HD DVD and DVD Prepared Video Book," Advanced Access Content System (AACS), Revision .953, http://www.aacsla.com/specificiations, Oct. 26, 2012, Total 43 pages.
English Translation of the Written Opinion of the International Searching Authority dated Jun. 28, 2011, in PCT/JP2011/062860, filed May 30, 2011.
"HD DVD and DVD Recordable Book," Advanced Access Content System (AACS), Revision 0.953, http://www..aacsla.com/specifications, Oct. 26, 2012, Total 65 pages.
"Signed CSS Book," Advanced Access Content System (AACS), Revision 0.953, http://www.aacsla.com/specifications, Oct. 26, 2012, Total 18 pages.
"Introduction and Common Cryptographic Elements," Advanced Access Content System (AACS), Revision 0.91, http://www.aacsla.com/specifications, Feb. 17, 2006, Total 82 pages.
"Recordable Video Book," Advanced Access Content System (AACS), Revision 0.91, http://www.aacsla.com/specifications, Total 23 pages (Feb. 17, 2006).
"CBHD Pre-recorded Book," Advanced Access Content System (AACS), Revision 0.90, http://www.aacsla.com/specificaitons, Total 91 pages. (Oct. 7, 2008).
"Blu-ray Disc Pre-recorded Book," Advanced Access Content System (AACS), Revision 0.921, http://www.aacsla.com/specifications, Total 117 pages, (Jun. 6, 2008).
"HD DVD and DVD Pre-recorded Book," Advanced Access Content System (AACS), Revision 0.912, http://www.aacsla/specificaitons, Total 166 pages, (Aug. 15, 2006).
"HD DVD and DVD Recordable Book," Advanced Access Content System (AACS), Revision 0.921, http://wwaacsla.com/specifications, Total 59 pages, (Jul. 25, 2009).
"Blu-ray Disc Recordable Book," Advanced Access Content System (AACS), Revision 0.921, http://www.aacsla.com/specifications, Total 55 pages, (Aug. 5, 2008).
"Pre-recorded Video Book," Advanced Access Content System (AACS), Revision 0.92, http://www.aacsla.com/specifications, Total 61 pages, (Nov. 29, 2007).
International Search Report and Written Opinion dated Nov. 22, 2012 in PCT/JP2012/065933, filed Jun. 15, 2012.
International Search Report and Written Opinion dated Nov. 22, 2012 in PCT/JP2012/065937, filed Jun. 15, 2012.
International Preliminary Report on Patentability and Written Opinion dated Mar. 13, 2014 in Application No. PCT/JP2012/058276.
Japanese Office Action dated Apr. 15, 2014, in Japan Patent Application No. 2013-032349 (with English translation).
Alfred J. Menezes, et al., "Handbook of Applied Cryptography", CRC Press LLC, 1997, pp. 42, 192, 226, 227 and 246.
International Preliminary Report on Patentability and Written Opinion dated Jun. 12, 2014, in International Application No. PCT/JP2012/065933 (English Translation).
International Preliminary Report on Patentability and Written Opinion dated May 22, 2014, in International Application No. PCT/JP2012/065937 (English translation).
Office Action dated Jul. 27, 2015 in Chinese Patent Application No. 201280037800.X (with English translation).
Combined Office Action dated Dec. 1, 2015 in Chinese Patent Application No. 201280053234.1(with English translation and English translation of category of cited documents).
Combined Chinese Office Action and Search Report dated Dec. 28, 2015 in Patent Application No. 201280051737.5 (with English language translation).
Combined Chinese Office Action and Search Report dated Feb. 2, 2016 in Patent Application No. 201280053310.9 (with English language translation).

\* cited by examiner

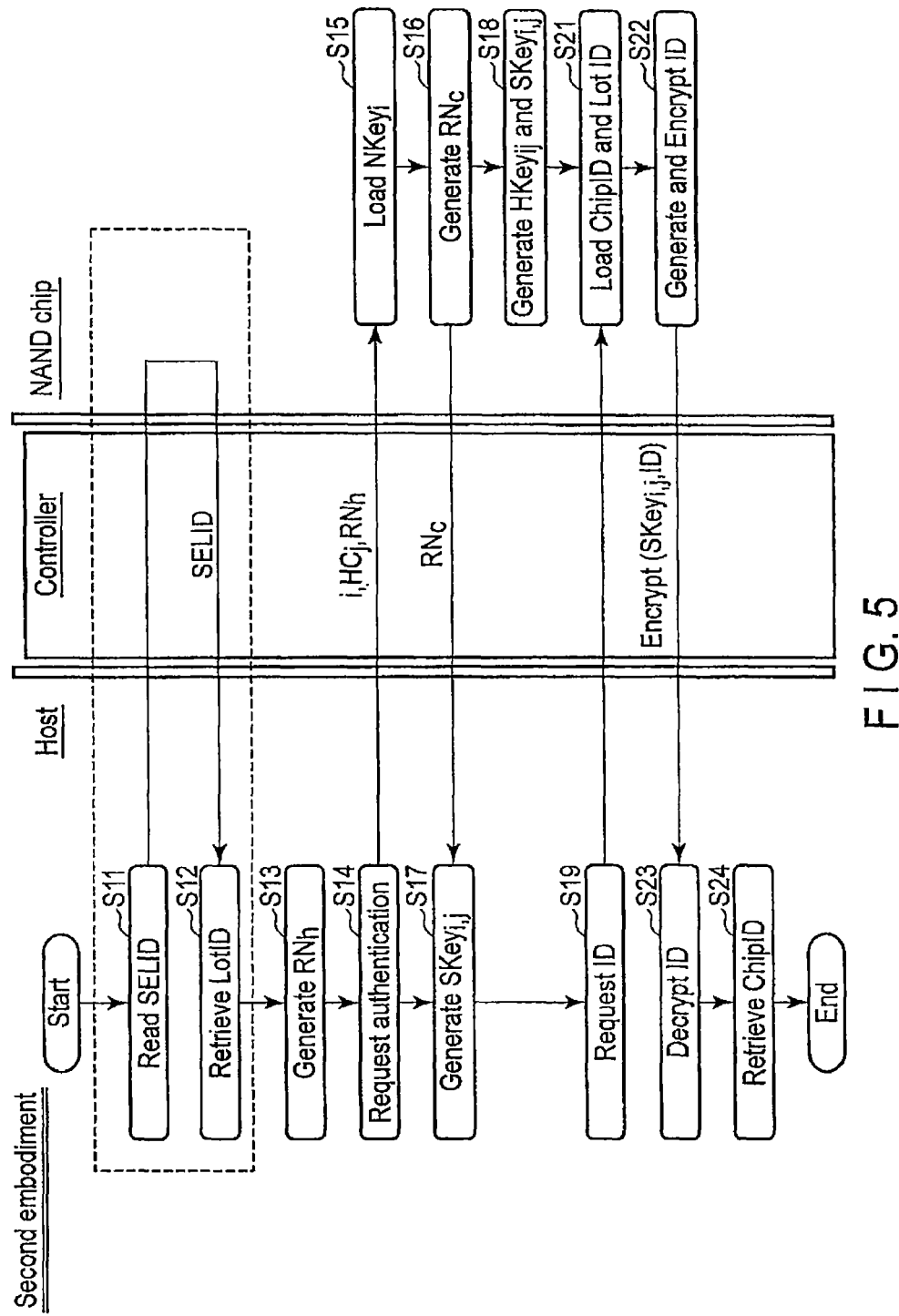
F I G. 5

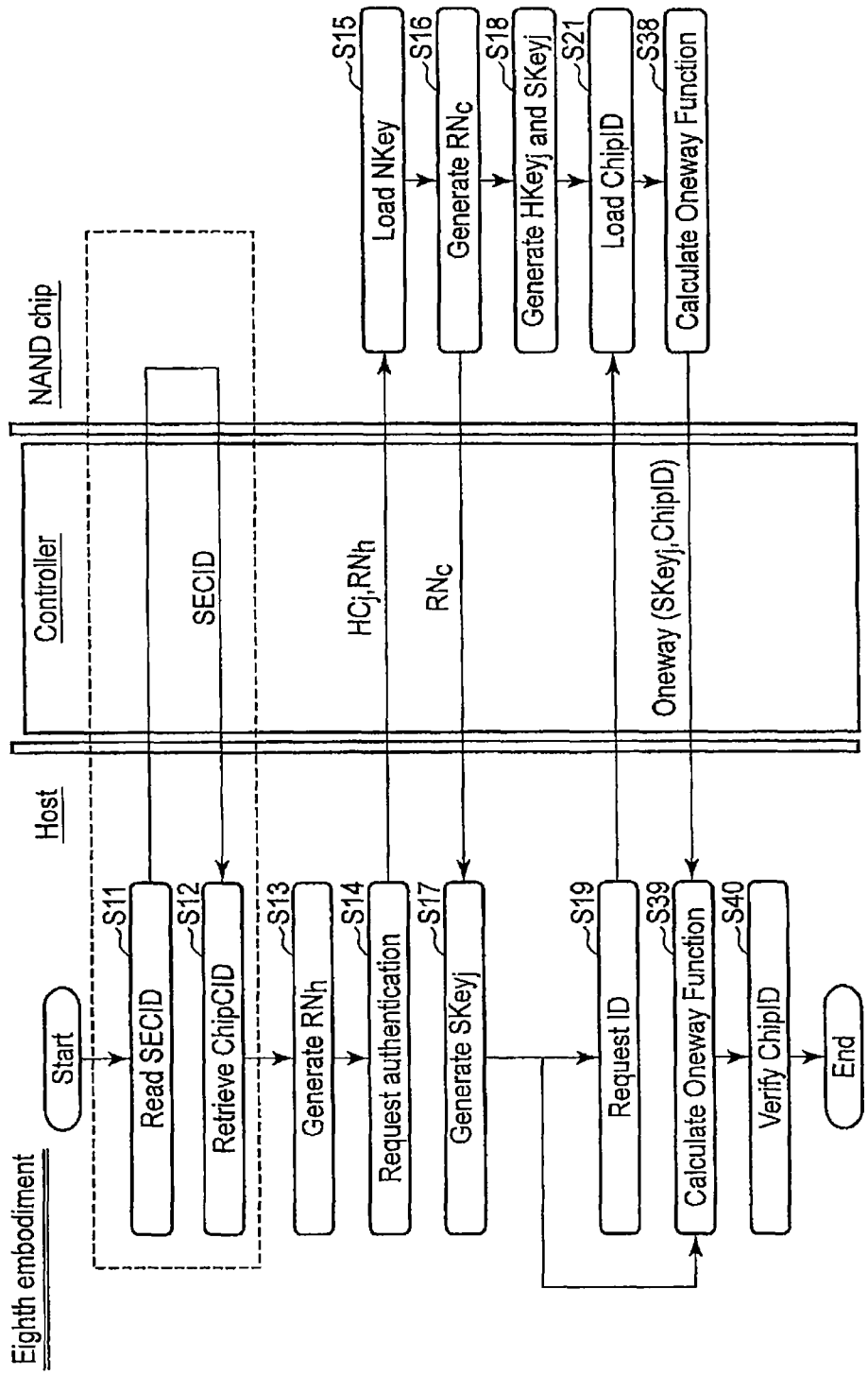
F I G. 19

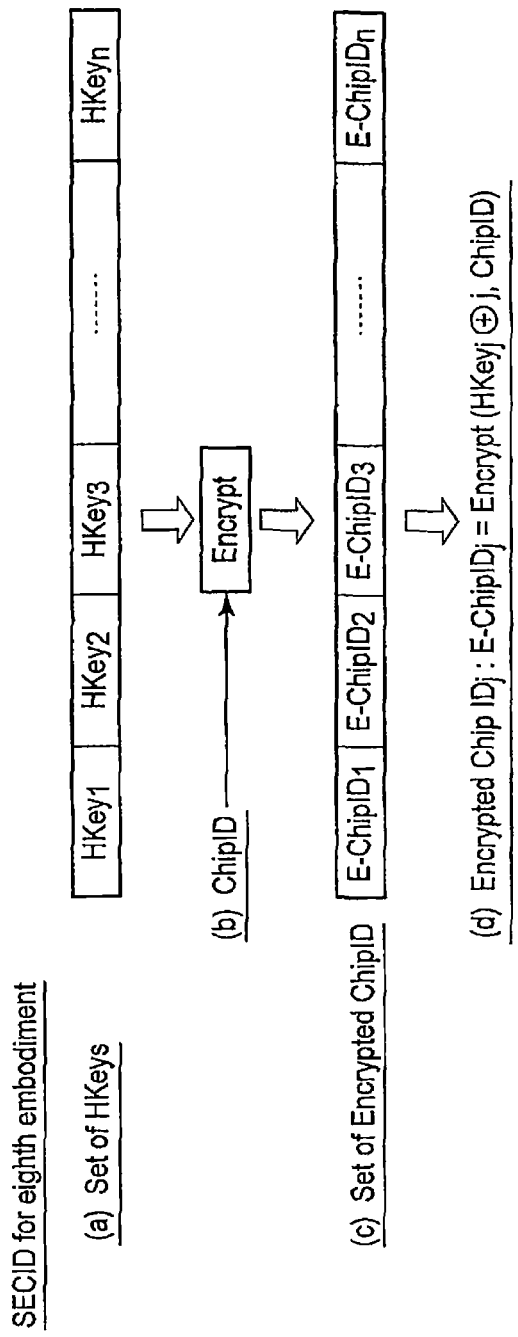
F I G. 20

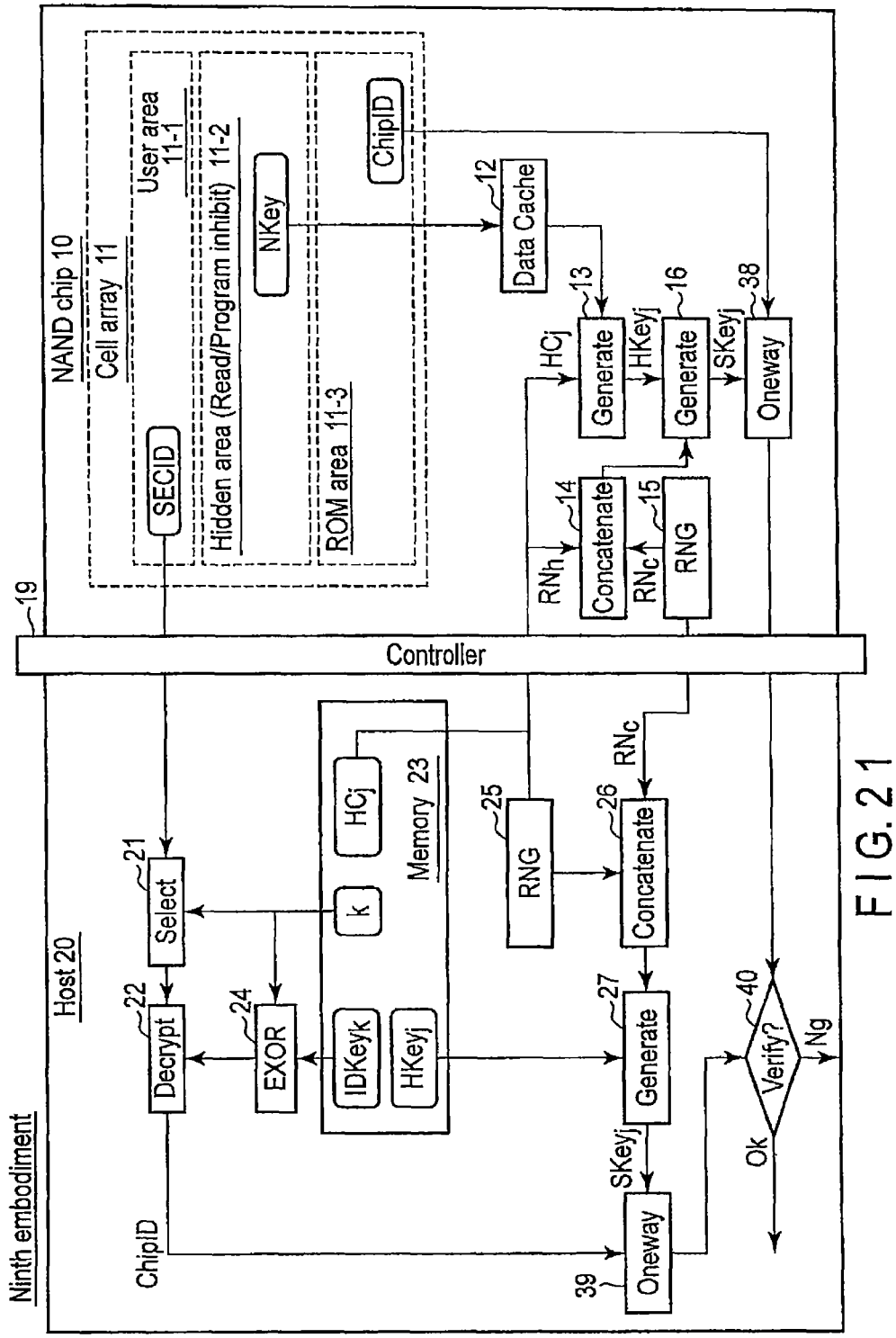
F I G. 21

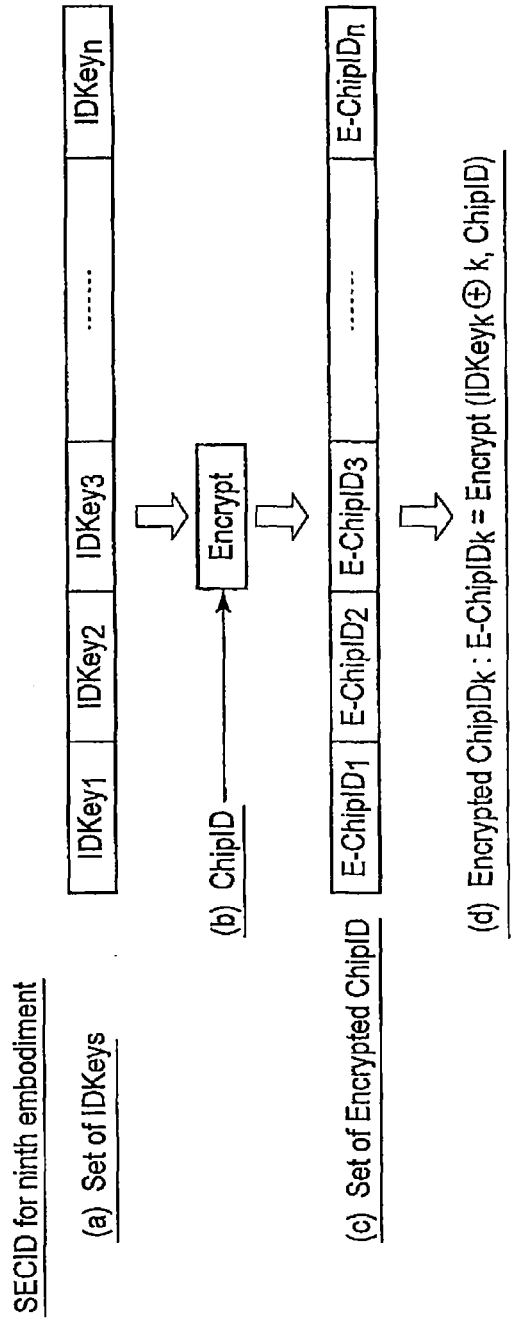
F I G. 23

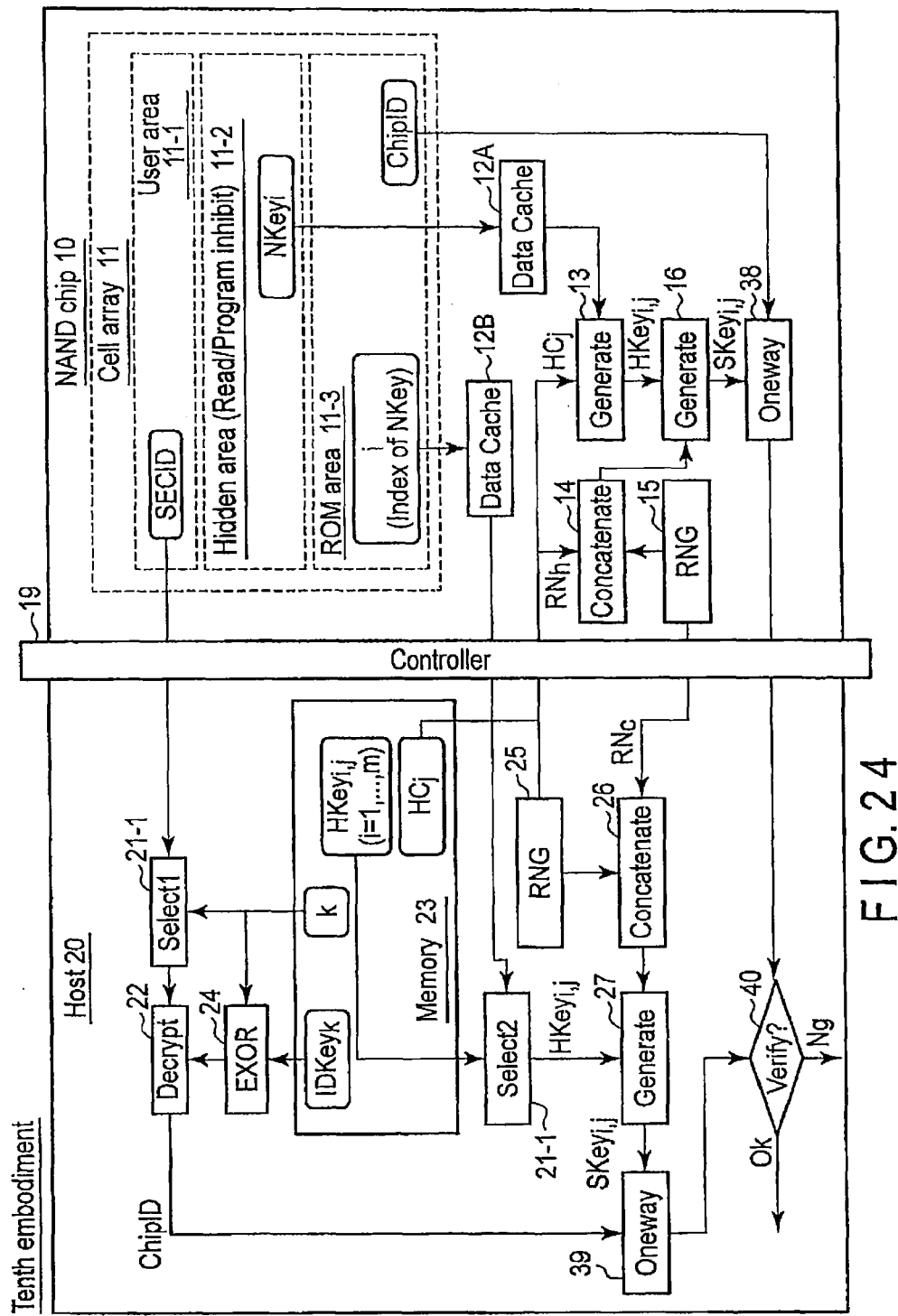
F I G. 24

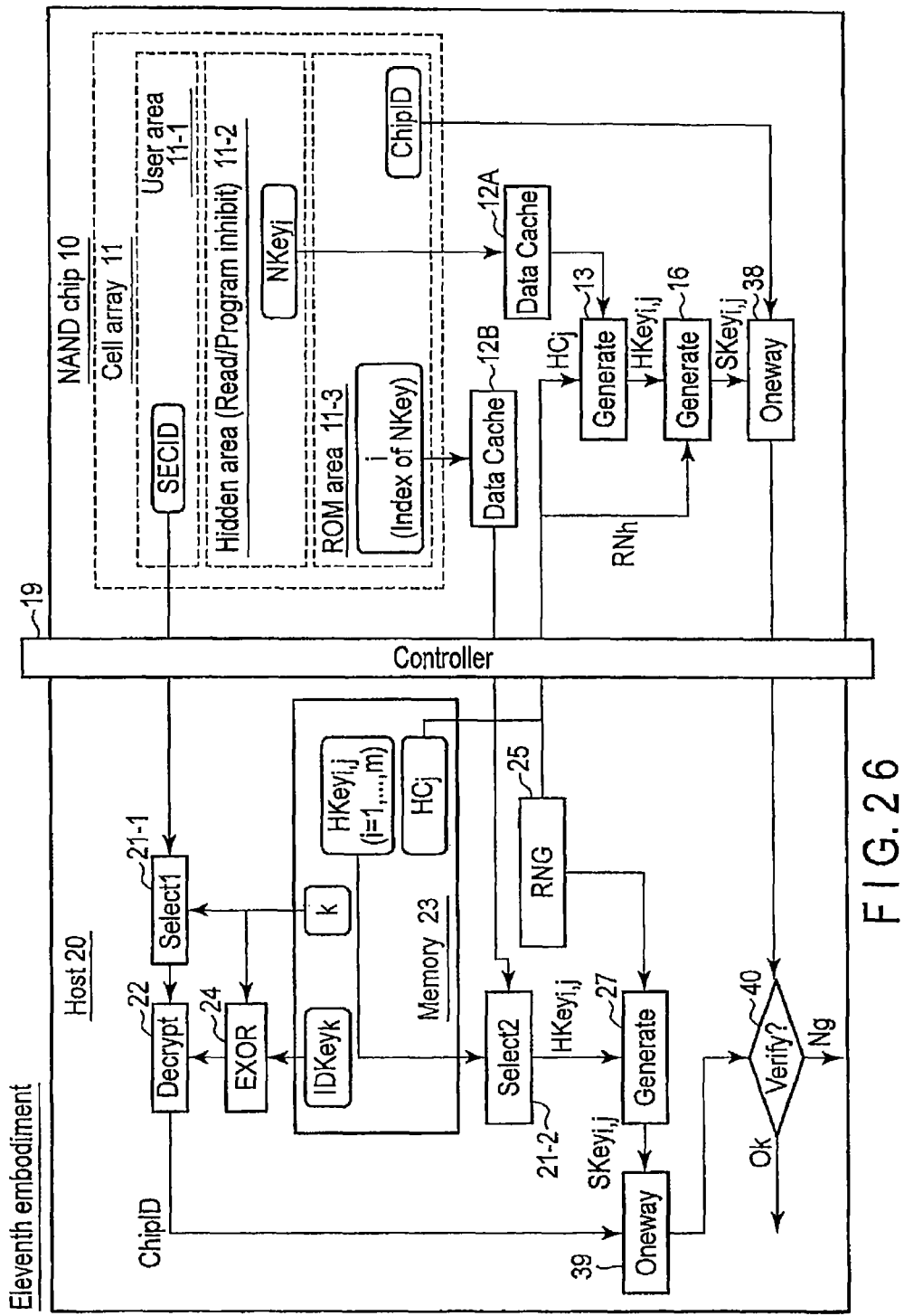
F I G. 26

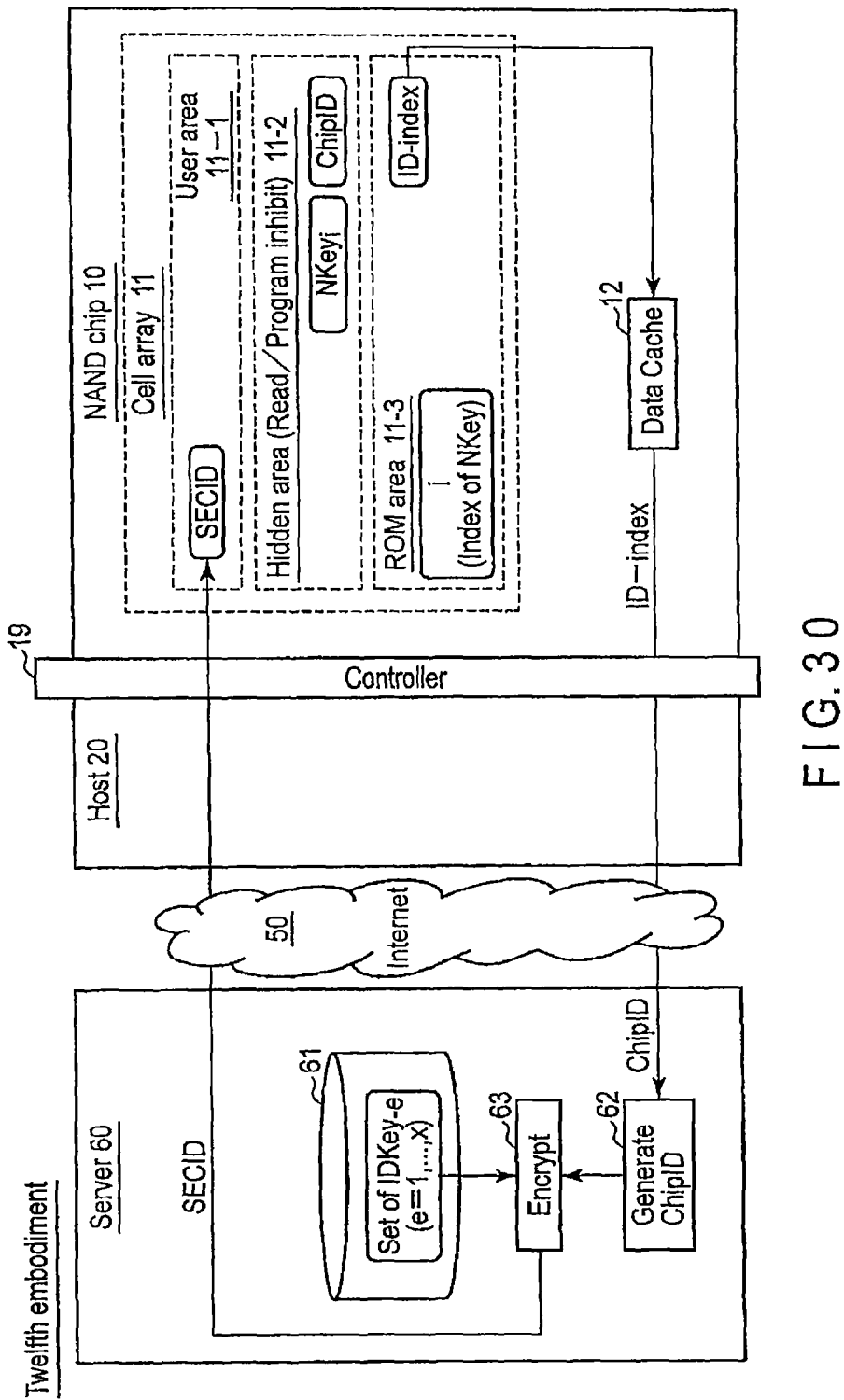
F I G. 30

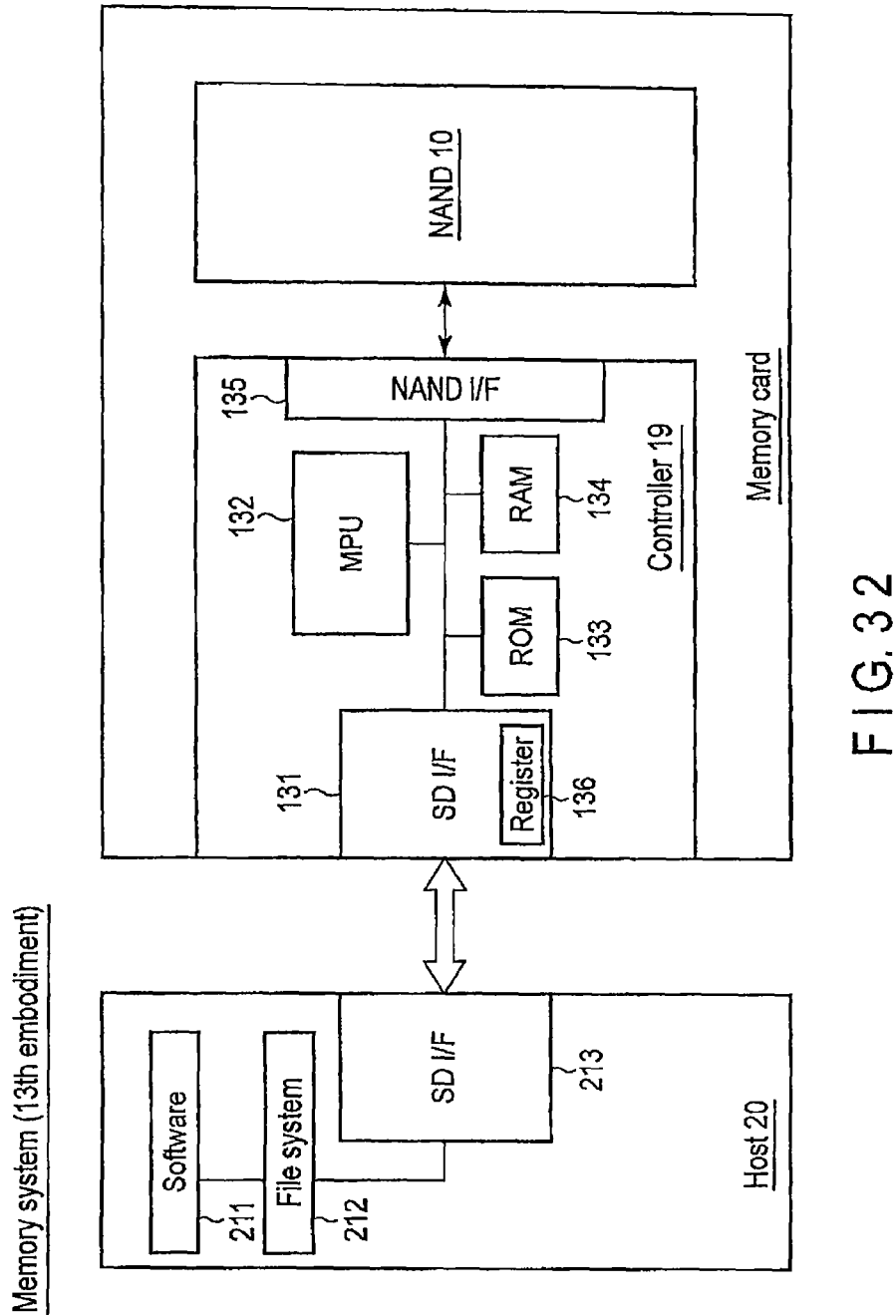
F I G. 32

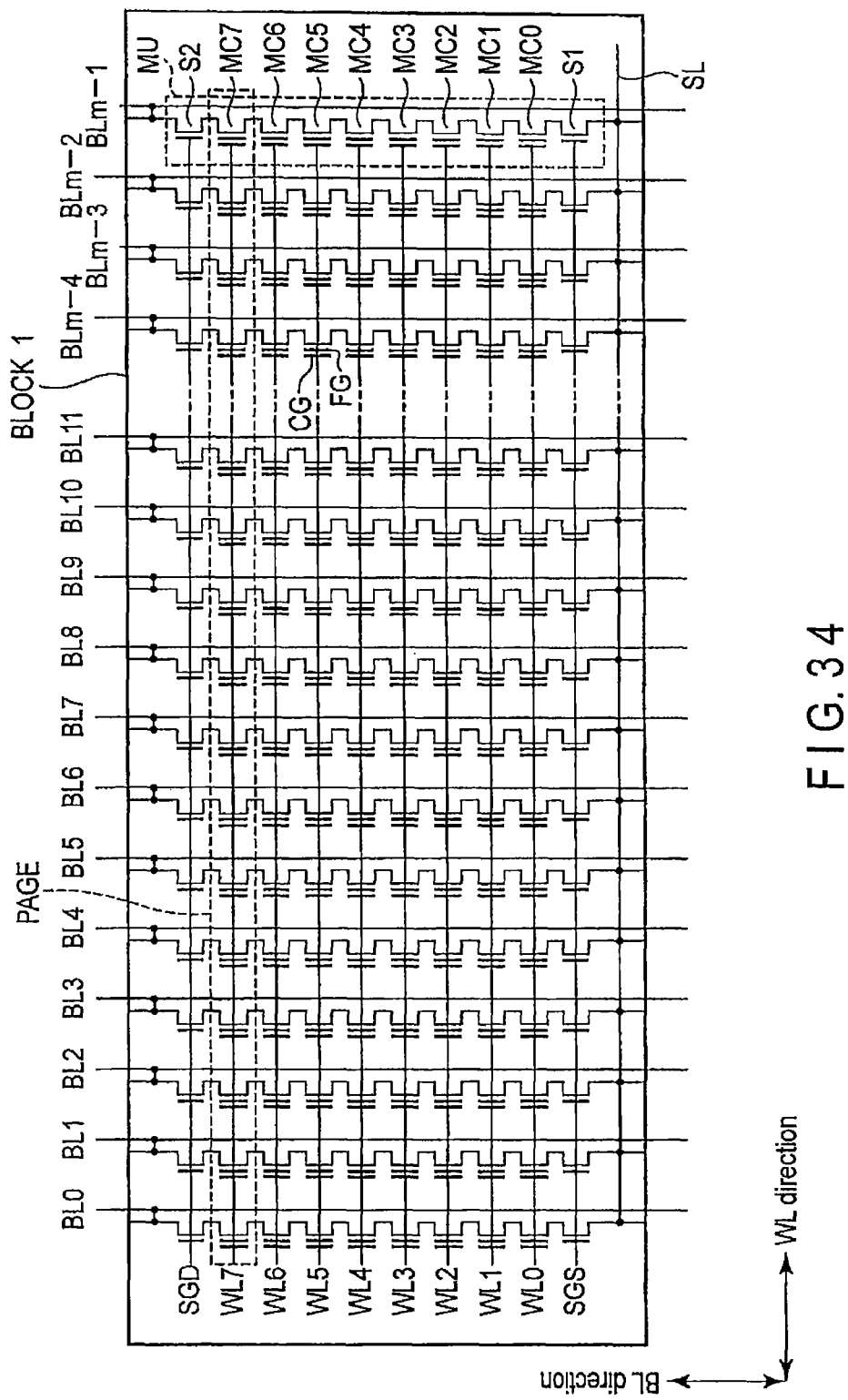
F I G. 34

AUTHENTICATOR, AUTHENTICATEE AND AUTHENTICATION METHOD

CROSS REFERENCE TO RELATED APPLICATIONS

This application is a continuation Application of U.S. Ser. No. 14/090,740, filed Nov. 26, 2013 which is a continuation of U.S. Ser. No. 13/486,684, filed Jun. 1, 2012 (now U.S. Pat. No. 8,661,527) which is a continuation of PCT Application No. PCT/JP2012/058276, filed Mar. 19, 2012 and based upon and claiming the benefit of priority from prior Japanese Patent Application No. 2011-189979, filed Aug. 31, 2011, the entire contents of each of which are incorporated herein by reference.

FIELD

Embodiments described herein relate generally to an authenticator, an authenticatee and an authentication method.

BACKGROUND

In general, in fields which require information security, a method using mutually shared information and an encryptor, is adopted as means for certifying one's own authenticity.

For example, in an IC card (SmartCard), etc., which are used for electronic settlement, an ID and secret information for individualizing the IC card are stored in an IC in the card, and the IC card has a cipher processing function for executing authentication based on the ID and secret information. In another example, an authentication method is specified in Content Protection for Recordable Media (CPRM) as means for certifying authenticity of an SD® card in protection of copyrighted contents.

When a security system for, e.g. authentication is constructed, it is necessary to assume a case in which a device which executes the process of the authentication is attacked, and hidden information is extracted. It is important to revoke the extracted hidden information. In the above-described CPRM or in Advanced Access Content System (AACS) that is a protection technique specified for protecting content recorded in a Blu-ray Disc, use is made of Media Key Block (MKB) for revoking a device key that is hidden information. In another method adopting a protocol based on public key cryptosystem, use is made of a list (Revocation List) of a public key certificate, which is paired with leaked private key information.

Taking, as an example, a system of playing back video data, which is recorded in an SD® card, by video playback software that is installed in a PC, a CPRM process is implemented in the SD® by hardware, and it is very difficult to unlawfully extract hidden information. Compared to this, in many cases, it is easier to extract hidden information from the playback software as a method of an attack. Actually, many software items for unlawfully decoding protected DVD or Blu-ray video content have been available. In such unlawful software, hidden information, which is extracted from an authentic software player, is utilized.

In addition, in some cases, it is necessary to take countermeasures against card-falsifying software or a false SD card. For example, an imitative SD® card in disguise is produced by using hidden information extracted from software, thereby to deceitfully use an authentic software player. For instance, a false SD® card is produced such that an encryption key, which was used in encryption of content, can be easily read out from the false SD® card. Thereby, it becomes possible to easily decode the video content recorded in the false SD® card, by using an authentic video recorder.

An authenticator may be provided not only as a dedicated hardware device such as a consumer device, but also as a program (software) which is executable in a PC (personal computer) or the like, and, in some cases, the software functions as a substantial authenticator. On the other hand, an authenticatee is, for instance, recording media or the like. Even in the case where a program called "firmware" mediates in the operation of hardware which constitutes the recording media, an important process or information is stored in a hidden state in hardware in the cell array. Thus, in reality, for example, in the case where software which is executed on the PC is the authenticator, there is concern that the tamper-resistance (the resistance to attacks) becomes lower, compared to the authenticatee such as recording media.

Thus, there is concern that, by attacking an authenticator with a low tamper-resistance, secret information hidden in an authenticatee with a high tamper-resistance is also exposed, leading to a disguise as a device with a high tamper-resistance. As described above, there is a trend that a demand is increasing for the prevention of unlawful use of secret information.

In addition, in recent years, such a demand is strong even in an environment in which restrictions are also imposed on circuit scales, for example, in an environment in which hardware implementation of a public key cryptosystem process or an MKB process, which requires a relatively large circuit scale, is difficult to achieve.

BRIEF DESCRIPTION OF THE DRAWINGS

FIG. 5 is a flow chart illustrating an authentication flow of the memory system according to the second embodiment;

FIG. 19 is a flow chart illustrating an authentication flow of the memory system according to the eighth embodiment;

FIG. 20 is a view illustrating a structure example of a Set of Encrypted ChipID set (SECID) in the eighth embodiment;

FIG. 21 is a block diagram illustrating a structure example of a memory system according to a ninth embodiment;

FIG. 23 is a view illustrating a structure example of a Set of Encrypted ChipID set (SECID) in the ninth embodiment;

FIG. 24 is a block diagram illustrating a structure example of a memory system according to a tenth embodiment;

FIG. 26 is a block diagram illustrating a structure example of a memory system according to an eleventh embodiment;

FIG. 30 is a block diagram illustrating a system of downloading the SECID in the twelfth embodiment;

FIG. 32 is a block diagram illustrating a memory system according to a 13th embodiment;

FIG. 34 is an equivalent circuit diagram showing a block (BLOCK) in the 14th embodiment.

DETAILED DESCRIPTION

Figure 1:
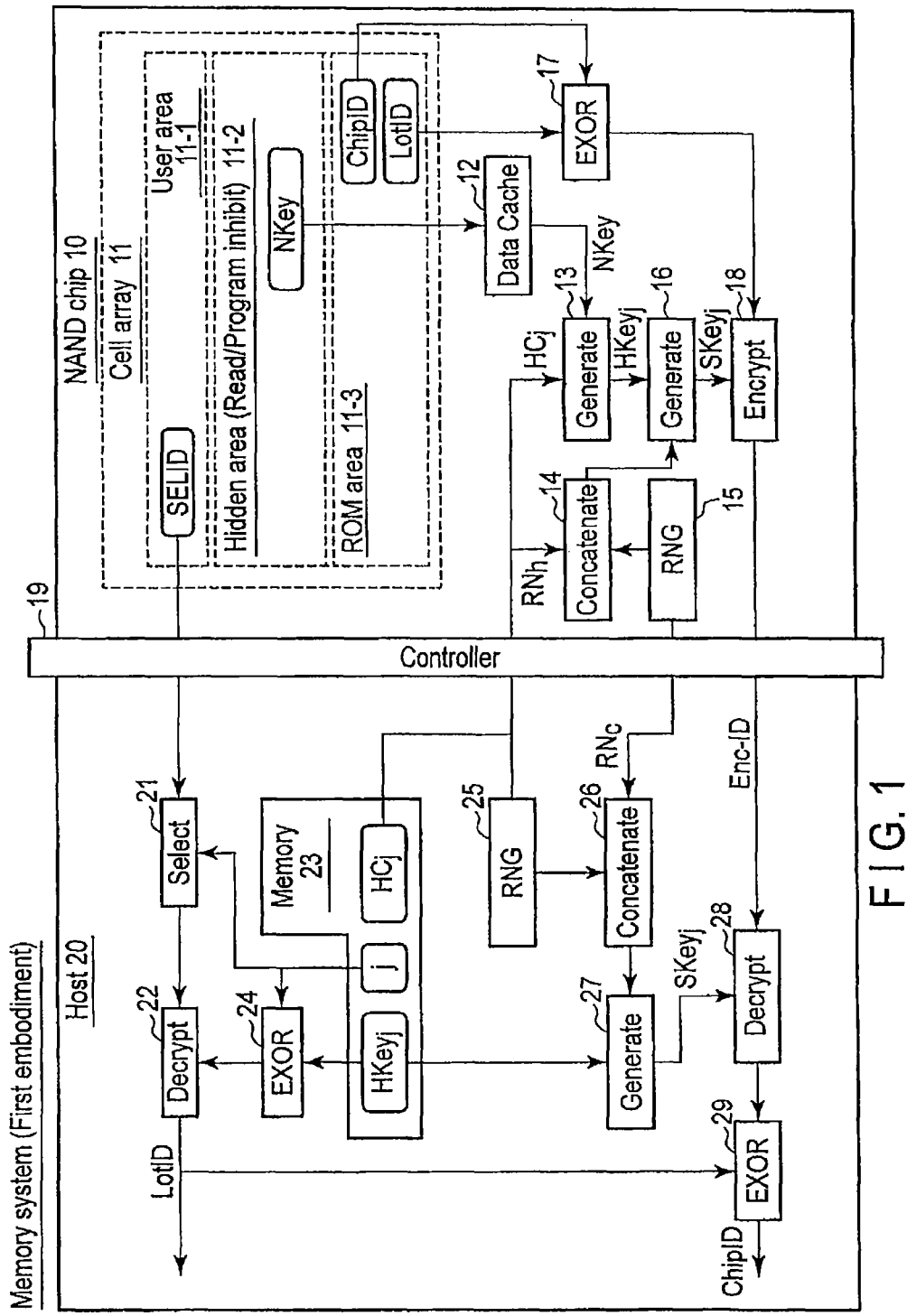
FIG. 1 is a block diagram showing a structure example of a memory system according to a first embodiment.

In general, according to one embodiment, an authenticator which authenticates an authenticatee, which stores first key information (NKey) that is hidden, includes a memory configured to store second key information (HKey) which is hidden; a random number generation module configured to generate random number information; and a data generation module configured to generate a session key (SKey) by using the second key information (HKey) and the random number information. The authenticator is configured such that the second key information (HKey) is generated from the first key information (NKey) but the first key information (NKey) is not generated from the second key information (HKey).

Embodiments will now be described with reference to the accompanying drawings. In the description below, common parts are denoted by like reference numerals throughout the drawings.

First Embodiment

A description is given of an authenticator, an authenticatee and an authentication method according to a first embodiment.

1. Structure Example (Memory System)

To begin with, referring to FIG. 1, a structure example of a memory system according to the first embodiment is described.

As shown in FIG. 1, the memory system according to the first embodiment includes a NAND flash memory 10 which is an authenticatee, a host device 20 which is an authenticator, and a controller 19 which mediates between both. The host device 20 accesses the NAND flash memory 10 via the controller 19.

A fabrication process of a semiconductor product, such as NAND flash memory 10, is described in brief. The fabrication process of a semiconductor product is mainly divided into a pre-process of forming a circuit on a substrate wafer, and a post-process of dicing the wafer into pieces and performing wiring and resin package sealing. In this case, the controller 19 is variously configured, for example, such that the controller 19 is included in the NAND flash memory 10 in the pre-process, the controller 19 is not included in the pre-process but is included in the same package in the post-process, or the controller 19 is formed as a chip which is different from the NAND flash memory 10. In the Figures including FIG. 1, the case is described, by way of example, in which the controller 19 is formed as a chip different from the NAND flash memory 10. In the description below, unless otherwise specified, the controller 19 mediates, in many cases, in the transactions of data and instructions between the host device 20 and NAND flash memory 10. Even in this case, the controller 19 does not change the substantial contents of the above-described data and instructions, so a description of the details will be omitted in some cases. Structure examples of the NAND flash memory 10 and controller 19 will be described later in detail.

When the host device 20 is constructed by dedicated hardware, like a consumer device, it is thinkable that the host device 20 is composed of a combination of dedicated hardware and firmware that operates the hardware, and that the function of the device is constructed by a software program which operates on the PC.

The respective components shown in FIG. 1 and data processing will be described below. This embodiment illustrates a method of reading out identification information, such as ChipID or LotID, which is recorded in the NAND flash memory 10 that is the authenticatee, in the state in which the identification information is hidden from a third party, and surely confirming the data that is read out from the authenticatee 10, and shows a structure example in the case where this method is applied to the NAND flash memory 10.

1-1. NAND Flash Memory

Next, the NAND flash memory 10 that is an authenticatee is described.

The NAND flash memory 10 according to this example includes a cell array 11, a data cache 12 which is disposed in a peripheral area of the cell array 11, data generation modules (Generate) 13 and 16, a data concatenation module (Concatenate) 14, a random number generator (RNG) 15, an exclusive-OR module (EXOR) 17, and an encryptor (Encrypt) 18.

In the cell array (Cell array) 11, a plurality of memory cells are arranged in a matrix at intersections between bit lines and word lines (not shown). The memory cell includes, in the named order on a semiconductor substrate, a tunnel insulation film, a floating gate, an interlayer insulation film, and a control gate connected to the word line. Current paths of memory cells in the bit line direction are connected in series, thereby constituting a cell unit. The cell unit is selected by a select transistor which is connected to the bit line and a source line. A plurality of memory cells in the word line direction constitute 1 page (Page) which is a unit of data read and data write. In addition, a plurality of pages constitutes a block (Block) which is a unit of data erase.

The cell array (Cell array) 11 includes a user area (User area) 11-1, a hidden area (Hidden area) 11-2 and a ROM area (ROM area) 11-3.

The user area (User area) 11-1 is an area in which data write and data read can be freely executed. In the user area 11-1, for example, SELID (Set of Encrypted LotID), which is an encrypted LotID set, is recorded. In addition, content data, such as photos, video, music or e-books, are recorded in the user area 11-1. The structure of the SELID in this embodiment will be described later with reference to FIG. 3.

The hidden area (Hidden area) 11-2 is an area in which the outside of the NAND flash memory 10 is prohibited from data write, and in which data read is prohibited (Read/Program inhibit). In the hidden area 11-2 according to this example, NKey (first key information), which is secret information that is used by the NAND flash memory 10 in the authentication, is recorded. As will be described later, second key information (HKey) is generated from the first key information (NKey). On the other hand, such configuration is adopted that the first key information (NKey) cannot be generated from the second key information (HKey).

The ROM area (ROM area) 11-3 is an area in which data write from the outside is prohibited and data read from the outside is permitted. In the ROM area 11-3 according to this example, a chip ID (ChipID) and a lot ID (LotID), which are identification information, are recorded. When ChipID and LotID are to be recorded, the ChipID and LotID are recorded, in general, in the state in which the ChipID and LotID are error-correction-encoded, so that the correct identification information may be read out even when an error has occurred in the data. The error-correction encoding/decoding is not particularly illustrated. The chip ID (ChipID) is a unique ID which is allocated to the NAND flash memory 10 on a chip-by-chip basis. The lot ID (LotID) is an ID which is allocated to each group of a certain number of chips in the manufacturing process of NAND flash memories 10. For example, it is thinkable that the LotID is changed between groups each comprising a predetermined number of chips, e.g. one million chips, or the LotID is changed at predetermined time intervals of manufacture, such as one month or a half year. In the case where the ChipID and LotID are to be always hidden from the outside, the ChipID and LotID may be recorded in the above-described hidden area, in place of the ROM area.

The above-described ROM area 11-3, hidden area 11-2 and user area 11-1 may be realized by making physical structures different, or may be realized by logical control within the NAND flash memory 10, with the physical structure being the same. In this case, the logical control is, for example, such a method that the respective areas are provided with identifiers which control access from the outside of the NAND flash memory 10, these identifiers are stored, and access control is executed by the identifiers when the NAND flash memory 10 has accepted access to the areas from the outside.

In addition, each of the memory cells constituting the cell array (Cell array) 11 may be a memory cell which stores a plurality of bits (MLC: Multi Level Cell) or a memory cell which stores 1 bit (SLC: Single Level Cell). Further, the ROM area 11-3 and hidden area 11-2 may be configured to be used by the SLC, and the user area 11-1 may be configured to be used by the MLC. At this time, the physical structure of the cell array may be different between the SLC area and the MLC area, or only partial bits of the memory cell, which is usable as the MCL, may be utilized as a pseudo-SLC area.

The data cache (Data cache) 12 temporarily stores data which has been read out from the cell array 11.

Each of the data generation modules (Generate) 13, 16 is a module which generates output data by a predetermined calculation from a plurality of input data. The data generation module 13 converts information ($HC_j$), which has been received from the host device 20, by using the above-described first secret information NKey, thereby generating $HKey_j$ (second key information). In this manner, on the NAND flash memory 10 side, the second key information ($HKey_j$) can be generated from the first key information (NKey).

The data generation module 16 converts, by using the $HKey_j$, data which is created by concatenating a random number $RN_h$, which has been received from the host device 20, and a random number $RN_c$, which has been generated by the NAND flash memory 10 itself, thereby generating a session key $SKey_j$. For example, AES (Advanced Encryption Standard) encryptors may be used for the data generation modules 13 and 16.

In the meantime, each of the data generation modules (Generate) 13, 16 is a module which outputs new data from plural input information pieces. In order to reduce the whole implementation size, it is possible to construct the data generation modules (Generate) 13, 16 by the same module as the encryptor 18 or a module which makes applicable use of the encryptor 18. Similarly, the two data generation modules 13 and 16, which are depicted as different structural elements in order to make the data processing procedure easy to understand, may be realized by repeatedly utilizing the same module.

The data concatenation module (Concatenate) 14 concatenates two input data (random number $RN_h$, random number $RN_c$) and outputs the concatenated data to the data generation circuit 16.

The random number generator (RNG) 15 generates a random number $RN_c$, which is used for authentication. The exclusive-OR module (EXOR) 17 receives, as input data, two identification information pieces (ChipID, LotID) which are read out of the ROM area 11-3, calculates an exclusive logical sum of the two input data, and outputs the calculation result. When the identification information is stored in the hidden area in place of the ROM area, as described above, the identification information, which is the input data to the exclusive-OR module, is read out of the hidden area.

The encryptor (Encrypt) 18 is a module which encrypts the input data by key data which is input separately, and outputs encrypted input data. In the present embodiment, the encryptor 18 encrypts a calculation result by the exclusive-OR circuit 17 of the two identification information pieces (ChipID, LotID) which are read out of the ROM area 11-3, by using the key data $SKey_j$ generated by the data generation module 16, and generates encrypted identification information Enc-ID=Enc($SKey_j$, ChipID (+) LotID). As described above, in order to reduce the whole hardware circuit scale, the encryptor 18 may also be used as the data generation module. In this case, (+) represents exclusive logical addition.

Although not shown, for example, an output module for outputting data, which is to be sent to the host device 20 via the controller 19, is actually disposed as a structural element.

The structural elements, such as the data cache 12, other than the cell array 11, may also be disposed in the memory controller (Controller) 19.

1-2. Host

Next, the host device (Host) 20 according to the present example is described.

The host device 20 includes a memory (Memory) 23, a random number generator (RNG) 25, a data concatenation module (Concatenate) 26, exclusive-OR modules (EXOR) 24 and 29, a data selector (Select) 21, a data generator (Generate) 27, and decryptors (Decrypt) 22 and 28.

The memory (Memory) 23 stores secret information $HKey_j$ and a host constant $HC_j$, which are necessary for executing the authentication process of the present embodiment. In particular, the secret information $HKey_j$ needs to be stored by using such means as to prevent exposure to the outside. For this purpose, for example, in the case of the host device, such as a consumer device, which is constructed by using dedicated hardware, it is desirable to use such means as recording the secret information $HKey_j$ in a dedicated memory which is completely shut off from the outside, or recording the secret information $HKey_j$ in a memory after encrypting it by using an encryption process which is independently provided in the host device, although not illustrated. For example, in the case of program software which operates on the PC, the secret information $HKey_j$ can securely be protected by protecting the program itself by using a tamper-resistant software technology.

The random number generator (RNG) 25 generates $RN_h$ which is used for authentication.

The data concatenation module (Concatenate) 26 concatenates two input random number data ($RN_h$, $RN_c$) which are generated by the random number generators 15 and 25, and outputs the concatenated data.

Each of the exclusive-OR modules (EXOR) 24 and 29 calculates an exclusive logical sum of two input data, and outputs the calculation result.

The data selector (Select) 21 selects, by using index information j of secret information $HKey_j$, encrypted LotID data which can be decrypted by using the secret information $HKey_j$ that is hidden in the host device 20, from the set of encrypted LotID (SELID) which has been read out of the NAND flash memory 10. For example, in the case of a consumer device, the secret information $HKey_j$ is recorded in an internal dedicated memory after being encrypted by a unique method of the manufacturer. In the case of a software program, the secret information $HKey_j$ is stored in the state in which the secret information $HKey_j$ can be protected against unlawful analysis by a tamper-resistant software (TRS) technology. In the case where a security module is built in, the secret information $HKey_j$ is stored, after taking such a measure as hiding the secret information $HKey_j$ by using the function of the security module.

The data generator (Generate) 27 is an arithmetic module which generates output data by a predetermined calculation from a plurality of input data. The data generator (Generate) 27 executes the same calculation process as the data generation module 16 which is provided in the NAND flash memory. The data generator 27 in this example converts, by using the secret information $HKey_j$ hidden in the host device 20, data which is created by concatenating the random number $RN_h$, which has been generated by the host device 20 itself, and the random number $RN_c$, which has been received from the NAND flash memory 10, thereby generating a session key $SKey_j$. In the meantime, the data generator 27 can use, for example, an AES encryption calculation.

The decryptor (Decrypt) 22, 28 decrypts input data by key data which is separately input, and outputs decrypted input data. In the present embodiment, the decryptor 22 is used in order to obtain LotID by decrypting encrypted LotID data which has been selected by the data selector 21, by using, as key information, a calculation result by the exclusive-OR module with respect to the secret information $HKey_j$ hidden in the host device and index information j for identifying the secret information $HKey_j$, where necessary.

The decryptor 28 decrypts the encrypted ID information Enc-ID, which has been received from the NAND flash memory 10, by using the $SKey_j$ which has been output from the data generator 27, and outputs the decrypted result to the exclusive-OR module 29. As a result of this decryption process, the host device 20 can obtain two identification data, ChipID and LotID.

As has been described above, the host device 20 obtains the LotID by the first-stage decryptor 22. In addition, the ChipID can also be obtained by the result of calculation by the exclusive-OR module 29 with respect to the obtained LotID and the output data of the second-stage decryptor 28. Furthermore, by the decryption of the encrypted ID information Enc-ID with use of the shared key data $SKey_j$, it is confirmed that the ID information (ChipID, LotID) has correctly been read out from the NAND flash memory 10 which has been authenticated by the host device 20.

In the meantime, an error correction process module, etc., which are not shown, are provided as structural elements, where necessary.

2. Authentication Flow

Figure 2:
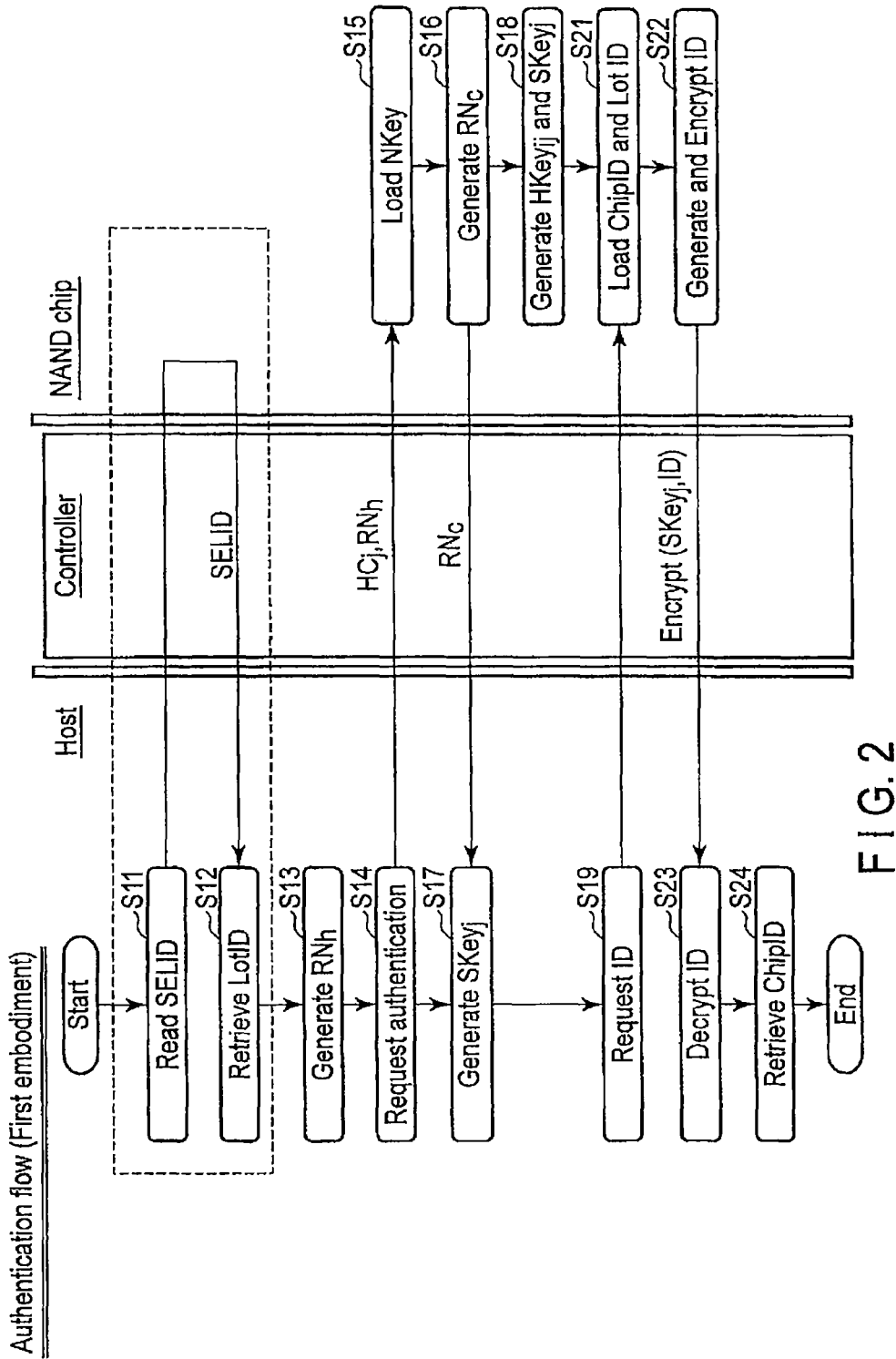
FIG. 2 is a flow chart illustrating an authentication flow of the memory system according to the first embodiment.

Next, referring to FIG. 2, a description is given of an authentication flow of the memory system having the structure shown in FIG. 1.

If authentication is started (Start), the host device 20 reads out an encrypted LotID set (SELID: Set of Encrypted LotID) from the NAND flash memory 10 (Step S11).

Then, the host device 20 executes, by the selector 21, a select process for selection from the read-out SELID, and reads out encrypted LotID data which can be decrypted by the host device 20. Further, the host device 20 obtains LotID by executing, by the decryptor 22, the above-described decryption process by using the hidden secret information $HKey_j$ (Step S12).

Subsequently, the host device 20 generates a random number $RN_h$ which is necessary at the time of requesting authentication. By using the random number $RN_h$ for the authentication process, it becomes possible to use, in the subsequent process, a different shared key at each time between the host device 20 and the NAND flash memory 10 (Step S13).

Then, the host device 20 requests authentication (Request authentication) and transmits a pre-stored host constant ($HC_j$) and the random number $RN_h$ to the NAND flash memory 10 (Step S14).

Subsequently, the NAND flash memory 10 receives the request for authentication, loads NKey which is hidden in the hidden area 11-2, and stores the NKey in the data cache 12 (Step S15).

Then, the NAND flash memory 10 generates, by the random number generator 15, a random number $RN_c$ which is necessary for authentication, and sends the random number $RN_c$ to the host device (Step S16).

In parallel with the process of Step S16, the host device 20 generates concatenated data $RN_h||RN_c$, as a result of the above-described data concatenation process by the concatenation module 26, by using the random number $RN_h$, which has been generated in Step S13, and the random number $RN_c$ received in Step S16. Further, using the secret information $HKey_j$ that is hidden in advance and the concatenated data $RN_h \| RN_c$, the generator 27 executes the above-described data generation process and generates $SKey_j$ (=Generate ($HKey_j$, $RN_h \| RN_c$)) (Step S17).

Subsequently, using the loaded NKey and the host constant $HC_j$ that has been received in Step S14, the NAND flash memory 10 generates $HKey_j$ by the above-described data generation process circuit 13. Further, the NAND flash memory 10 generates, by the data concatenation process module 14, concatenated data $RN_h \| RN_c$, from the random number $RN_h$ received in Step S14 and the random number $RN_c$ generated in Step S16. In addition, using the $HKey_j$ and the concatenated data $RN_h \| RN_c$, the NAND flash memory 10 generates $SKey_j$ (=Generate ($HKey_j$, $RN_h \| RN_c$)) by the data generation process of the data generation module 16 (Step S18).

Then, the host device 20 sends an ID request (Request ID) to the NAND flash memory 10 (Step S19).

Subsequently, the NAND flash memory 10 reads out ChipID and LotID from the ROM area 11-3 (Step S21).

Then, the NAND flash memory 10 calculates, by the exclusive-OR module 17, an exclusive logical sum (ChipID (+) LotID) of the ChipID and LotID. Further, the NAND flash memory 10 encrypts, by the encryptor 18, the (ChipID (+) LotID) by the key data $SKey_j$ generated in Step S18, generates encrypted ID information Enc-ID (=Enc($SKey_j$, ChipID (+) LotID), and sends the generated encrypted ID information Enc-ID to the host device 20 (Step S22).

Subsequently, the host device 20 decrypts, by the decryptor 28, the received encrypted ID information Enc-ID by using the key data SKeyj that has been generated in Step S17, thereby obtaining ID=ChipID (+) LotID (Step S23).

Then, the host device 20 calculates, by the exclusive-OR module 29, an exclusive logical sum between the above-described ID and the LotID obtained in Step S12, thereby obtaining ChipID (Step S24).

By the above-described operation, the authentication flow according to the first embodiment is completed (End).

3. Re: SELID

Figure 3:
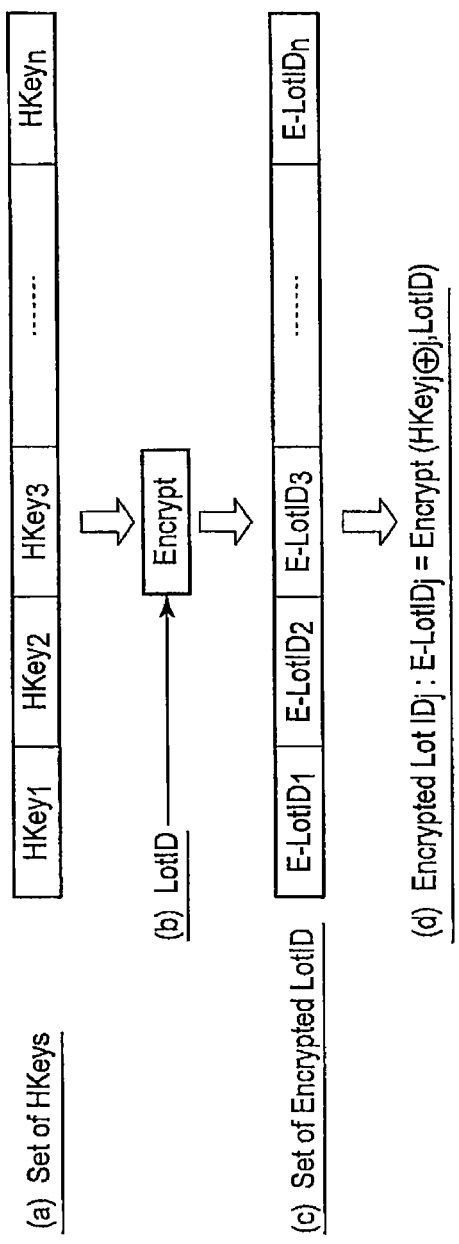
FIG. 3 is a view illustrating a structure example of a Set of Encrypted LotID set (SELID) in the first embodiment.

Next, referring to FIG. 3, the SELID relating to the present embodiment is described.

In order to generate the SELID that is suited to the NAND flash memory in which the LotID is recorded, the LotID is encrypted one by one by using each individual second key information $HKey_j$ of the set of second key information ($HKey_j$ (j=1, . . . , n) (Set of HKeys) that is secret information prepared in advance. Specifically, the SELID is a set of encrypted $LotID_j$ (E-$LotID_j$)=Encrypt ($HKey_j$, LotID), and the set of encrypted LotIDs is called "encrypted LotID set".

At the time of encryption, where necessary, exclusive logical addition between each second key information $HKey_j$ and each index information j is executed, and the result is used as an encryption key. The encrypted $LotID_j$ at this time is calculated as follows: E-$LotID_j$=Encrypt ($HKey_j$ (+) j, LotID).

In the above-described example, $HKey_j$ (+) j is used as an encryption key. However, aside from this, for example, a cyclic shift operation may be used. The cyclic shift operation is an operation in which bits are shifted and a bit exceeding digits is carried over to the opposite side. In an example of a left cyclic shift operation, if "11010101" in a binary system is cyclically shifted three times to the left, the result is "10101110". The encryption key may be calculated by using the equation: E-$LotID_j$=Encrypt (CyclicLeftShift ($HKey_j$, j), LotID). In this equation, (CyclicLeftShift ($HKey_j$, j) means that $HKey_j$ is cyclically shifted to the left by j times. In this case, it should suffice if the exclusive-OR module 24 shown in FIG. 1 is replaced with a left cyclic shift module which executes a left cyclic shift operation. These matters also apply to other embodiments which will be described below.

The structure of the SELID is not limited to the above example. For example, when specific $HKey_j$ has been exposed, the host device 20 which stores this $HKey_j$ may be configured such that LotID cannot be decrypted from the encrypted LotID set. To achieve this, the encrypted LotID, which can be decrypted by the $HKey_j$ is deleted from the SELID. Thereby, when the NAND flash memory 10, in which a newly configured SELID is recorded, has been used, correct LotID and ChipID cannot be obtained (decrypted) in the host device. Thereby, it is possible to provide a function for revoking the host device 20 which stores this secret information $HKey_j$.

4. Advantageous Effects

According to the authenticator, authenticatee and authentication method relating to the first embodiment, at least the following advantageous effects (1) and (2) can be obtained.

(1) Even when secret information has leaked from the host device 20, it is possible to prevent unlawful use of secret information of the NAND flash memory 10 with use of the leaked information.

The host device 20 that is the authenticator may be provided not only as a dedicated hardware device such as a consumer device, but also as a program (software) which is executable in a PC (personal computer) or the like, and, in some cases, the software functions as a substantial authenticator. On the other hand, the NAND flash memory 10 that is the authenticatee is, for instance, recording media or the like. Even in the case where a program called "firmware" mediates in the recording media, an important process or information is stored in a hidden state in hardware in the cell array 11. Thus, in reality, for example, there is concern that the software, which is executed on the PC, has a lower tamper-resistance (resistance to an attack) than the recording media. Thus, there is concern that, by attacking the host device (authenticator) 20 with a low tamper-resistance, secret information hidden in the NAND flash memory (authenticatee) 10 with a high tamper-resistance is also exposed, leading to a disguise as a device with a high tamper-resistance.

In the structure and authentication method according to the first embodiment, as described above, in the NAND flash memory 10 with a relatively high tamper-resistance, the first key information (NKey), from which the second key information (HKey) is generated, is hidden in the cell array 11. On the other hand, in the host device 20 with a relatively low tamper-resistance, only the second key information (HKey), from which the first key information (NKey) can not be generated, is hidden in the memory 23.

Thus, the NAND flash memory 10 generates the second key information (HKey) that is same information hidden in the authenticator, by using the source information (HC) that is received from the host device 20 and the first key information (NKey) that is hidden in the NAND flash memory 10 itself. The NAND flash memory 10 generates the session key (SKey) from the second key information (HKey) and the random number information ($RN_h$, $RN_c$).

The host device 20 generates the session key (SKey') from the hidden second key information (HKey) and the random number information ($RN_h$, $RN_c$). As a result, the NAND flash memory 10 and host device 20 share the session key with the same value.

In this manner, in the present embodiment, the secrecy level of the information, which is hidden in the NAND flash memory (authenticatee) 10, and the secrecy level of the information, which is hidden in the host device (authenticator) 20, can be made asymmetric. For example, in the present embodiment, the secrecy level of the information, which is hidden in the NAND flash memory 10 with a relatively higher tamper-resistance, can be set to be higher than the secrecy level of the information, which is hidden in the host device 20 with a relatively low tamper-resistance.

Thus, even in the case where information hidden in the host device 20 has leaked, since the secrecy level of the information, which is hidden in the NAND flash memory 10 with a relatively higher tamper-resistance, is higher, it is not possible to disguise as the NAND flash memory 10 by using the leaked information. Therefore, there is an advantage that it is possible to prevent unlawful use of the secret information of the NAND flash memory 10 with the leaked information. As a result, for example, it is possible to confirm that the ID information, which has been read out of the authenticator, is the information that has been read out of a target authenticatee, and the unlawful use by the counterpart can be revoked.

(2) Implementation is advantageously achieved.

The structure of the present embodiment is subject to the environment in which restrictions are imposed on circuit scales, for example, in an environment in which hardware implementation of a public key encryption process or an MKB process, which requires a relatively large circuit scale, is difficult to achieve.

However, according to the present embodiment, although the key information is asymmetric, there is no need to use the public key encryption process which requires a relatively large circuit scale. In addition, as described above, the secrecy level of the information hidden in the host device (authenticator) 20 and the secrecy level of the information hidden in the NAND flash memory (authenticatee) 10 are made asymmetric. Thereby, use is made of such authentication means that information alone, which is leaked from one device, does not allow disguise as the other device, and the session key (SKey) that is secret information is shared between the authenticator and authenticatee.

Therefore, even in the severe environment in which the above-described restrictions are imposed, the implementation can advantageously be achieved.

Furthermore, the circuit scale can be made relatively small, by implementing the data generation circuit and the encryptor, which constitute the memory system, by the same process, as described above.

Second Embodiment (An Example in which a Plurality of NKeys are Provided)

Next, a description is given of an authenticator, an authenticatee and an authentication method according to a second embodiment. This embodiment relates to an example in which a plurality of NKeys (first key information) is provided. A detailed description of parts common to those in the first embodiment is omitted.

Structure Example (Memory System)

Figure 4:
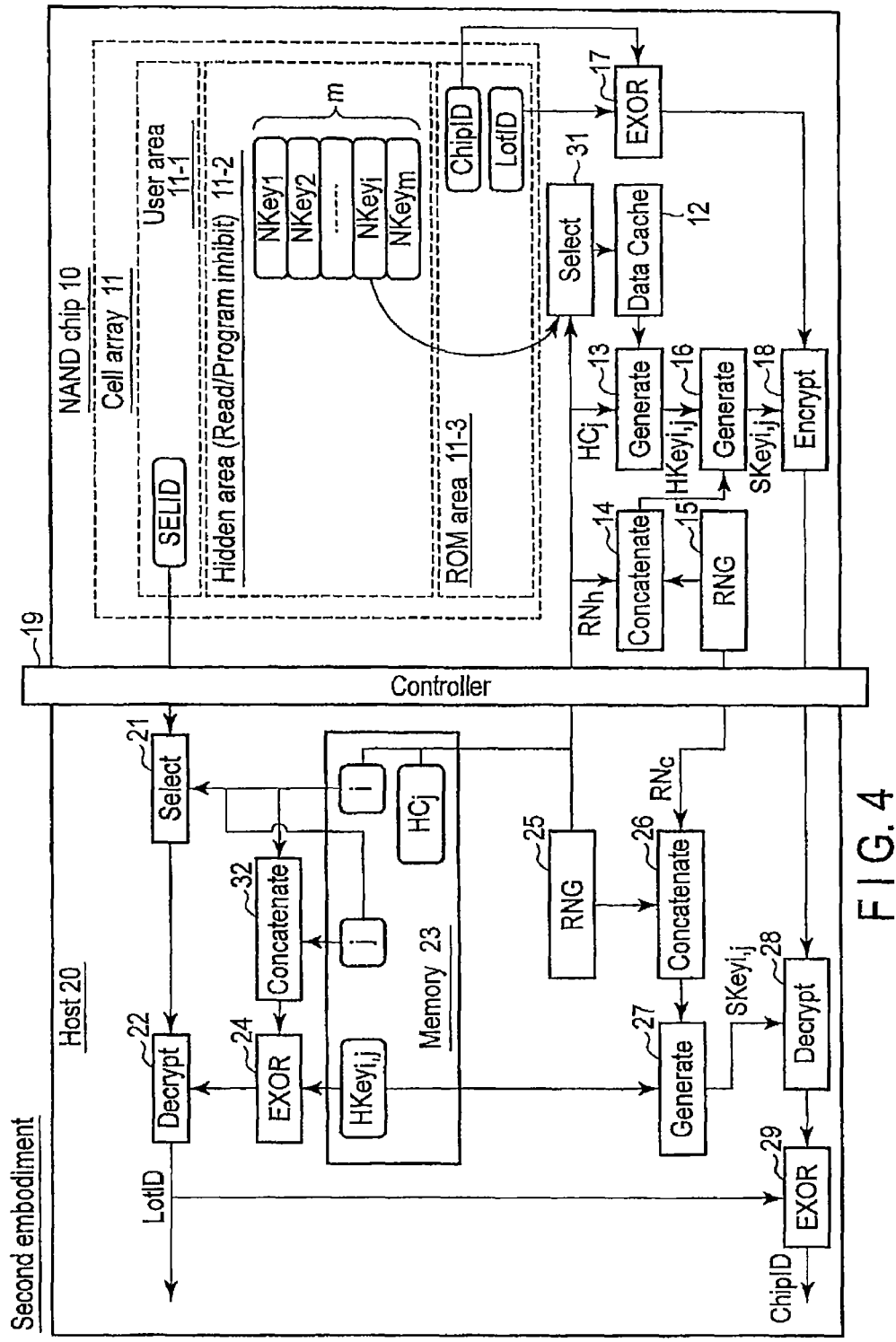
FIG. 4 is a block diagram illustrating a structure example of a memory system according to a second embodiment.

To begin with, referring to FIG. 4, a structure example according to the second embodiment is described.

As shown in FIG. 4, the structure example of the second embodiment differs from that of the first embodiment in that a plurality of secret information $NKey_i$ (i=1, ..., m) is hidden in the hidden area (Hidden area) 11-2 in the cell array (Cell array) 11 of the NAND flash memory 10. In addition, the NAND flash memory 10 further includes a selector 31 which selects $NKey_i$ from the hidden secret information $NKey_i$ (i=1, ..., m), in accordance with index information i which is received from the host device (authenticator).

Besides, index information i is kept in the host device 20, the index information i indicating which secret information $HKey_{i,j}$ corresponding to secret information $NKey_i$ in the NAND flash memory 10 is hidden in the memory 23.

In the above-described structure, at the time of executing the authentication process, the host device 20 selects, by the selector 21, encrypted LotID which can be decrypted by the host device 20 itself, from the SELID by making use of the index information i for designating the secret information, together with the index information j.

In addition, the host device 20 transmits the index information i to the NAND flash memory 10.

The NAND flash memory 10 selects, by the selector 31, the $NKey_i$ corresponding to the received index information i from the hidden secret information $NKey_i$ (i=1, ..., m).

<Authentication Flow>

Next, referring to FIG. 5, the authentication flow according to the second embodiment is described.

As shown in FIG. 5, in the present embodiment, at the time of requesting authentication (Request authentication) in Step S14, the index information i, which is necessary for selecting the secret information $NKey_i$ hidden in the NAND flash memory 10, is further transmitted from the host device 20 to the NAND flash memory 10.

Further, in Step S18, in the NAND flash memory 10, the index information i is used in order to generate second key information $HKey_{i,j}$.

Since the other parts of the authentication flow are substantially the same as in the above-described first embodiment, a detailed description is omitted.

<Re: SELID>

Figure 6:
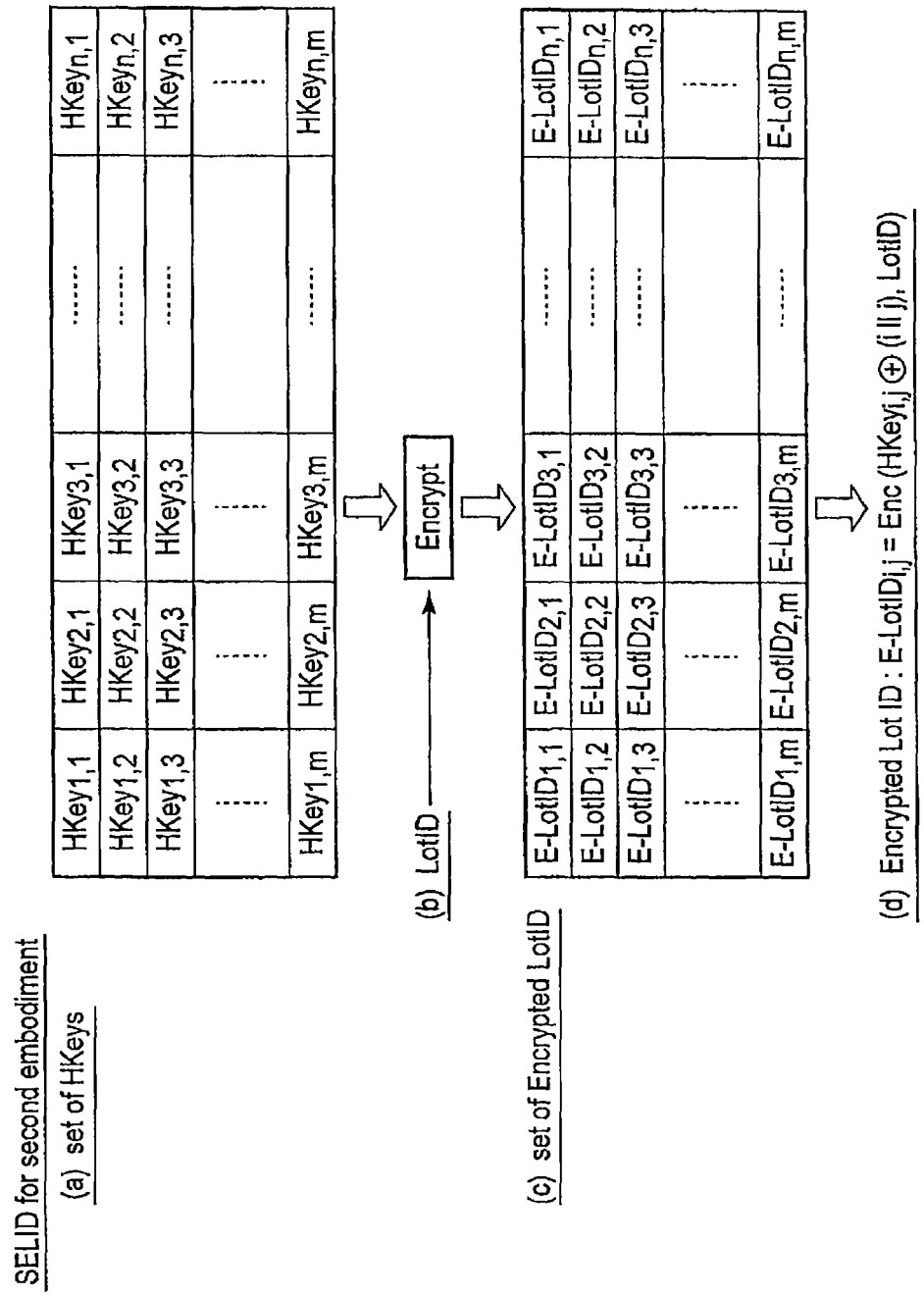
FIG. 6 is a view illustrating a structure example of a Set of Encrypted LotID set (SELID) in the second embodiment.

Next, referring to FIG. 6, the SELID in the second embodiment is described.

As illustrated in parts (a) and (c) of FIG. 6, in the second embodiment, since the index information for designating NKey and HKey is composed of two elements, i.e. i and j, the SELID has a matrix form.

Since the other respects are substantially the same as in the above-described first embodiment, a detailed description is omitted.

Advantageous Effects

According to the authenticator, authenticatee and authentication method relating to the second embodiment, the same advantageous effects (1) and (2), as with the above-described first embodiment, can be obtained.

Furthermore, in the second embodiment, a plurality of secret information $NKey_i$ (i=1, ..., m) is hidden in the hidden area (Hidden area) 11-2 in the cell array (Cell array) 11 of the NAND flash memory 10.

Accordingly, secret information HKey, which varies depending on the purpose of use, is hidden in the corresponding host device 20. Therefore, more advantageously, even when HKey or NKey, which was distributed for a specific purpose of use, has been exposed, the other purposes of use are not adversely affected.

For example, in the case where first secret information NKey is allocated to a video player and second secret information NKey is allocated to an e-book reader, even if the secret information $HKey_{1,j}/NKey_1$, which is allocated to the video player, has been exposed, it is not possible to construct an e-book reader by using the exposed secret information $HKey_{1,j}/NKey_1$. Besides, in the case where different HKeys/NKeys were allocated to individual host device makers, even if the secret information has been exposed from a host device of maker A, it is not possible to construct a host device of maker B. Therefore, it becomes possible to newly manufacture and provide such a NAND flash memory 10 that only the host device of the specific maker A, from which the secret information has been exposed, is unable to correctly read out LotID and ChipID.

Third Embodiment (An Example in which a Plurality of NKeys are Provided for Each Lot)

Next, a description is given of an authenticator, an authenticatee and an authentication method according to a third embodiment. This embodiment relates to an example in which a plurality of NKeys (first key information) is provided for each Lot (e.g. for each NAND maker). A detailed description of parts common to those in the first embodiment is omitted.

Structure Example (Memory System)

Figure 7:
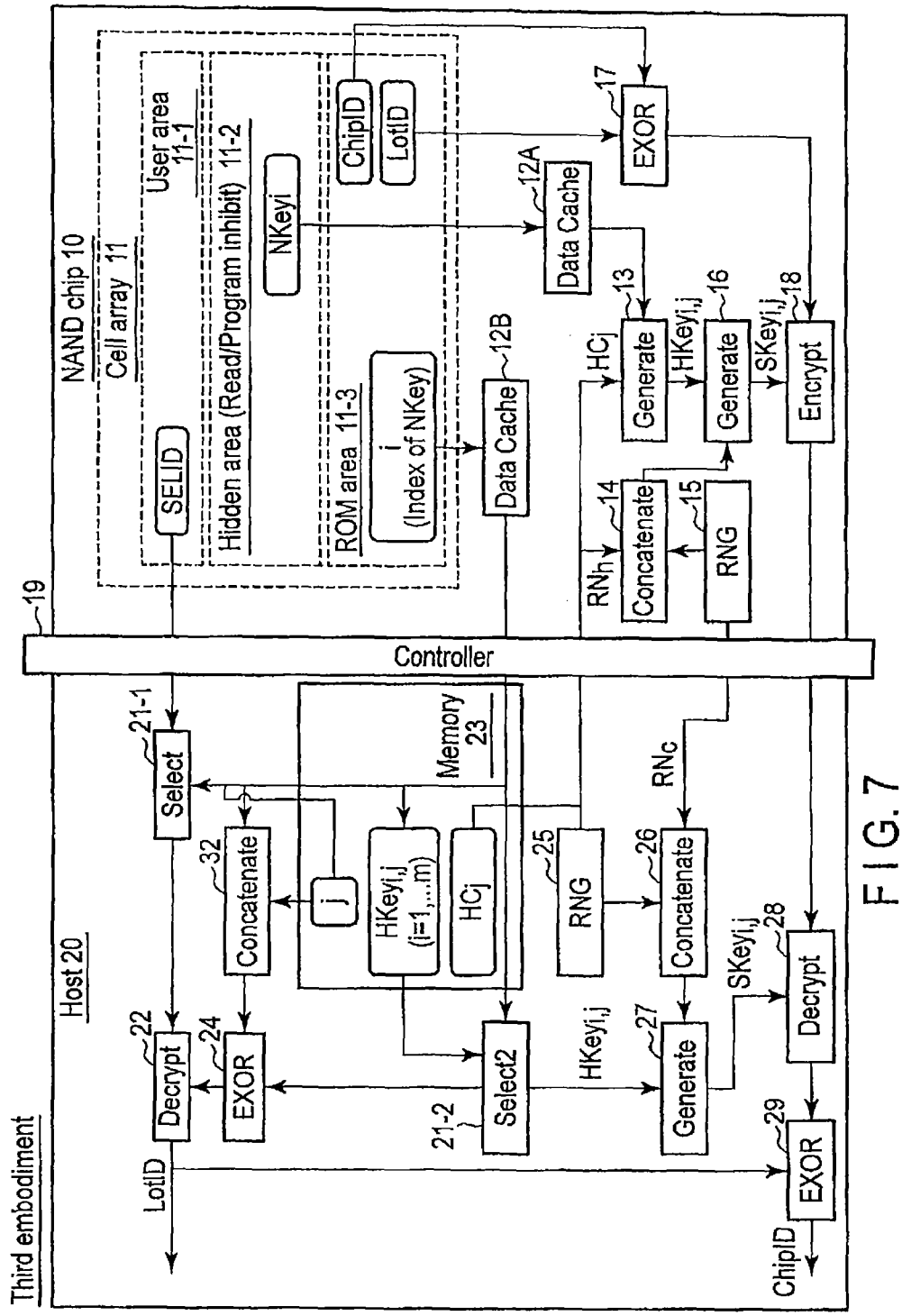
FIG. 7 is a block diagram illustrating a structure example of a memory system according to a third embodiment.

To begin with, referring to FIG. 7, a structure example according to the third embodiment is described.

As shown in FIG. 7, in the structure example of the third embodiment, one secret information $NKey_i$, which has been selected from a plurality of $NKey_i$ (i=1, . . . , m), is recorded in the hidden area (Hidden area) 11-2 of the NAND flash memory 10. Further, index information i for specifying the secret information $NKey_i$ is recorded in the ROM area 11-3. In these respects, the third embodiment differs from the first embodiment.

In addition, the host device 20 hides all of an m-number of pieces of secret information $HKey_i$ (i=1, . . . , m), so that the host device 20 may execute an authentication process with the NAND flash memory 10 in which any one of the m-number of pieces of secret information $NKey_i$ (i=1, . . . , m) is hidden.

In the above-described structure, at the time of executing the authentication process, the host device 20 reads out the index information i from the NAND flash memory 10, and selects corresponding $HKey_i$ from the hidden $HKey_i$ (i=1, . . . , m). In addition, similarly, the host device 20 selects encrypted LotID, which can be decrypted by the host device 20 itself, from the encrypted LotID set (SELID) which has been read out from the NAND flash memory 10.

<Authentication Flow>

Figure 8:
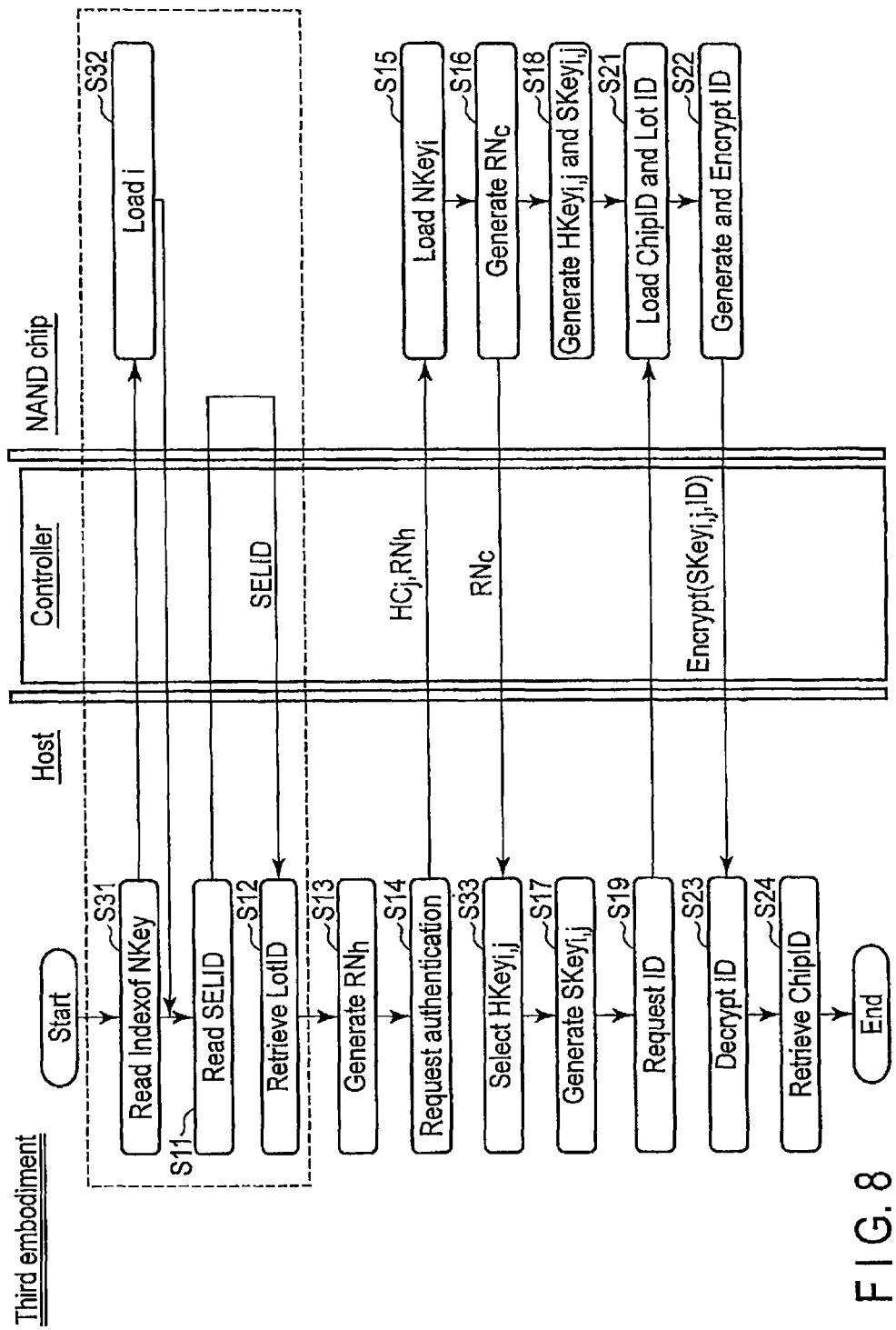
FIG. 8 is a flow chart illustrating an authentication flow of the memory system according to the third embodiment.

Next, referring to FIG. 8, the authentication flow relating to the third embodiment is described.

In the present embodiment, at Step S32, the NAND flash memory 10 further loads the index information i for specifying the secret information $NKey_i$ in the ROM area 11-3 and the host device 20 reads out the index information i.

At Step S33, the host device 20 reads out RNc from the NAND flash memory 10.

Subsequently, in Step S17, the host device 20 decrypts LotID from SELID in accordance with the read-out index i (which is read out at step S32), by making use of the corresponding $NKey_i$ from the plural pieces of hidden secret information $NKey_i$ (i=1, . . . , m).

Further, by using the index information i which has been received in the above process, the host device 20 selects $HKey_{i,j}$, which is necessary for generating key data $SKey_{i,j}$, from the secret information set $HKey_{i,j}$ (i=1, . . . , m).

In the illustrated process flow, the index i and SELID are read out in this order, but the order of read-out is not particularly limited.

<Re: SELID>

In this embodiment, too, the index information for designating HKey is composed of two index information pieces, i.e. i and j. Thus, the SELID is similar to that in the second embodiment shown in FIG. 6.

Since the other respects are substantially the same as in the above-described first embodiment, a detailed description is omitted.

Advantageous Effects

According to the authenticator, authenticatee and authentication method relating to the third embodiment, the same advantageous effects (1) and (2), as with the above-described first embodiment, can be obtained.

Furthermore, in the third embodiment, a plurality of NKeys (first key information) for each Lot (e.g. for each NAND maker) is stored in the hidden area 11-2 of the NAND flash memory 10. Further, the index information i for specifying the secret information $NKey_i$ is recorded in the ROM area 11-3.

In this manner, hidden NKeys are made different between makers of NAND flash memories. Thereby, even in the case where the NKey, which is particularly important secret information, has leaked due to insufficient information management of a specific NAND flash memory maker, or even in the case where the secret information NKey has leaked due to an inadequate information hiding method in the marketed NAND flash memory, NAND flash memories, which are manufactured by other NAND flash memory makers, can be continuously usable without change, and this is advantageous.

The location where index information i (index of NKey) is stored in the cell array 11 is not limited to the location above description.

For example, index information i may be stored in user area (normal read/write area) 11-1, instead of the ROM area 11-3.

As described above, the information to be stored in hidden area 11-2 is high degree of confidentiality, and should not be stored in the other areas. In contrast, the other kind of information can be stored in other area such as user area 11-1 or ROM area 11-3, for the sake of, for example, data storing step at fabricating of the device or for easy use of data.

Fourth Embodiment (An Example in which SELID is Recorded in Protected Area)

Next, a description is given of an authenticator, an authenticatee and an authentication method according to a fourth embodiment. This embodiment relates to an example in which SELID is recorded in a protected area (Protected area). A detailed description of parts common to those in the first embodiment is omitted.

Structure Example (Memory System)

Figure 9:
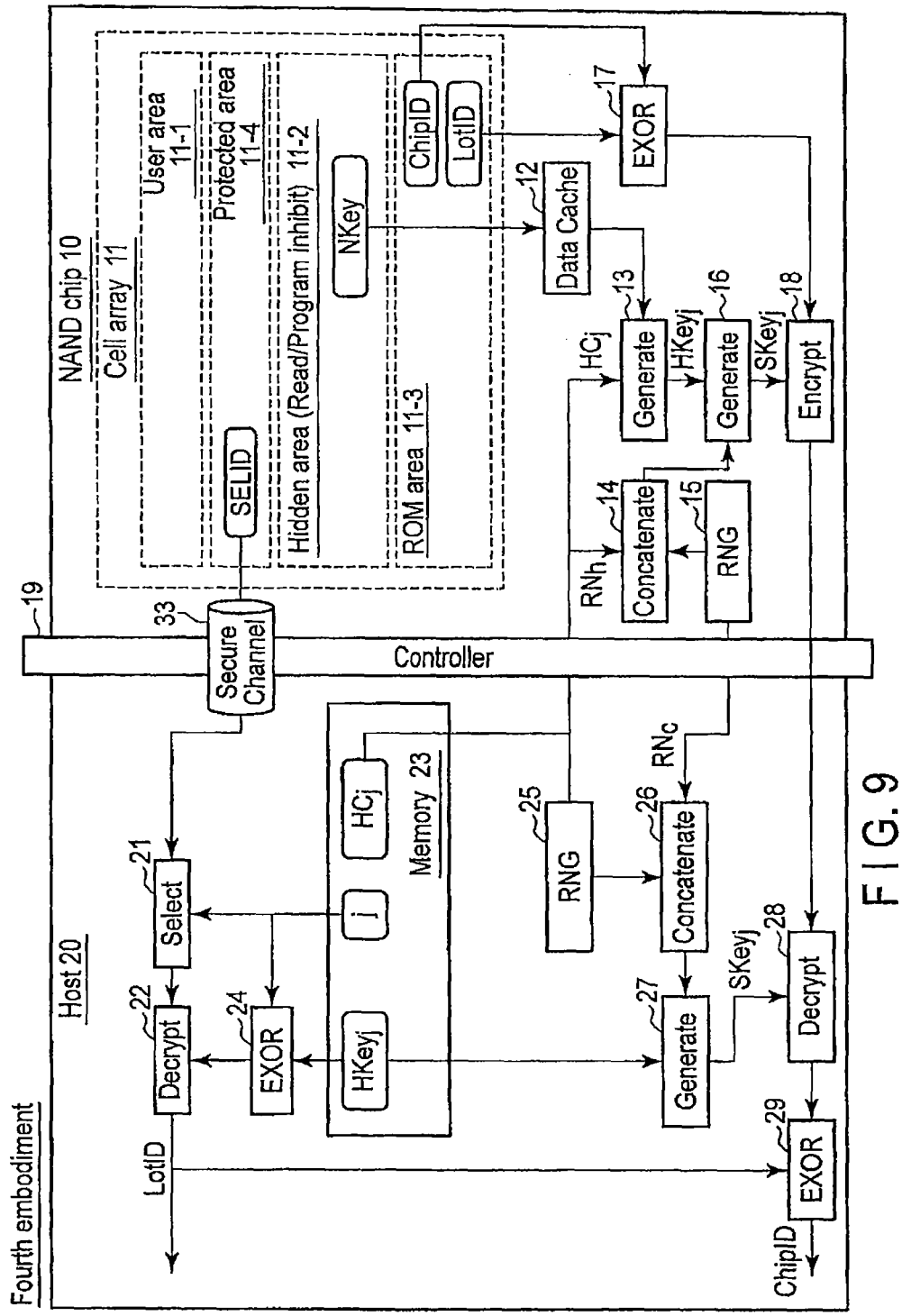
FIG. 9 is a block diagram illustrating a structure example of a memory system according to a fourth embodiment.

To begin with, referring to FIG. 9, a structure example according to the fourth embodiment is described.

As shown in FIG. 9, the fourth embodiment differs from the foregoing embodiments in that the encrypted LotID set (SELID) is recorded in a protected area (Protected area) 11-4 of the cell array (Cell array) 11 of the NAND flash memory 10. The protected area (Protected area) 11-4 is an area in which a data write/read process by access from the outside is permitted only when an authentication process, which is separately implemented in the controller 19, has been successfully executed.

This protected area 11-4 is an area which is provided in, for instance, an SD® card, etc., which are currently marketed. The data recorded in the protected area 11-4 is not only hidden from the outside of the authentic host device 20 which can execute an authentication process with the controller 19. It is also possible to prevent the user from erroneously rewriting/deleting the data therein. Thus, the protected area 11-4 serves also as an area for storing information which is necessary and indispensable for a data reproduction process.

Hence, the SELID relating to this embodiment is transmitted to the host device 20, after establishing a secure channel 33 through which an authentication process, which is separately provided between the host device 20 and the controller 19, has been executed.

<Authentication Flow>

Figure 10:
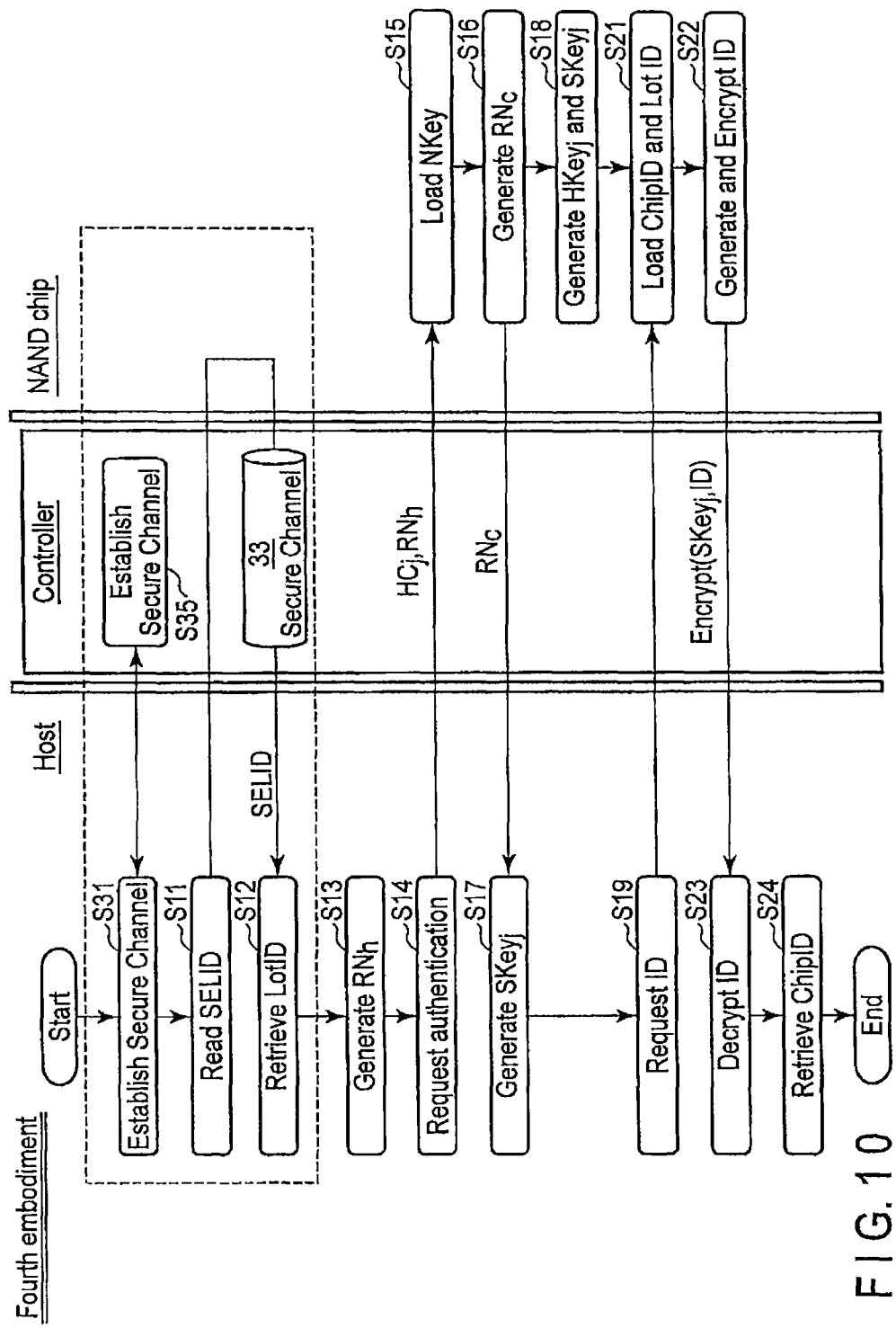
FIG. 10 is a flow chart illustrating an authentication flow of the memory system according to the fourth embodiment.

Next, referring to FIG. 10, the authentication flow relating to the fourth embodiment is described.

As shown in FIG. 10, in Step S35, the host device 20 establishes the secure channel by executing the authentication process which is separately provided between the host device 20 and the controller 19.

Thus, in Step S35, the host device 20 obtains an access permission to the protected area (Protected area) 11-4, and reads out the encrypted LotID set (SELID) via the established secure channel.

The SELID in the fourth embodiment is the same as the SELID shown in FIG. 3.

Since the other structural respects are substantially the same as in the above-described first embodiment, a detailed description is omitted.

Advantageous Effects

According to the authenticator, authenticatee and authentication method relating to the fourth embodiment, the same advantageous effects (1) and (2), as with the above-described first embodiment, can be obtained.

Furthermore, in the fourth embodiment, the encrypted LotID set (SELID) is recorded in the protected area (Protected area) 11-4 of the cell array 11. It is possible, therefore, to prevent such a trouble that the ChipID or LotID cannot be read out due to erroneously rewrite/deletion of the SELID by the user.

Fifth Embodiment (An Example in which the Random Number Generator is not Provided in the NAND)

Next, a description is given of an authenticator, an authenticatee and an authentication method according to a fifth embodiment. This embodiment relates to an example in which the random number generator 15 is not provided in the NAND flash memory 10. A detailed description of parts common to those in the first embodiment is omitted.

Structure Example (Memory System)

Figure 11:
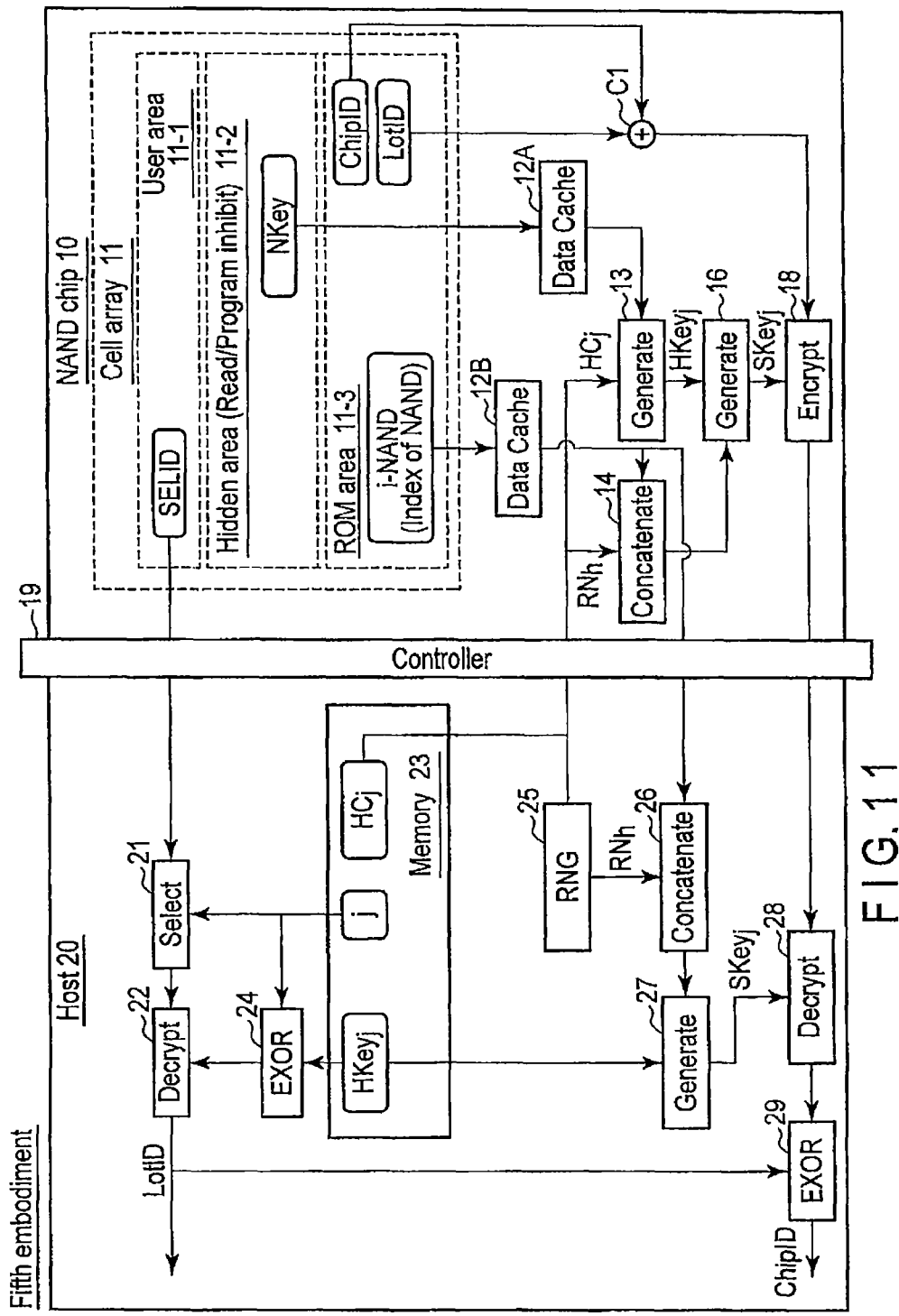
FIG. 11 is a block diagram illustrating a structure example of a memory system according to a fifth embodiment.

Referring to FIG. 11, a structure example according to the fifth embodiment is described.

As shown in FIG. 11, in the structure example of the fifth embodiment, the random number generator (RNG) 15 is not provided in the NAND flash memory 10.

Instead, fixed value index information (i-NAND), which is prepared in advance for each of NAND flash memories 10, is stored in the ROM area 11-3 in the cell array (Cell array). The i-NAND is a value which is used when key data $SKey_j$ is generated in place of the random number $RN_c$ in the first embodiment. As this value, use may be made of values generated by various generation means, for instance, a random number value which was generated in advance at the time of manufacture of the NAND flash memory, a hash value of ChipID or LotID, or a value created by encrypting ChipID or LotID by a specific value.

Thus, the NAND flash memory 10 further includes a data cache 12B.

<Authentication Flow>

Figure 12:
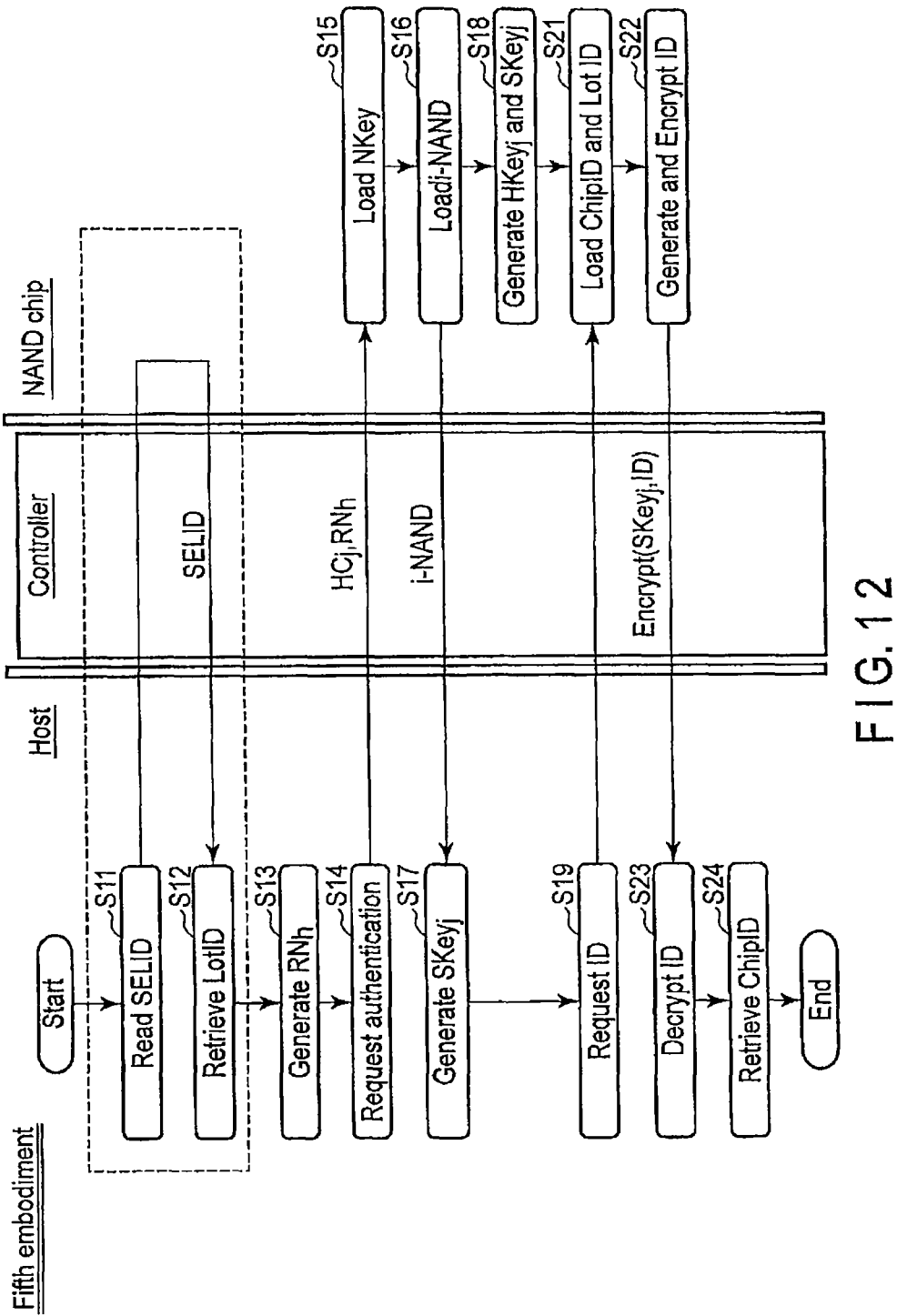
FIG. 12 is a flow chart illustrating an authentication flow of the memory system according to the fifth embodiment.

Next, referring to FIG. 12, the authentication flow relating to the fifth embodiment is described.

As shown in FIG. 12, in Step S16, when the NAND flash memory 10 receives an authentication request (Request authentication) from the host device 20, the NAND flash memory 10 reads out the fixed value index information (i-NAND) from the ROM area 11-3, instead of generating a random number by a random number generator, and sends the fixed value index information (i-NAND) to the host device 20.

At the time of generating key data $SKey_j$, the host device 20 and NAND flash memory 10 execute the above-described data generation process by using concatenated data $RN_h\|$i-NAND between the random number $RN_h$ generated by the host device 20 and the i-NAND, and $HKey_j$ ($SKey_j$=Generate ($HKey_j$, $RN_h\|$i-NAND)).

The SELID in the fifth embodiment is the same as the SELID shown in FIG. 3.

Since the other respects are substantially the same as in the above-described first embodiment, a detailed description is omitted.

Advantageous Effects

According to the authenticator, authenticatee and authentication method relating to the fifth embodiment, the same advantageous effects (1) and (2), as with the above-described first embodiment, can be obtained.

Furthermore, in the fifth embodiment, the above-described random number generator (RNG) 15 in FIG. 1 is not included in the NAND flash memory 10. Therefore, the implementation circuit scale of the NAND flash memory 10 can further be reduced, and microfabrication can advantageously be achieved.

Sixth Embodiment (An Example in which Token is Generated)

Next, a description is given of an authenticator, an authenticatee and an authentication method according to a sixth embodiment. This embodiment relates to an example in which verification data (Token) is generated. A detailed description of parts common to those in the first embodiment is omitted.

Structure Example (Memory System)

Figure 13:
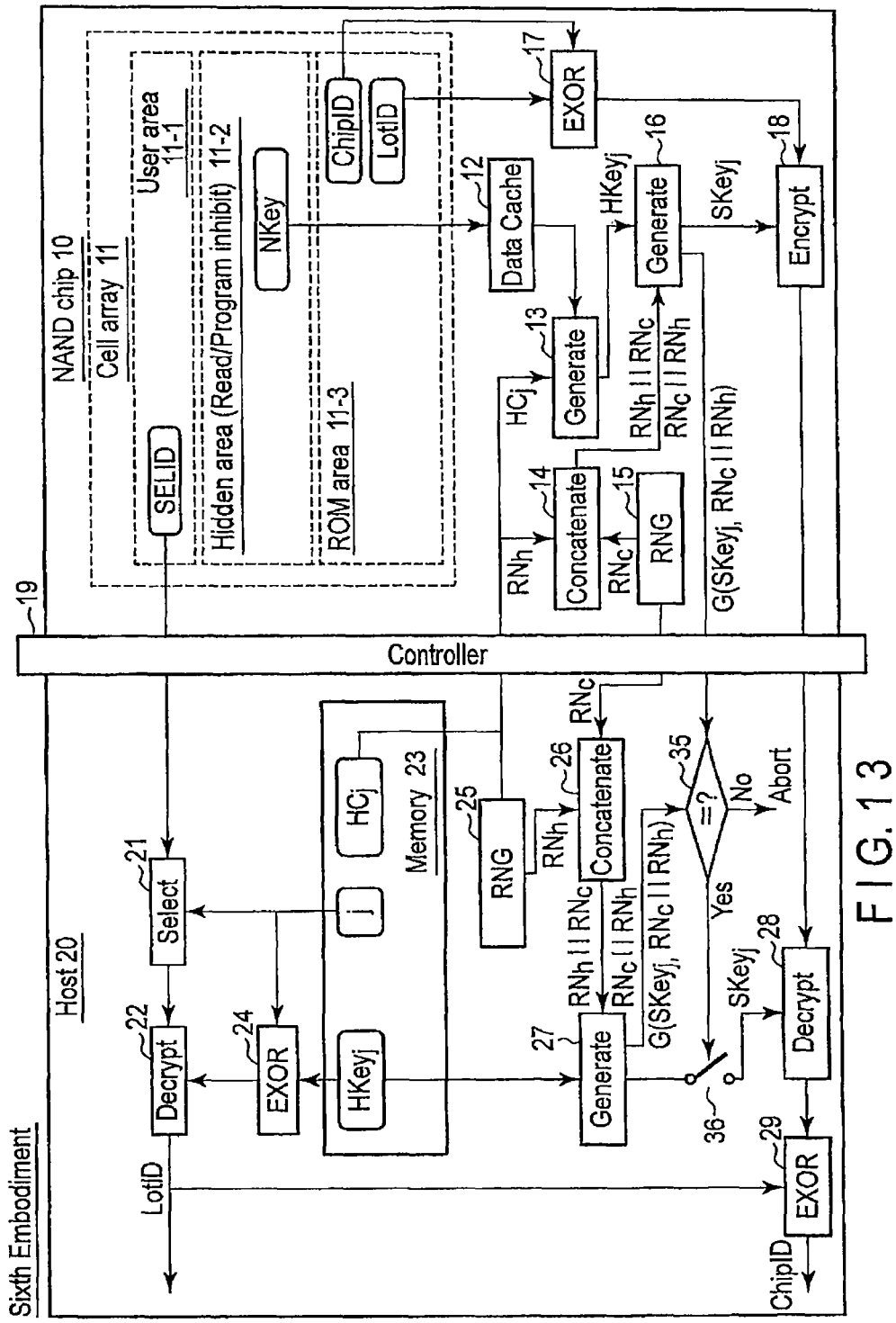
FIG. 13 is a block diagram illustrating a structure example of a memory system according to a sixth embodiment.

Referring to FIG. 13, a structure example according to the sixth embodiment is described.

As shown in FIG. 13, the structure example of the sixth embodiment differs from the foregoing embodiments in that each of the NAND flash memory 10 and host device 20 generates key data $SKey_j$ from secret information $HKey_j$ and the concatenated data $RN_h\|RN_c$ of two random numbers, by using the data generation circuit (Generate) 16, 26, and generates verification data (Token) for confirming that the same key data $SKey_j$ is generated between the host device and the NAND flash memory.

It should suffice if the verification data (Token) is data which is calculated based on the session key data $SKey_j$ and a value shared by the host device 20 and NAND flash memory 10. In the present embodiment, Token (=Generate ($SKey_j$, $RN_c\|RN_h$)), which is obtained by using the $RN_c\|RN_h$ in which the order of concatenation of two random numbers is changed, is used by way of example. In the Figures, for the reason of space for depiction, Generate ( ) is described as G ( ) The data generation circuit, which is used for generating the session key $SKey_j$, and the data generation module, which is used for generating the Token, are depicted as the same module. However, since the purpose is to generate the same data by the host device 20 and NAND flash memory 10, it is not necessary that the above-described two data generation modules be the same data generation module, and these two data generation modules may be constructed by different modules.

The generated verification data Token is sent from the NAND flash memory to the host device.

The host device 20 determines, by a comparator 35, whether the received verification data Token and the verification data calculated by the host device itself are identical. If the verification data values Token are identical (Yes), a gate module 36 outputs a session key $SKey_j$ to the decryption module (Decrypt) 28, and continues the subsequent process, as in the first embodiment. On the other hand, if the verification data values Token are different (No), the subsequent process is canceled (Abort).

<Authentication Flow>

Figure 14:
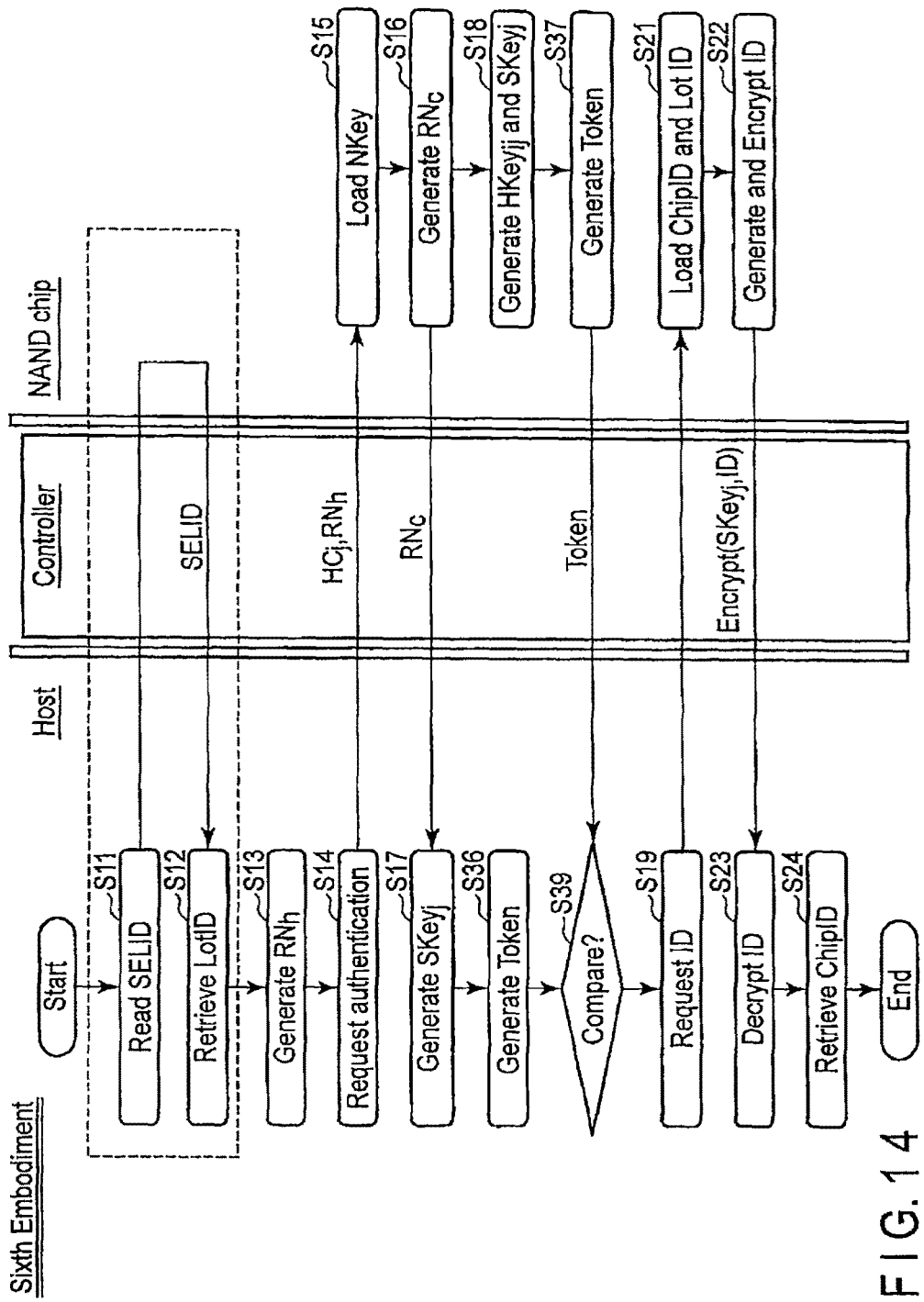
FIG. 14 is a flow chart illustrating an authentication flow of the memory system according to the sixth embodiment.

Next, referring to FIG. 14, the authentication flow relating to the sixth embodiment is described.

In the sixth embodiment, the following process is added after the generation of the key data $SKey_j$ in the first embodiment.

In Step 36, the host device 20 calculates verification data Token (=Generate ($SKey_j$, $RN_c\|RN_h$)) from the generated key data $SKey_j$ and the two random numbers $RN_h$ and $RN_c$.

Similarly, in Step S37, the NAND flash memory also calculates the verification data Token (=Generate ($SKey_i$, $RN_c\|RN_h$)) from the generated key data $SKey_j$ and the two random numbers $RN_h$ and $RN_c$, and sends this Token to the host device.

Subsequently, in Step S39, the host device confirms whether the receive Token corresponds to the Token generated by the host device itself. When the receive Token corresponds to the Token generated by the host device itself, the subsequent process is continuously executed. When the receive Token does not corresponds to the Token generated by the host device itself, the subsequent authentication process is canceled.

The SELID in the sixth embodiment is the same as the SELID shown in FIG. 3.

Since the other aspects are substantially the same as in the above-described first embodiment, a detailed description is omitted.

Advantageous Effects

According to the authenticator, authenticatee and authentication method relating to the sixth embodiment, the same advantageous effects (1) and (2), as with the above-described first embodiment, can be obtained.

Furthermore, in the sixth embodiment, the verification data (Token) for confirming that the same key data $SKey_j$ is generated between the host device and the NAND flash memory is generated, and the agreement of the verification data (Token) is determined.

Thus, it can be confirmed that the key sharing process by the authentication is correctly executed between the host device and the NAND flash memory, and there is the advantage that an unlawful authentication counterpart or the occurrence of an error or tamper in data in an intermediate path in the authentication process can easily be confirmed.

Seventh Embodiment (An Example in which Another Set of IDKeys is Used for SELID Encryption)

Next, a description is given of an authenticator, an authenticatee and an authentication method according to a seventh embodiment. This embodiment relates to an example in which another set of IDKeys is used for SELID encryption. A detailed description of parts common to those in the first embodiment is omitted.

Structure Example (Memory System)

Figure 15:
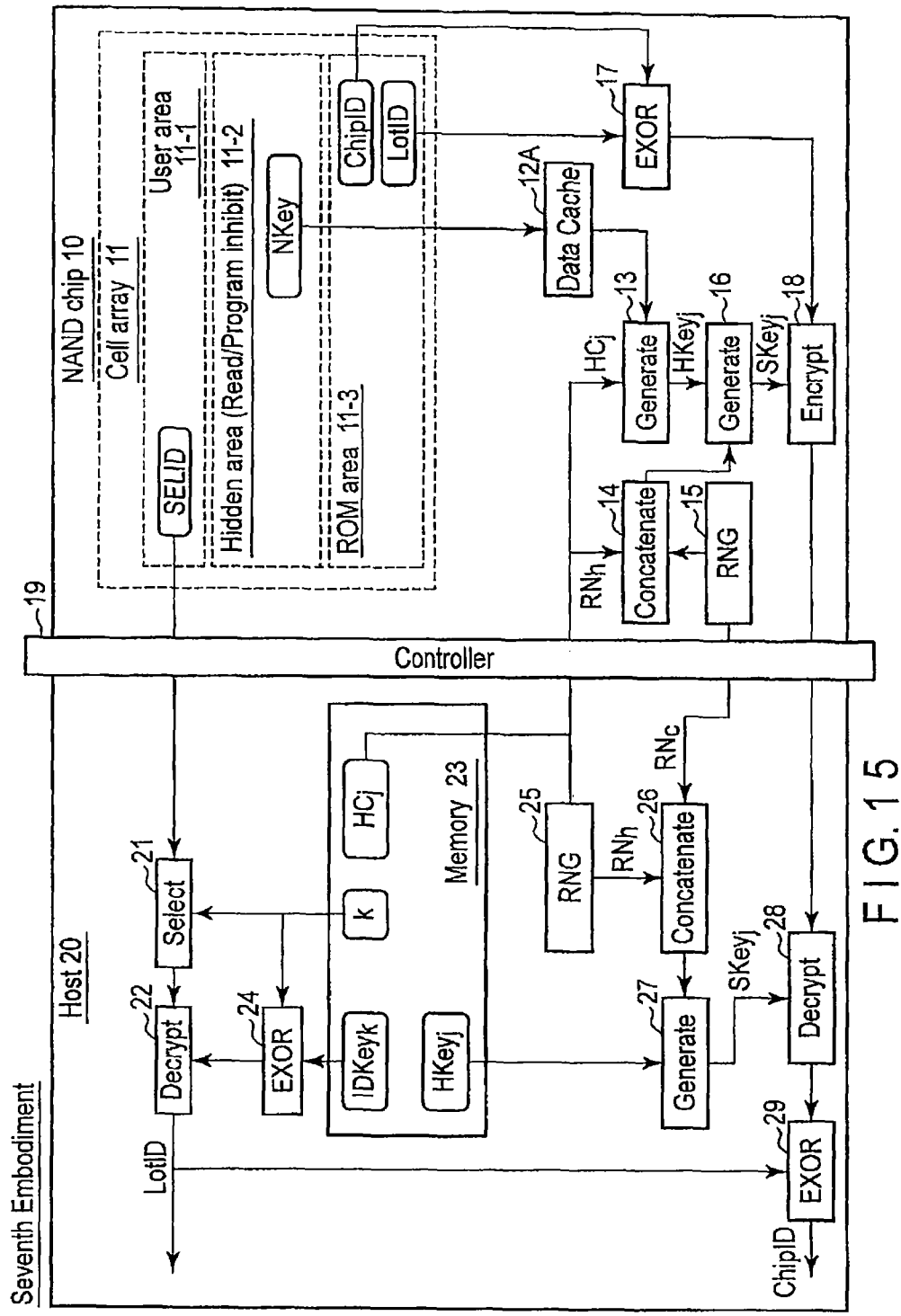
FIG. 15 is a block diagram illustrating a structure example of a memory system according to a seventh embodiment.

Referring to FIG. 15, a structure example according to the seventh embodiment is described.

As shown in FIG. 15, the structure example of the seventh embodiment differs from the foregoing embodiments in that the encryption key, which is used to generate the encrypted LotID set (SELID), is changed to an encryption key IDKey which is different from the HKey that is derived from the NKey. However, there is no substantial change in the structural elements of the NAND flash memory 10 according to this embodiment.

In the host device 20 of this embodiment, new secret information $IDKey_k$ is hidden in the memory 23, and this $IDKey_k$ is used in the decryption process of the SELID that is read out of the NAND flash memory 10. In this respect, the present embodiment differs from the foregoing embodiments. However, there is no change in the decryption process itself.

<Authentication Flow>

Figure 16:
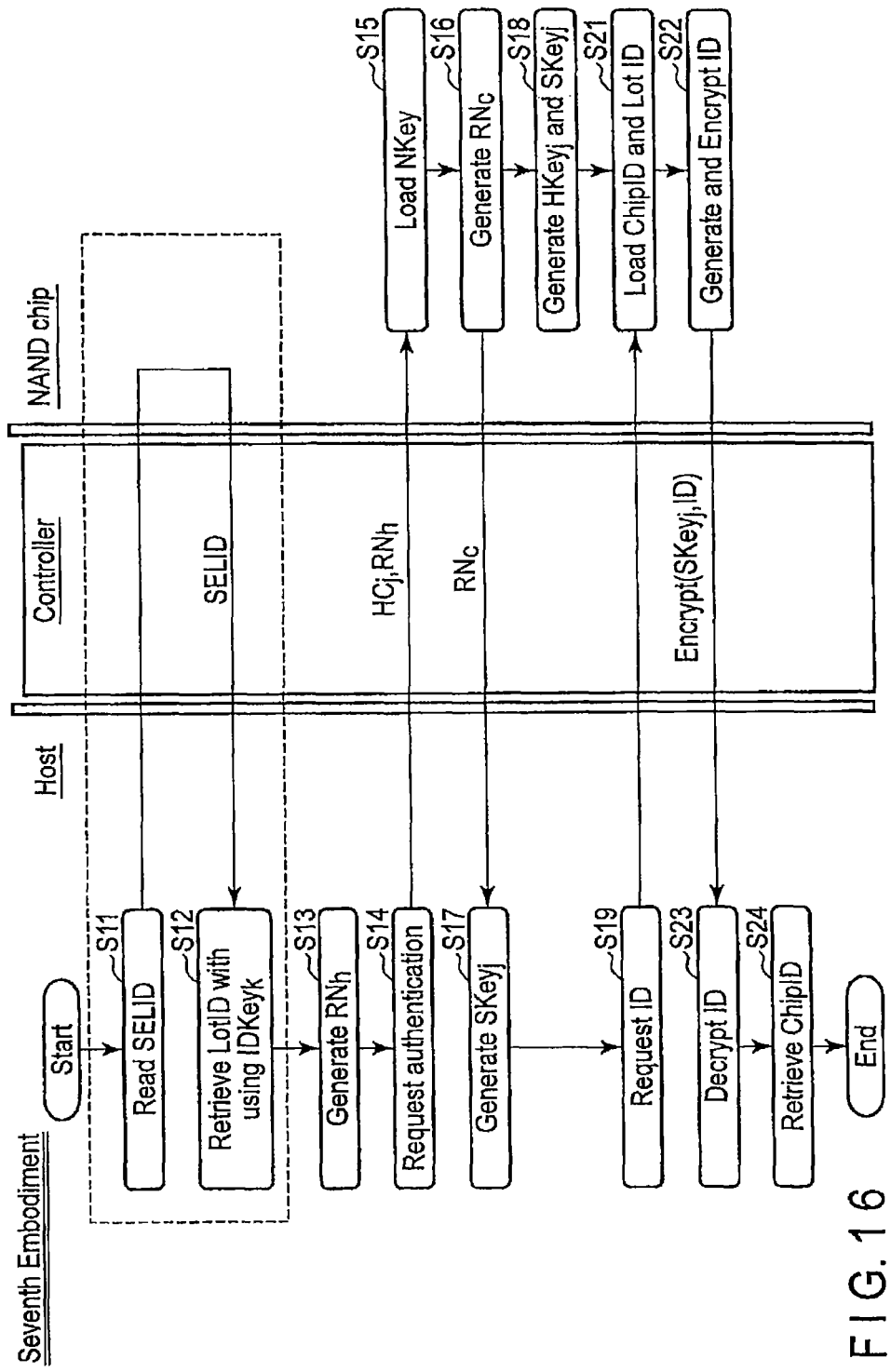
FIG. 16 is a flow chart illustrating an authentication flow of the memory system according to the seventh embodiment.

Next, referring to FIG. 16, the authentication flow relating to the seventh embodiment is described.

As illustrated in FIG. 16, the present embodiment differs from the foregoing embodiments in that the host device 20, in Step S12, decrypts the encrypted LotID set (SELID), which has been red out of the NAND flash memory 10, by using the secret information $IDKey_k$ and index information k.

Figure 17:
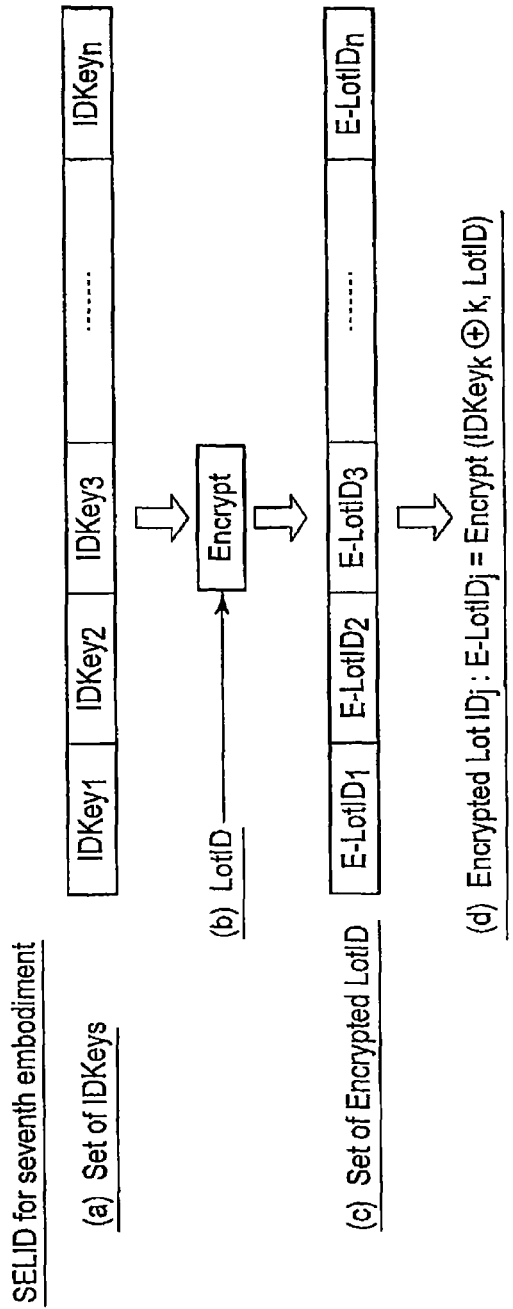
FIG. 17 is a view illustrating a structure example of a Set of Encrypted LotID set (SELID) in the seventh embodiment.

In addition, as described above, since the key data that is used for encryption of LotID is changed, the structure example of the SELID in this embodiment is as shown in FIG. 17.

Since the other respects are substantially the same as in the above-described first embodiment, a detailed description is omitted.

Advantageous Effects

According to the authenticator, authenticatee and authentication method relating to the seventh embodiment, the same advantageous effects (1) and (2), as with the above-described first embodiment, can be obtained.

Furthermore, in the seventh embodiment, even if the secret information NKey that is hidden in the NAND flash memory is used, the LotID cannot be obtained by decrypting the SELID. Thus, there is an advantage that even when the secret information NKey has been exposed from the NAND flash memory 10 or the secret information NKey has been leaked from the maker of the NAND flash memory 10, it is possible to exclude unlawful host devices which can decrypt the LotID or ChipID by using the SELID.

Eighth Embodiment (An Example in which a One-Way Function is Used for Calculation at Time of ChipID Transmission)

Next, a description is given of an authenticator, an authenticatee and an authentication method according to an eighth embodiment. This embodiment relates to an example in which a one-way function is used for calculation at time of ChipID transmission. A detailed description of parts common to those in the first embodiment is omitted.

Structure Example (Memory System)

Figure 18:
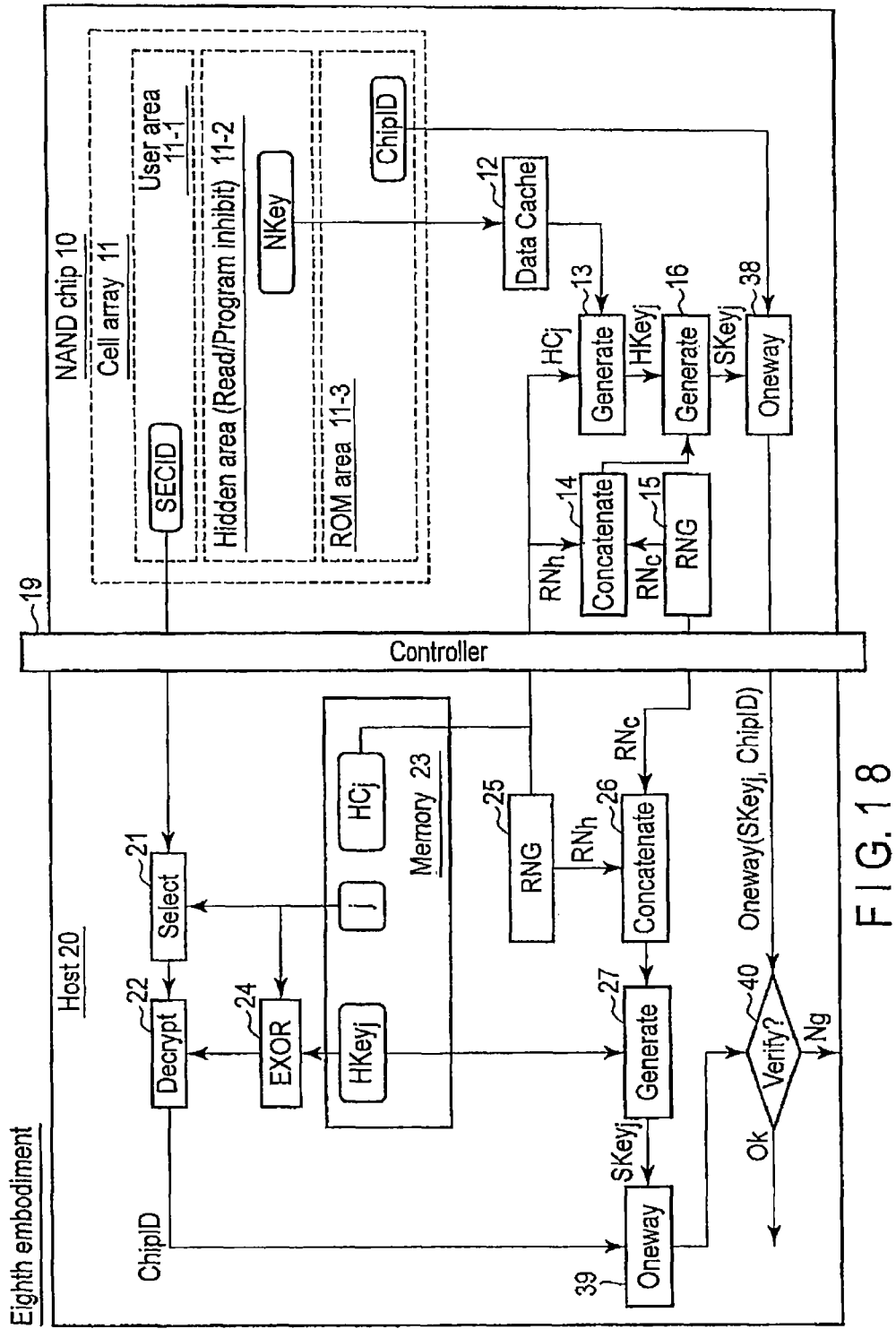
FIG. 18 is a block diagram illustrating a structure example of a memory system according to an eighth embodiment.

Referring to FIG. 18, a structure example according to the eighth embodiment is described.

As shown in FIG. 18, the structure example of the eighth embodiment differs from the foregoing embodiments in that an encrypted ChipID set (SECID: Set of Encrypted ChipID), which is formed by encrypting not LotIDs but ChipIDs, is recorded in the user area (User area) 11-1 in the cell array (Cell array) 11 of the NAND flash memory 10, and only the ChipID is recorded in the ROM area 11-3.

In addition, the NAND flash memory 10 and host device 20 include one-way converters (Oneway) 38 and 39 for executing one-way calculations, instead of encrypting the ID by the session key $SKey_j$.

The host device 20 includes a decryptor 22, which is similar to the decryptor 22 in the first embodiment, for reading out the SECID from the NAND flash memory 10, and obtaining the ChipID from the SECID by using the $HKey_j$ and index information j.

The host device 20 includes a data verification module 40 for determining a verification result between a value (Oneway($SKey_j$, ChipID)), which is obtained by oneway-converting the ChipID received from the NAND flash memory 10, and a oneway conversion value of the ChipID calculated by the host device 20 itself.
<Authentication Flow>

Next, referring to FIG. 19, a description is given of an authentication flow according to the eighth embodiment.

As illustrated in FIG. 19, if authentication is started (Start), the host device 20 reads out an encrypted ChipID set (SECID: Set of Encrypted ChipID) from the NAND flash memory 10 (Step S11).

Then, the host device 20 executes the above-described select process for selection from the read-out SECID, and reads out encrypted ChipID data which can be decrypted by the host device 20. Further, the host device 20 obtains ChipID by executing the above-described decryption process by using the hidden secret information $HKey_j$ (Step S12).

Subsequently, the host device 20 generates a random number $RN_h$, which is necessary at the time of requesting authentication. By using the random number in the authentication process, a different shared key is used at each time in the subsequent process between the host device 20 and the NAND flash memory 10 (Step S13).

Then, the host device 20 requests authentication (Request authentication) and transmits a pre-stored host constant ($HC_j$) and the random number $RN_h$ to the NAND flash memory 10 (Step S14).

Subsequently, the NAND flash memory 10 generates a random number $RN_c$ which is necessary for authentication, and sends the random number $RN_c$ to the host device (Step S15).

Subsequently, using the hidden NKey and the $HC_j$ that has been received in Step S14, the NAND flash memory 10 generates $HKey_j$ by the above-described data generation process. Further, the NAND flash memory 10 generates concatenated data $RN_h\|RN_c$, from the random number $RN_h$ received in Step S14 and the random number $RN_c$ generated in Step S15 by the above-described data concatenation process. In addition, using the $HKey_j$ and the concatenated data $RN_h\|RN_c$, the NAND flash memory 10 generates key data $SKey_j$ (=Generate ($HKey_j$, $RN_h\|RN_c$)) by the above-described data generation process (Step S16).

In parallel with the process of Step S16, the host device 20 generates concatenated data $RN_h\|RN_c$, by the above-described data concatenation process, from the generated random number $RN_h$ and the received random number $RN_c$. Further, using the secret information $HKey_j$ that is hidden in advance and the concatenated data $RN_h\|RN_c$, the host device 20 generates $SKey_j$ (=Generate ($HKey_j$, $RN_h\|RN_c$)) by the above-described data generation process (Step S17).

Subsequently, the host device 20 sends an ID request (Request ID) to the NAND flash memory 10 (Step S19).

Then, the NAND flash memory 10 reads out ChipID from the ROM area 11-3 (Step S21).

Subsequently, the NAND flash memory 10 executes one-way conversion by using the key data $SKey_j$ with which the ChipID has been generated, generates oneway conversion data Oneway-ID (=Oneway($SKey_j$, ChipID)), and sends the generated oneway conversion data Oneway-ID to the host device 20 (Step S38).

Then, the host device 20 executes oneway conversion by using the key data $SKey_j$ with which the ChipID has been generated, and finds oneway conversion data Oneway-ID (Step S39).

Subsequently, the host device 20 confirms that the received oneway conversion data Oneway-ID corresponds to the found oneway conversion data Oneway-ID. When both correspond, the host device 20 determines that the above-described ChipID is the correct ChipID. When both do not correspond, the host device 20 determines that the above-described ChipID is an unauthentic ID (Step S40).

By the above-described operation, the authentication flow according to the eighth embodiment is completed (End).

A structure example of the SECID that is the encrypted ChipID set is, similarly, as shown in FIG. 20.

The other respects are substantially the same as in the above-described first embodiment.

Advantageous Effects

According to the authenticator, authenticatee and authentication method relating to the eighth embodiment, the same advantageous effects (1) and (2), as with the above-described first embodiment, can be obtained.

Furthermore, in the eighth embodiment, the encrypted ChipID set (SECID), which is formed by encrypting not LotIDs but ChipIDs, is recorded in the user area (User area) 11-1 in the cell array (Cell array) 11 of the NAND flash memory 10, and only the ChipID is recorded in the ROM area 11-3.

Therefore, the amount of ID information, which has to be stored in the NAND flash memory 10, can be reduced.

Ninth Embodiment (An Example of a Combination of the Seventh and Eighth Embodiments)

Next, a description is given of an authenticator, an authenticatee and an authentication method according to a ninth embodiment. This embodiment relates to an example of a combination of the seventh and eighth embodiments. A detailed description of parts common to those in the first embodiment is omitted.

Structure Example (Memory System)

Referring to FIG. 21, a structure example according to the ninth embodiment is described.

As shown in FIG. 21, the present embodiment includes both the changes added to the first embodiment in the seventh embodiment and eighth embodiment. Specifically, the ninth embodiment is different from the first embodiment, mainly in that the IDKey is introduced and the SELID is changed to the SECID.

<Authentication Flow>

Figure 22:
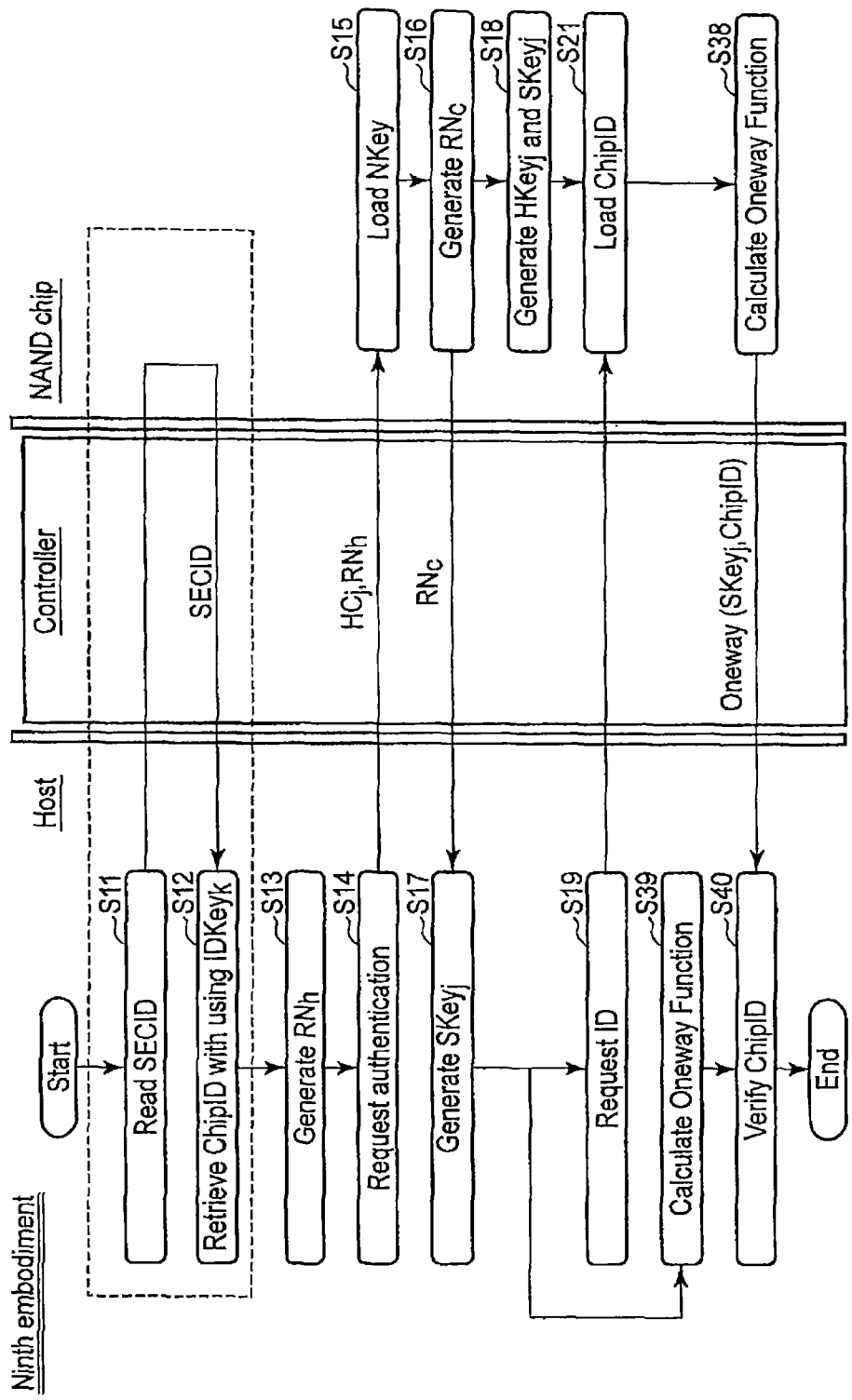
FIG. 22 is a flow chart illustrating an authentication flow of the memory system according to the ninth embodiment.

FIG. 22 illustrates an authentication flow relating to the ninth embodiment.

As illustrated in FIG. 22, the authentication flow of the ninth embodiment is the combination of the authentication flow of the seventh embodiment and that of the eighth embodiment.

A structure example of the SECID that is the encrypted ChipID set is, similarly, as shown in FIG. 23.

The other respects are substantially the same as in the above-described first embodiment.

Advantageous Effects

According to the authenticator, authenticatee and authentication method relating to the ninth embodiment, the same advantageous effects (1) and (2), as with the above-described first embodiment, can be obtained.

Furthermore, in the ninth embodiment, both the advantageous effects, which are added in the seventh embodiment and the eighth embodiment, can be obtained.

Tenth Embodiment (An Example of a Combination of the Third, Seventh and Eighth Embodiments)

Next, a description is given of an authenticator, an authenticatee and an authentication method according to a tenth embodiment. This embodiment relates to an example of a combination of the third, seventh and eighth embodiments. A detailed description of parts common to those in the first embodiment is omitted.

Structure Example (Memory System)

Referring to FIG. 24, a structure example according to the tenth embodiment is described.

As shown in FIG. 24, the present embodiment includes the different points which are added in the third, seventh and eighth embodiments. Specifically, the tenth embodiment is different from the first embodiment, mainly in that the IDKey is introduced, the SELID is changed to the SECID, and plural secret information pieces HKeys are hidden in the host device.

<Authentication Flow>

Figure 25:
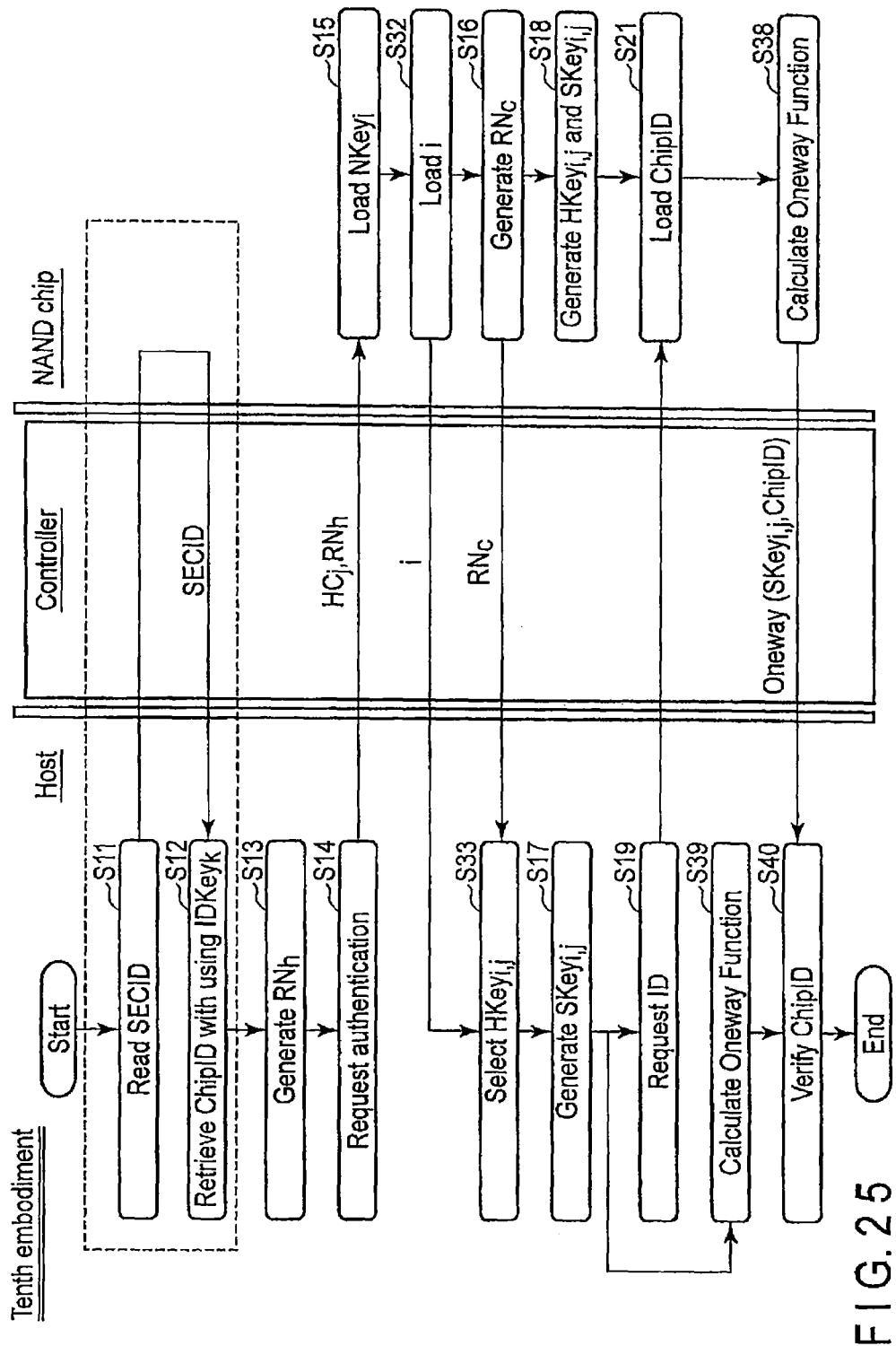
FIG. 25 is a flow chart illustrating an authentication flow of the memory system according to the tenth embodiment.

Next, referring to FIG. 25, the authentication flow according to the tenth embodiment is described.

As shown in FIG. 25, the authentication flow is different from that of the ninth embodiment in that an authentication flow, which is described below, is added.

To begin with, the host device 20 requests authentication (Request authentication) in Step S14.

Then, in Step S33, after sending the random number $RN_h$ and host constant $HC_j$, the host device 20 reads out the index information i of the $NKey_i$, which is hidden in the NAND flash memory, from the ROM area of the NAND flash memory. Further, after receiving the random number $RN_c$ from the NAND flash memory, the host device 20 selects the $HKey_{i,j}$, which is necessary for generating the key data $SKey_{i,j}$, from the secret information set $HKey_{i,j}$ (i=1, . . . , m), by using the index information i received in the above-described process.

However, the process flow illustrated in FIG. 25 is merely an example. The process flow is not limited to this example, if necessary data can be obtained in advance in processes such as the read-out of the index information i and the select process of $HKey_{i,j}$.

A structure example of the SECID that is the encrypted ChipID set is, similarly, as shown in FIG. 23.

The other respects are substantially the same as in the above-described first embodiment.

Advantageous Effects

According to the authenticator, authenticatee and authentication method relating to the tenth embodiment, the same advantageous effects (1) and (2), as with the above-described first embodiment, can be obtained.

Furthermore, according to the tenth embodiment, the advantageous effects of the third, seventh and eighth embodiments can be obtained.

Eleventh Embodiment (An Example in which the Random Number Generator is not Provided)

Next, a description is given of an authenticator, an authenticatee and an authentication method according to an eleventh embodiment. This embodiment relates to an example in which the random number generator 15 is not provided in the NAND flash memory 10 in the tenth embodiment. A detailed description of parts common to those in the first embodiment is omitted.

Structure Example (Memory System)

Referring to FIG. 26, a structure example according to the eleventh embodiment is described.

As shown in FIG. 26, the present embodiment differs from the tenth embodiment in that the random number generator (RNG) 15, which is provided in the NAND flash memory in the tenth embodiment, is not provided.

In the tenth embodiment, the session key data $SKey_{i,j}$ is generated from the concatenated data of two random numbers $RN_h$ and $RN_c$ and the secret data $HKey_{i,j}$. On the other hand, in the present embodiment, the session key data $SKey_{i,j}$ is generated from the random number $RN_h$ and the secret data $HKey_{i,j}$.

Next, the details of the structure example according to the eleventh embodiment are described.

The present embodiment illustrates a method of reading out identification information ChipID, which is recorded in the NAND flash memory that is the authenticatee, in the state in which the identification information ChipID is hidden from a third party, and surely confirming the data that is read out from the authenticatee, and shows a structure example in the case where this method is applied to the NAND flash memory.

NAND Flash Memory

The NAND flash memory 10 is an authenticatee, as described above.

As illustrated in FIG. 26, the NAND flash memory 10 according to this example includes a cell array 11, data caches 12A and 12B which are disposed in a peripheral area of the cell array 11, data generation modules (Generate) 13 and 16, and a one-way converter (Oneway) 38.

The cell array (Cell array) 11 includes a ROM area (ROM area) 11-3, a hidden area (Hidden area) 11-2 and a user area (User area) 11-1.

The ROM area (ROM area) 11-3 is an area in which data record from the outside is prohibited and data read from the outside is permitted. In the ROM area 11-3 according to this example, a ChipID which is identification information, and index information i (index of NKey) which is indicative of secret information $NKey_i$ recorded in the hidden area (Hidden area), are recorded. When the ChipID and index i are to be recorded, the ChipID and index i are recorded, in general, in the state in which the ChipID and index i are error-correction-encoded, so that the correct identification information may be read out even when an error has occurred in the data. However, the error-correction encoding/decoding is not particularly illustrated.

The hidden area (Hidden area) 11-2 is an area in which the outside of the NAND flash memory 10 is prohibited from data record, and in which data read is prohibited (Read/Program inhibit). In the hidden area 11-2 according to this example, $NKey_i$, which is secret information that is used by the NAND flash memory 10 in the authentication, is recorded. In the case where the ChipID is to be always hidden from the outside, the ChipID may be recorded in the hidden area, in place of the ROM area.

The user area (User area) 11-1 is an area in which data record and data read can be freely executed. In the user area 11-1, for example, SECID (Set of Encrypted ChipID), which is an encrypted ChipID set, is recorded. In addition, content data, such as photos, video, music or e-books, are recorded in the user area 11-1. The structure example of the SECID that is the encrypted ChipID is the same as shown in FIG. 23.

The data cache (Data cache) 12A, 12B temporarily stores data which has been read out from the cell array 11.

Each of the data generation modules (Generate) 13, 16 is a module which outputs new data from a plurality of input information pieces. In order to reduce the whole module scale, it is possible to construct the data generation modules (Generate) 13, 16 by the same module as the above-described oneway converter or a module which makes applicable use of the oneway converter. Similarly, the two data generation modules, which are depicted as different structural elements in order to make the data processing procedure easy to understand, may be realized by repeatedly utilizing the same module.

Each of the data generation modules (Generate) 13, 16 is a module which generates output data by a predetermined calculation from a plurality of input data. The data generation modules are used in order to convert information ($HC_j$), which has been received from the host device 20, by using the above-described secret information $NKey_i$, thereby generating $HKey_{i,j}$, and to convert, by using the $HKey_j$, the random number $RN_h$, which has been received from the host device 20, thereby generating a session key $SKey_{i,j}$. For example, AES (Advanced Encryption Standard) encryptors may be used for the data generation modules 13 and 16.

The oneway converter (Oneway) 38 is a module which executes oneway conversion of the input data and the key data which is separately input, and outputs oneway-converted input data. In the present embodiment, the oneway converter (Oneway) 38 converts, by a oneway function, the identification information ChipID which has been read out of the ROM area, by using the key data $SKey_{i,j}$ which has been generated by the above-described data generation modules, thereby generating oneway conversion identification information Oneway-ID (=Oneway($SKey_{i,j}$, ChipID). Like the first embodiment, in the case where the identification information ChipID is recorded in the hidden area in place of the ROM area, the identification information ChipID, which is the input data of the oneway converter, is read out from the hidden area.

As described above, in order to reduce the whole hardware module scale, the oneway converter 38 may also be used as the data generation circuit.

Although not shown, for example, an output module for outputting data, which is to be sent to the host device 20 via the controller 19, may actually be disposed as a structural element.

Host Device

As shown in FIG. 26, the host device (Host) 20 according to this example includes a random number generator (RNG) 25, an exclusive-OR module (EXOR) 24, data selectors (Select) 21-1 and 21-2, a decryptor (Decrypt) 22, a data generator (Generate) 27, a oneway converter (Oneway) 39, and a data verification module (Verify) 40. In addition, an error correction process module, for instance, which is not shown, may be included as a structural element, where necessary.

The random number generator (RNG) 25 generates $RN_h$ which is used for authentication.

The exclusive-OR module (EXOR) 24 calculates an exclusive logical sum of two input data, and outputs the calculation result.

Two data selectors (Select) 21-1 and 21-2 are disposed. The first-stage data selector (Select1) 21-1 selects, by using index information k of secret information $HKey_j$, encrypted ChipID data which can be decrypted by using secret information $IDKey_k$ that is hidden in the host device, from the encrypted ChipID set (SECID) which has been read out of the NAND flash memory 10.

The second-stage data selector (Select2) 21-2 selects, by using index information i of secret information $NKey_i$ that has been read out from the NAND flash memory 10, secret information $HKey_{i,j}$ which is necessary for the authentication process with the NAND flash memory 10, from the secret information set $HKey_{i,j}$ (i=1, . . . , m; j is a fixed value in the $HKey_{i,j}$) hidden in the host device 20.

In the case of a consumer device, the secret information $IDKey_k$ and $HKey_{i,j}$ are recorded in an internal dedicated memory after being encrypted by a unique method of the maker. In the case of a software program, the secret information $IDKey_k$ and $HKey_{i,j}$ are stored in the state in which the secret information $IDKey_k$ and $HKey_{i,j}$ can be protected against unlawful analysis by a tamper-resistant software (TRS) technology. In the case where a security module is built in, the secret information $IDKey_k$ and $HKey_{i,j}$ are stored, after taking such a measure as hiding the secret information $IDKey_k$ and $HKey_{i,j}$ by using the function of the security module.

The decryptor (Decrypt) 22 decrypts input data by key data which is separately input, and outputs decrypted input data. In the present embodiment, the decryptor 22 is used in order to obtain ChipID by decrypting encrypted ChipID data which has been selected by the first data selector, by using, as key information, a calculation result by the exclusive-OR module with respect to the secret information $IDKey_k$ hidden in the host device and index information k for identifying the secret information $IDKey_k$, where necessary.

The data generator (Generate) 27 is an arithmetic module which generates output data by a predetermined calculation from a plurality of input data. The data generator 27 is used in order to convert, by using the secret information $HKey_{i,j}$ hidden in the host device, the random number $RN_h$, which has been generated by the host device 20 itself, thereby generating a session key $SKey_{i,j}$. The data generator 27 can use, for example, an AES encryption calculation.

The oneway converter (Oneway) 39 converts, by a oneway function, the ChipID which has been output from the decryptor, by using the $SKey_{i,j}$ which has been output from the data generator, thereby generating oneway conversion identification information Oneway-ID. The data verification module (Verify) 40 compares the oneway conversion identification information Oneway-ID, which has been received from the NAND flash memory 10, and the oneway conversion identification information obtained from the oneway converter in the host device. When both information values correspond, the data verification module (Verify) 40 determines that the above-described ChipID obtained by the decryptor is the correct ChipID. When both information values do not correspond, the data verification module (Verify) 40 determines that the above-described ChipID is an unauthentic ID.

An error correction process module, etc., which are not shown, may be provided as structural elements, where necessary.

<Authentication Flow>

Figure 27:
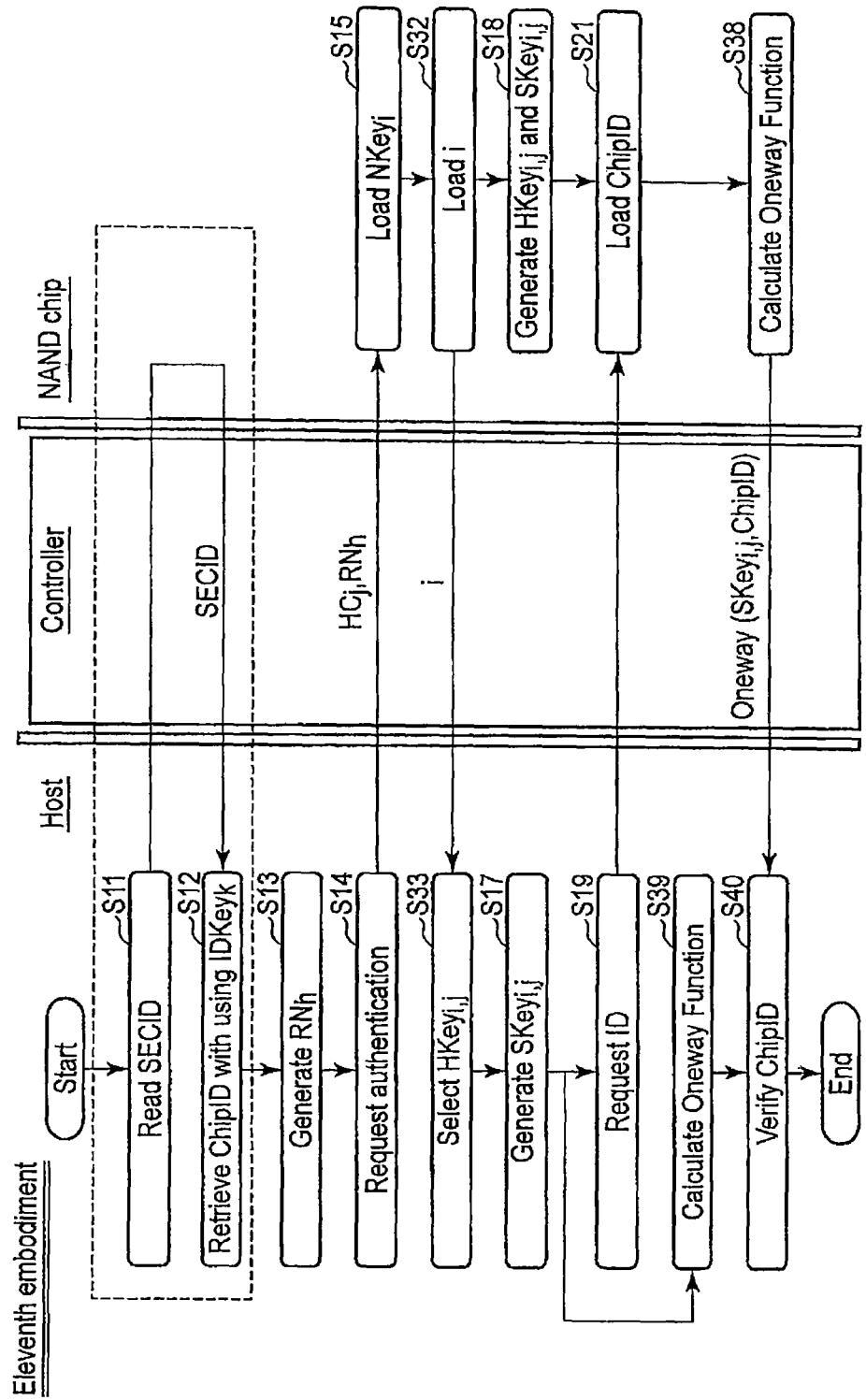
FIG. 27 is a flow chart illustrating an authentication flow of the memory system according to the eleventh embodiment.

Next, referring to FIG. 27, a description is given of an authentication flow of the memory system according to the eleventh embodiment.

As illustrated in FIG. 27, if authentication is started (Start), the host device 20 reads out an encrypted ChipID set (SECID: Set of Encrypted ChipID) from the NAND flash memory 10 (Step S11).

Then, the host device 20 executes, by the data selector (Select1) 21-1, a data select process for selection from the read-out SECID, and reads out encrypted ChipID data which can be decrypted by the host device 20. Further, the host device 20 obtains ChipID by executing, by the decryptor 22, the decryption process by using the hidden secret information $IDKey_k$ (Step S12).

Subsequently, the host device 20 generates a random number $RN_h$ which is necessary at the time of requesting authentication (Step S13). By using the random number in the authentication process, a different shared key is used at each time between the host device 20 and the NAND flash memory 10 in the subsequent process.

Then, the host device 20 requests authentication (Request authentication) and transmits a pre-stored host constant ($HC_j$) and the random number $RN_h$ to the NAND flash memory 10 (Step S14).

Subsequently, the NAND flash memory 10 reads out index information i of the NKey which is necessary for the host device 20 to select $HKey_{i,j}$, which is necessary for the authentication with the NAND flash memory, from the secret information set $HKey_{i,j}$ (i=1, . . . , m) (Step S15, S33).

Then, the NAND flash memory 10 generates, by the data generation process in the data generation module, the $HKey_{i,j}$ by using the hidden $NKey_i$ and the received $HC_j$, and generates the key data $SKey_{i,j}$ (=Generate ($HKey_{i,j}$, $RN_h$)) by the above-described data generation process in the data generation circuit by using the received random number $RN_h$ (Step S18).

In parallel with the process of Step S32, the host device 20 selects the $HKey_{i,j}$, which is necessary for the authentication process with the NAND flash memory 10, from the secret information set $HKey_{i,j}$ (i=1, . . . , m) which is hidden in advance, by using the received index information i (Step S33).

Subsequently, the host device 20 generates the session key $SKey_{i,j}$ (=Generate ($HKey_{i,j}$, $RN_h$)) by the above-described data generation process in the data generator 27, by using the selected secret information $HKey_{i,j}$ and the generated random number $RN_h$ (Step S17).

Then, the host device 20 sends an ID request (Request ID) to the NAND flash memory 10 (Step S19).

Subsequently, the NAND flash memory 10 reads out ChipID from the ROM area (Step S21).

Then, the NAND flash memory 10 executes a oneway conversion process in the oneway converter 38 by using the key data $SKey_{i,j}$ with the ChipID in order to generate oneway conversion data Oneway-ID (=Oneway($SKey_{i,j}$, ChipID), and sends the generated oneway conversion data Oneway-ID to the host device 20 (Step S38).

Subsequently, the host device 20 executes a oneway conversion process in the oneway converter 39 by using the key data $SKey_{i,j}$ with which the ChipID has been generated, and finds oneway conversion data Oneway-ID (Step S39).

Subsequently, the host device 20 confirms that the received oneway conversion data Oneway-ID corresponds to the found oneway conversion data. When both correspond, the host device 20 determines that the above-described ChipID is the correct ChipID. When both do not correspond, the host device 20 determines that the above-described ChipID is an unauthentic ID (Step S40).

By the above-described operation, the authentication flow according to the eleventh embodiment is completed (End).

Advantageous Effects

According to the authenticator, authenticatee and authentication method relating to the eleventh embodiment, the same advantageous effects (1) and (2), as with the above-described first embodiment, can be obtained.

Furthermore, in the eleventh embodiment, there is no need to provide the random number generator 15 in the NAND flash memory 10. Therefore, the advantageous effects of the first embodiment and the advantageous effects, which are added in the tenth embodiment, can similarly be obtained, and the implementation circuit scale of the NAND flash memory can, advantageously, further be reduced.

Twelfth Embodiment (An Example in which ID-Index is Written)

Next, a description is given of an authenticator, an authenticatee and an authentication method according to a twelfth embodiment. This embodiment relates to an example in which index information ID-index, which is necessary for specifying ChipID, is written. A detailed description of parts common to those in the first embodiment is omitted.

Structure Example (Memory System)

Figure 28:
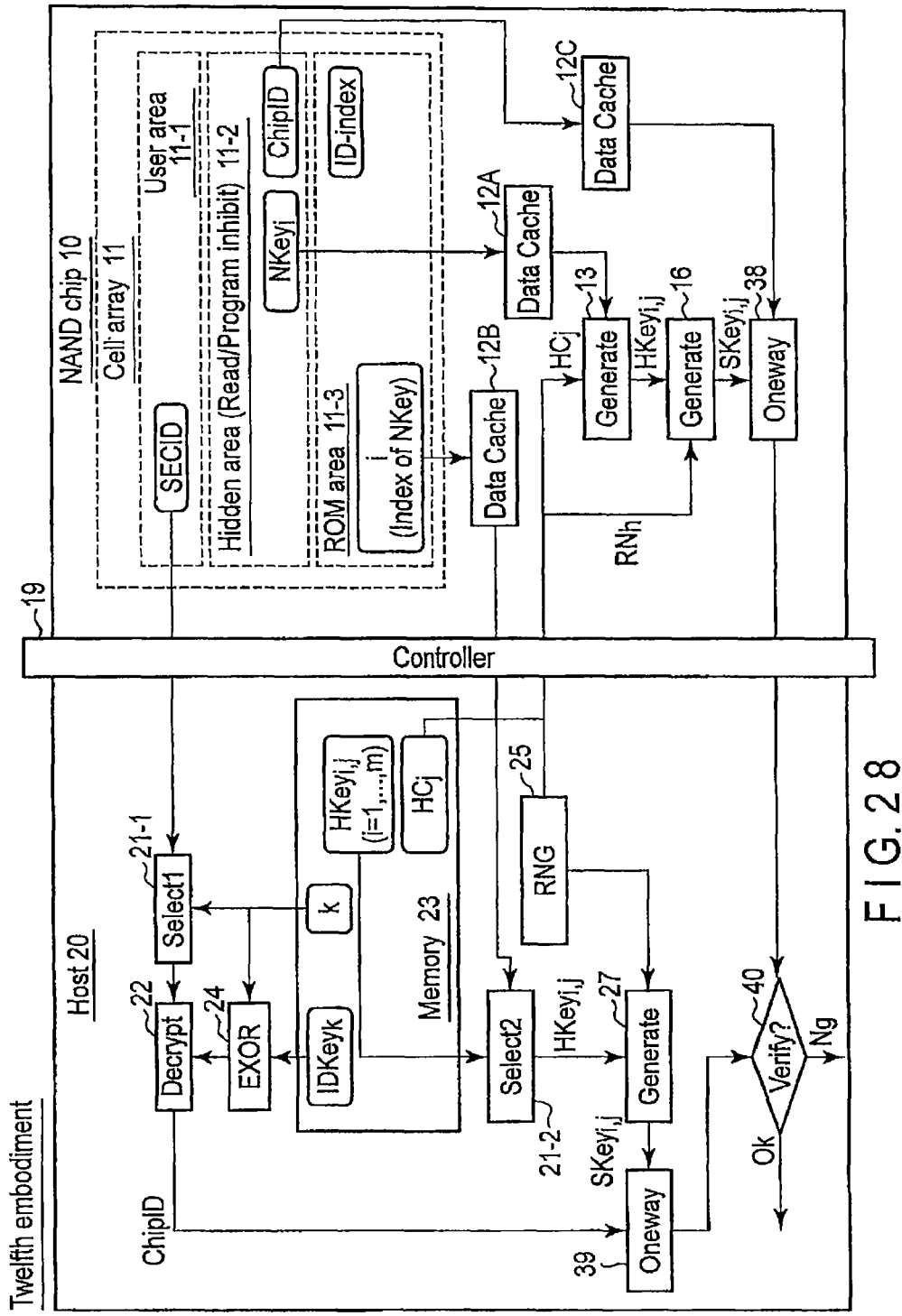
FIG. 28 is a block diagram illustrating a structure example of a memory system according to a twelfth embodiment.

Referring to FIG. 28, a structure example according to the twelfth embodiment is described.

As shown in FIG. 28, the present embodiment differs from the eleventh embodiment in that index information ID-index, which is necessary for specifying ChipID, is written in the ROM area 11-3 of the NAND flash memory 10, the ChipID is recorded in the hidden area (Hidden area) 11-3, and a data cache (Data cache) 12C, for instance, for reading out the ChipID is included, where necessary.

A structure example of the SECID that is the encrypted ChipID is similar to that shown in FIG. 23.

<Authentication Flow>

At a time of reading out the ChipID from the hidden area, the NAND flash memory 10 reads out the ChipID via the data cache, where necessary. In the other respects, the process flow is substantially the same as that in the eleventh embodiment.

<Re: Write of SECID>

Figure 29:
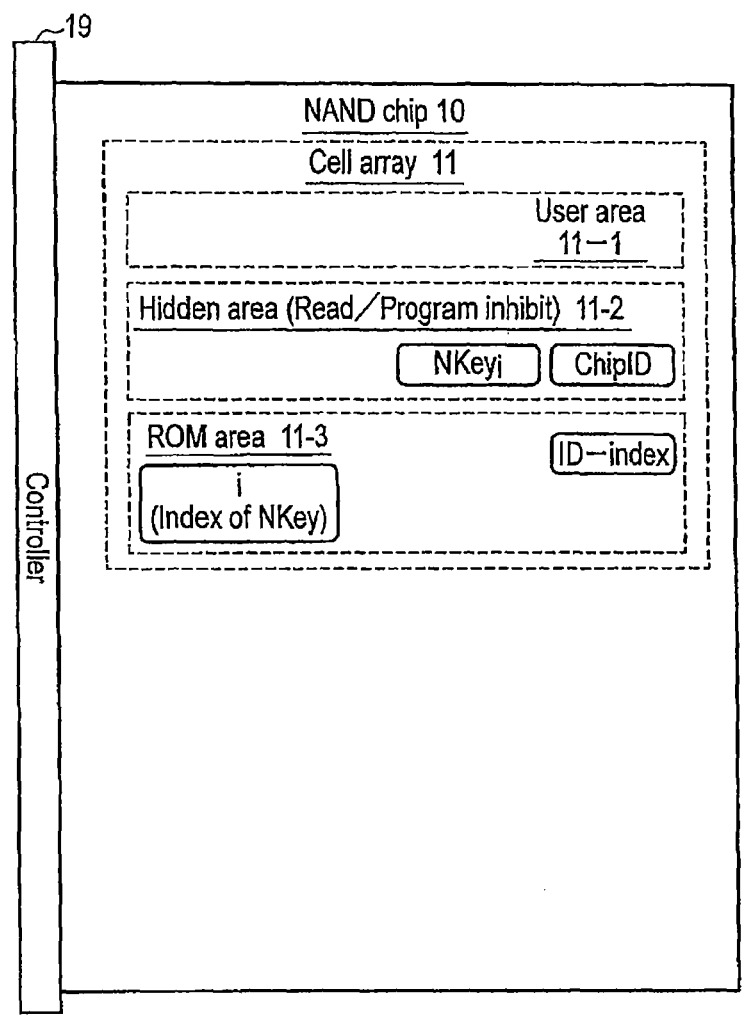
FIG. 29 is a view showing an authenticatee in a state prior to SECID write in the twelfth embodiment.

Referring to FIG. 29, the write of the encrypted ChipID set (SECID) is described.

This write process is not particularly necessary, for example, when the encrypted ChipID set (SECID) is written at the time of manufacture of the NAND flash memory 10. However, the SECID write process is necessary, for example, in the case where the NAND flash memory 10 and controller 19 are combined and are obtained by general users as a storage media product such as an SD® card, and the SECID is written later in the market at the time of use of the card.

FIG. 29 shows the case in which data is recorded in a storage medium in the state in which the SECID has not yet been recorded, as described above.

As shown in FIG. 29, in the NAND flash memory 10, secret information $NKey_i$ and identification information ChipID are recorded in the hidden area 11-2, index information i which is necessary for specifying the secret information $NKey_i$ and index information ID-index which is necessary for specifying the identification information ChipID are written in the ROM area 11-3. However, the SECID has not yet been written in the NAND flash memory 10.

Referring to FIG. 30, a description is given of the case in which SECID is downloaded from a server and recorded in a storage medium 10 in which the SECID has not yet been recorded.

As illustrated in FIG. 30, in this case, a data cache 12 is disposed, where necessary, in the NAND flash memory 10.

A server 60 in this example includes a ChipID generator (Generate ChipID) 62 for generating the ChipID from the ID-index, an encryptor (Encrypt) 63 and an IDKey database (Set of $IDKey_e$s (e=1, ..., x)) 61.

Various conversions are usable as a method of generating the ChipID from the ID-index. An example of the conversion is described below.

(Example of Conversion)

To start with, a value, which is created by encrypting ChipID by encryption using a conversion key $K_m$ which is distributed in advance to each maker of the NAND flash memory 10, is set to be ID-index. The ID-index is expressed as follows:

ID-index=Encrypt($K_m$,ChipID).

The ID-index is transmitted to the server 60 via the Internet 50.

In the server 60, the generator 62 decrypts the received ID-index by using the conversion key $K_m$, thereby obtaining ChipID. The ChipID is expressed as follows:

ChipID=Decrypt($K_m$,ID-index).

The conversion key $K_m$ may be made common to all makers of NAND flash memories 10. However, the conversion key $K_m$ may also be made different between the makers of NAND flash memories 10.

The host device 20 has a function of determining whether new write of SECID is necessary or not, and requesting SECID from the server where necessary.

<SECID Write Flow>

Figure 31:
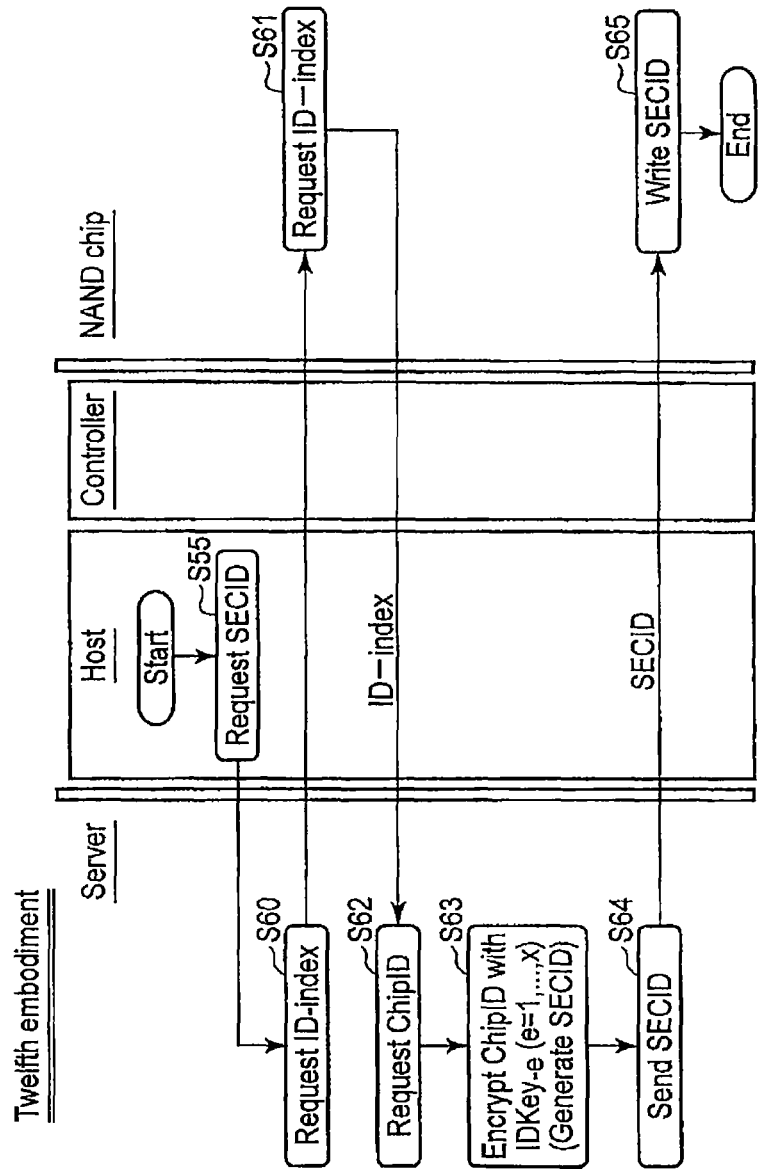
FIG. 31 is a flow chart illustrating a flow of downloading the SECID in the twelfth embodiment.

Next, referring to FIG. 31, a description is given of a flow of downloading an encrypted ChipID set (SECID) from the server 60 and writing the SECID in the NAND flash memory 10.

As illustrated in FIG. 31, to start with, when the host device 20 has determined that the SECID needs to be downloaded, the SECID write process is started (Start), and the host device 20 issues a SECID request to the server 60 (Step S55).

Then, the server 60 requests, from the NAND flash memory 10, the index information ID-index which is necessary for specifying the ChipID (Step S60).

Subsequently, the NAND flash memory 10 reads out the ID-index from the ROM area 11-3, and sends the ID-index to the server (Step S61).

Then, the server 60 generates ChipID by the ChipID generator 62, by using the received ID-index (Step S62).

Subsequently, the server 60 reads out $IDKey_e$ (e=1, ..., x) which is hidden, encrypts the generated ChipID by using each $IDKey_e$ 61, and generates the encrypted ChipID set (SECID) (Step S63).

Then, the server 60 sends the generated encrypted ChipID set (SECID) to the NAND flash memory (Step S64).

Subsequently, the NAND flash memory 10 writes and records the received encrypted ChipID set (SECID) in the user area 11-1 (Step S65).

By the above-described operation, the encrypted ChipID set (SECID) download flow relating to the twelfth embodiment is completed (End).

The other structures and operations are substantially the same as in the eleventh embodiment.

Advantageous Effects

According to the authenticator, authenticatee and authentication method relating to the twelfth embodiment, the same advantageous effects (1) and (2), as with the above-described first embodiment, can be obtained.

Furthermore, as in the twelfth embodiment, application may be made to the case where the SECID is to be written later.

13th Embodiment (An Example of a Memory, a Controller and a Host)

Next, referring to FIG. 32, a 13th embodiment is described. The 13th embodiment relates to an example of the NAND flash memory 10, controller 19 and host device 20, which are applicable to the above-described embodiments. In this embodiment, an SD Card® is taken as an example of a memory card.

As shown in FIG. 32, in this embodiment, functional blocks of the host device, which is connected to the memory card, are illustrated. The respective functional blocks can be realized by either hardware or computer software, or by a combination of both. Thus, the respective blocks are described, in general, from the standpoint of their functions, so as to clarify by which of them each block is realized. Whether such functions are executed as hardware or software depends on concrete modes of implementation or on design restrictions imposed on the entire system. A person skilled in the art may realize these functions by various methods in each concrete mode of implementation, but all methods of implementation fall within the scope of the present invention.

The host device 20 includes software 211 such as an application or an operating system. The software 211 is instructed by the user to write data in the memory card, or to read out data from the memory card. The software 211 instructs a file system 212 to write and read data. The file system 212 is a scheme for managing file data which is recorded in a storage medium that is an object of management. The file system 212 records management information in a memory area in the storage medium, and manages the file data by using the management information.

The host device 20 includes an SD interface 213. The SD interface 213 is composed of hardware and software, which are necessary for executing an interface process between the host device 20 and the memory card. The host device 20 communicates with the memory card via the SD interface 213. The SD interface 213 specifies various protocols which are necessary for communication between the host device 20 and the memory card, and includes a set of various commands which are mutually recognizable by an SD interface 131 of the memory card, which will be described later. In addition, the SD interface 213 includes a hardware structure (arrangement of pins, number of pins, etc.) which is connectable to the SD interface 131 of the memory card.

The memory card includes a NAND flash memory 10 and a controller 19 for controlling the memory 10. When the memory card is connected to the host 20, or when the host 20 is turned on in the state in which the memory card is inserted in the host 20 that is in the OFF state, the memory card is supplied with power, executes an initializing process, and executes a process corresponding to the access from the host 20.

The NAND memory 10 stores data in a nonvolatile state, and executes data write and read in a unit called "page" which comprises a plurality of memory cells. A unique physical address is allocated to each page. In addition, the memory 10 executes erase of data in a unit called "block" (erase block) which comprises a plurality of pages. In some cases, a physical address is allocated to a physical block unit.

The controller 19 manages the storage state of data by the memory 10. The management of the storage state includes managing a relationship between a physical address of a page (or a physical block) and a logical address of data which is stored in this page, and managing which physical address is indicative of a page (or a physical block) that is in an erase state (a state in which no data is written or invalid data is stored).

The controller 19 includes an SD interface 131, an MPU 132, a ROM (read only memory) 133, a RAM (random access memory) 134, and a NAND interface 135.

The SD interface 131 is composed of hardware and software, which are necessary for executing an interface process between the host 20 and the controller 19. Like the SD interface 213, the SD interface 131 specifies protocols which enable communication between both, includes a set of various commands, and also includes a hardware structure (arrangement of pins, number of pins, etc.). The memory card (controller 19) communicates with the host 20 via the SD interface 131. The SD interface 131 includes a register 136.

The MPU 132 controls the entire operation of the memory card. For example, when the memory card is supplied with power, the MPU 132 reads out firmware (control program), which is stored in the ROM 133, into the RAM 134, and executes a predetermined process. The MPU 132 creates various tables on the RAM 134 according to the control program, or executes a predetermined process on the memory 10 according to a command which is received from the host 20.

The ROM 133 stores, e.g. a control program which is controlled by the MPU 132. The RAM 134 is used as a working area of the MPU 132, and temporarily stores the control program or various tables. Such tables include a conversion table (logical/physical table) for converting a logical address allocated to data by the file system 212 to a physical address of a page in which the data is actually stored. The NAND interface 135 executes an interface process between the controller 19 and the memory 10.

The memory areas in the NAND flash memory 10 include, for example, a user area (User area), a hidden area (Hidden area), a protected area (Protected area) and a ROM area (ROM area), as described above, in accordance with the kinds of data which is stored. The controller 19 secures a part of the user data area, and stores control data (e.g. logical/physical table) which is necessary for the operation of the controller 19 itself.

14th Embodiment (A Structure Example of NAND Flash Memory)

Next, a 14th embodiment is described as a concrete structure example of the above-described NAND flash memory 10.

<Entire Structure Example>

Figure 33:
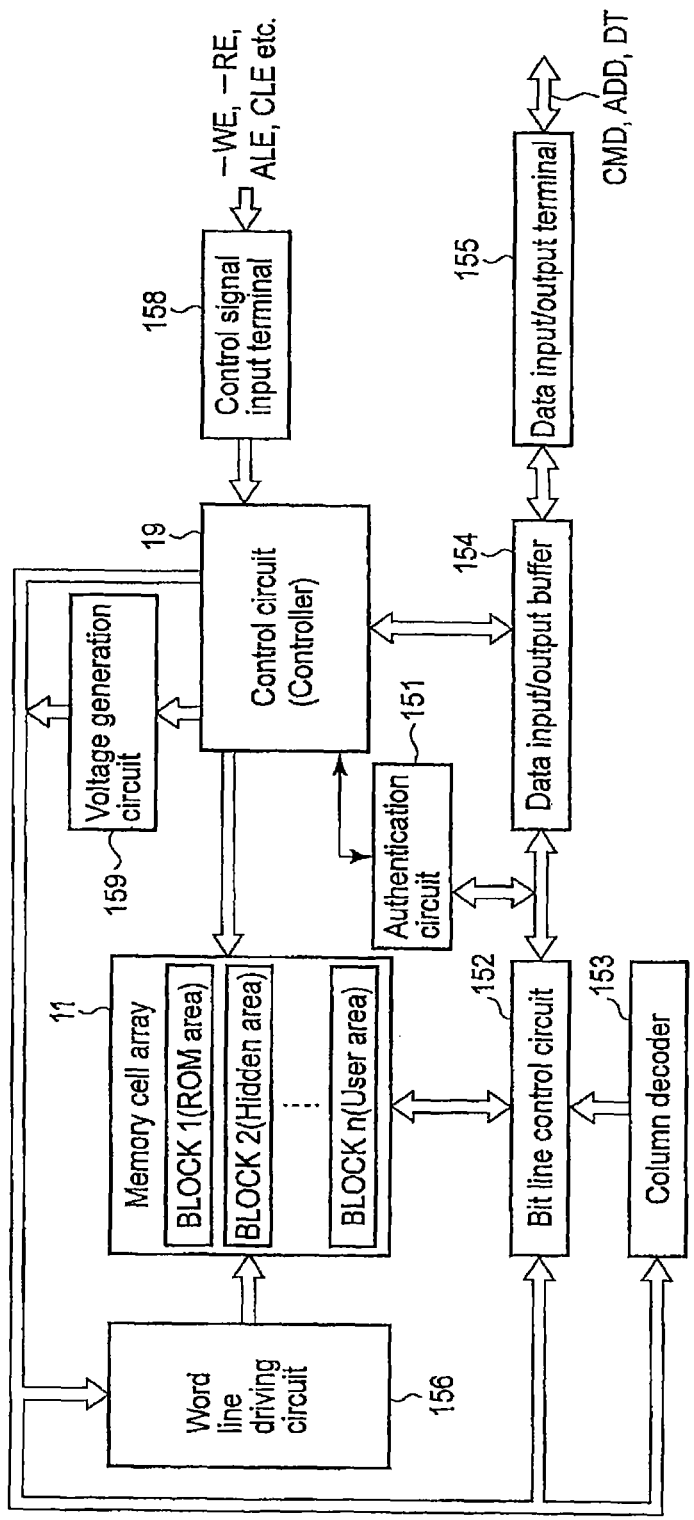
FIG. 33 is a block diagram showing a NAND flash memory according to a 14th embodiment.

FIG. 33 shows a concrete entire structure example of the NAND flash memory 10.

As shown in FIG. 33, the NAND flash memory 10 of this embodiment includes a memory cell array 11, a control circuit 19, an authentication circuit 151, a bit line control circuit 152, a column decoder 153, a data input/output buffer 154, a data input/output terminal 155, a word line driving circuit 156, a control signal input terminal 158, and a power generation circuit 159.

The memory cell array 11 is composed of a plurality of blocks (BLOCK 1 to BLOCK n). Each of the blocks (BLOCK 1 to BLOCK n) includes a plurality of memory cells which are arranged at intersections between word lines and bit lines. For example, BLOCK 1 is the above-described ROM area 11-3. For example, BLOCK 2 is the hidden area 11-2. The other blocks are, for example, user areas (User area) 11-1, which are accessible from the host device 20.

The ROM area 11-3 is, for example, an OTP (One Time Program) block, and only one-time write is permitted. After data write, a block decoder is controlled by using means such as an electric fuse, a laser fuse or a ROM fuse, thereby prohibiting an erase operation. The hidden area 11-2 is set in such a state that the hidden area 11-2 cannot be selected by, for example, decoding with an external address. The hidden area 11-2 is an area from which data can be read out by only the control circuit 19 in the NAND flash memory.

The authentication circuit 151 includes, for example, the above-described data cache 12, generation circuits 13 and 16, concatenation circuit 14, random number generator 15, exclusive-OR circuit 17, and encryptor 18. The authentication circuit 151 is controlled by the control circuit 19.

The bit line control circuit 152 reads out data of a memory cell in the memory cell array 11 via a bit line, and detects the state of a memory cell in the memory cell array 11 via a bit line. In addition, the bit line control circuit 152 applies a write control voltage to a memory cell in the memory cell array 11 via a bit line, thereby writing data in the memory cell.

In the bit line control circuit 152, a data memory circuit, such as a page buffer (not shown), is provided, and this data memory circuit is selected by the column decoder 153. The data of the memory cell, which has been read out to the data memory circuit, is output to the outside from the data input/output terminal 155 via the data input/output buffer 154.

The data input/output terminal 155 is connected to, for example, an external host device 20. The data input/output terminal 155 has a bus width of, e.g. 8 bits or 16 bits. The NAND flash memory 10 may support a high-speed interface standard such as a toggle mode interface. In the toggle mode interface, for example, data transfer is performed via the data input/output terminal 155, in sync with both the rising and falling edges of a data strobe signal (DQS).

The host device 20 is, for example, a microcomputer, and receives data which is output from the data input/output terminal 155. The host device 20 outputs various commands CMD (write command, read command, erase command, status read command, etc.) for controlling the operation of the NAND flash memory 10, addresses ADD, and data DT. The write data DT, which has been input to the data input/output terminal 155 from the host device 20, is supplied via the data input/output buffer 154 to the data memory circuit (not shown) which is selected by the column decoder 153. On the other hand, the commands CMD and addresses ADD are supplied to the control circuit 19.

The word line driving circuit 156, under the control of the control circuit 19, selects a word line in the memory cell array 11, and applies to the selected word line the voltage that is necessary for data read, write or erase.

The voltage generation circuit 159, under the control of the control circuit 19, supplies necessary voltages for the operations of the connected structural circuits shown in the Figure. For example, the voltage generation circuit 159 boosts an external voltage which is supplied from the host device, and generates a voltage which is applied to the word line at a time of data read, write or erase.

The control circuit (Controller) 19 delivers necessary control signals and control voltages to the respective connected circuits, thereby to control the operation of the entirety of the NAND flash memory 10. The control circuit 19 is connected to the memory cell array 11, authentication circuit 151, bit line control circuit 152, column decoder 153, data input/output buffer 154, word line driving circuit 156 and voltage generation circuit 159. The connected structural circuits are controlled by the control circuit 19.

The control circuit 19 is connected to the control signal input terminal 158, and is controlled by a combination of control signals, such as a WE (write enable) signal, a RE (read enable) signal, an ALE (address latch enable) signal and a CLE (command latch enable) signal, which are input via the control signal input terminal 158 from the host device 20.

In terms of functions, the word line driving circuit 156, bit line control circuit 152, column decoder 153 and control circuit 19 constitute a data write circuit, a data read circuit and a data erase circuit. The host device 20 detects whether the NAND flash memory 10 is executing an internal operation, such as a write operation, a read operation or an erase operation, by monitoring an RY/BY (ready/busy) signal output terminal (not shown). The control circuit 19 outputs an RY/BY signal via the RY/BY signal output terminal.

<Structure Example of Block (BLOCK)>

Next, referring to FIG. 34, a structure example of the block (BLOCK), which constitutes the memory cell array, is described. The block BLOCK 1 in FIG. 33 is described by way of example. In this example, since the memory cells in the block BLOCK 1 are erased batchwise, this block is a data erase unit.

The block BLOCK 1 comprises a plurality of memory cell units MU which are arranged in a word line direction (WL direction). The memory cell unit MU comprises a NAND string (memory cell string) which is arranged in a bit line direction (BL direction) crossing the WL direction and is composed of 8 memory cells MC0 to MC7 having current paths connected in series; a source-side select transistor S1 connected to one end of the current path of the NAND string; and a drain-side select transistor S2 connected to the other end of the current path of the NAND string.

In the present embodiment, the memory cell unit MU comprises 8 memory cells MC0 to MC7. However, the number of memory cells is not limited to 8, and may be two or more, for example, 56 or 32.

The other end of the current path of the source-side select transistor S1 is connected to a source line SL. The other end of the current path of the drain-side select transistor S2 is connected to a bit line BLm−1 which is provided on an upper side of the memory cell unit MU in association with each memory cell unit MU and extends in the BL direction.

Word lines WL0 to WL7 extend in the WL direction, and are connected commonly to the control electrodes of the plural memory cells in the WL direction. A select gate line SGS extends in the WL direction, and is connected commonly to the plural select transistors S1 in the WL direction. Similarly, a select gate line SGD extends in the WL direction, and is connected commonly to the plural select transistors S2 in the WL direction.

A page (PAGE) is present in association with each of the word lines WL0 to WL7. For example, as indicated by a broken line in FIG. 34, a page 7 (PAGE 7) is present in association with the word line WL7. Since a data read operation and a data write operation are executed in units of the page (PAGE), the page (PAGE) is a data read unit and a data write unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A host device capable of performing an authentication process with a memory device which includes card key data hidden in the memory device and unique to the memory device, the host device comprising:
   a decryptor;
   a selector;
   a hardware processor; and
   a comparator,
   wherein the host device is configured to:
      receive first data from the memory device;
      generate, second data by the decryptor decrypting the received first data using third key data hidden in the host device;

receive key index data from the memory device;
select, by the selector, first key data based on the received key index data, the first key data pre-stored and hidden in the host device, wherein the first key data is derived from the card key data and the card key data is capable of being generated from the first key data, and wherein the third key data is independent of the card key data and the card key data is incapable of being generated from the third key data;
transmit first information data and random number data to the memory device, the first information data pre-stored in the host device;
generate, by the processor, second key data based on the selected first key data and the random number data;
generate, by the processor, third data based on the generated second key data and the second data;
receive fourth data from the memory device; and
compare, by the comparator, the generated third data with received fourth data.

2. The host device according to claim 1, wherein the processor performs an AES (Advanced Encryption Standard) encryption process based on the selected first key data and the random number data to generate the second key data.

3. The host device according to claim 1, wherein the processor performs a one-way conversion process of the generated second data using the generated second key data to generate the third data.

4. The host device according to claim 1, wherein the fourth data is generated, by the memory device, based on the first information data, random number data, and ID information, and
the ID information is hidden in the memory device.

5. The host device according to claim 4, wherein the host device determines whether the memory device is valid or not based on the result of the comparison of the comparator.

6. A host device capable of performing an authentication process with a memory device which includes card key data hidden in the memory device and unique to the memory device, the host device comprising:
a decryptor;
a selector; and
a hardware processor,
wherein the host device is configured to:
receive first data from the memory device;
generate second data by the decryptor decrypting the received first data using third key data hidden in the host device;
select, by the selector, first key data based on key index data, the first key data pre-stored and hidden in the host device, wherein the first key data is derived from the card key data and the card key data is capable of being generated from the first key data, and wherein the third key data is independent of the card key data and the card key data is incapable of being generated from the third key data;
transmit first information data and random number data to the memory device, the first information data pre-stored in the host device; and
generate second key data by the processor executing an AES (Advanced Encryption Standard) encryption process based on the selected first key data and the random number data.

7. The host device according to claim 6, wherein the host device is further configured to process, by the processor, the generated second data based on the generated second key data.

8. The host device according to claim 7, wherein the processor performs a one-way conversion process of the generated second data using the generated second key data.

9. The host device according to claim 7, wherein the processor performs an exclusive OR operation of the generated second data and third data, and
the third data is generated by the processor decrypting fourth data received from the memory device using the generated second key data.

10. The host device according to claim 6, wherein the key index data is received from the memory device.

* * * * *